US009290644B2

(12) United States Patent
Sato et al.

(10) Patent No.: US 9,290,644 B2
(45) **Date of Patent: *Mar. 22, 2016**

(54) RUBBER COMPOSITION, AND PNEUMATIC TIRE

(75) Inventors: Daisuke Sato, Kobe (JP); Kazuya Torita, Kobe (JP); Soh Ishino, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/354,307

(22) PCT Filed: Jun. 26, 2012

(86) PCT No.: PCT/JP2012/066212

§ 371 (c)(1), (2), (4) Date: Apr. 25, 2014

(87) PCT Pub. No.: WO2013/077018

PCT Pub. Date: May 30, 2013

(65) Prior Publication Data

US 2014/0296376 A1 Oct. 2, 2014

(30) Foreign Application Priority Data

Nov. 24, 2011 (JP) ................................ 2011-256602
Nov. 24, 2011 (JP) ................................ 2011-256604
Nov. 24, 2011 (JP) ................................ 2011-256613

(51) Int. Cl.

| | |
|---|---|
| ***C08L 9/06*** | (2006.01) |
| ***B60C 1/00*** | (2006.01) |
| ***C08K 3/36*** | (2006.01) |
| ***C08C 19/22*** | (2006.01) |
| ***C08C 19/25*** | (2006.01) |
| ***C08F 230/08*** | (2006.01) |
| ***C08F 236/04*** | (2006.01) |
| ***C08K 5/548*** | (2006.01) |
| ***C08L 9/00*** | (2006.01) |
| ***C08L 15/00*** | (2006.01) |
| ***C08L 7/00*** | (2006.01) |

(52) U.S. Cl.

CPC ... *C08L 9/06* (2013.01); *B60C 1/00* (2013.01); *B60C 1/0016* (2013.04); *C08C 19/22* (2013.01); *C08C 19/25* (2013.01); *C08F 230/08* (2013.01); *C08F 236/04* (2013.01); *C08K 3/36* (2013.01); *C08K 5/548* (2013.01); *C08L 7/00* (2013.01); *C08L 9/00* (2013.01); *C08L 15/00* (2013.01); *Y02T 10/862* (2013.01)

(58) Field of Classification Search

CPC ................................ B60C 1/0016; C08K 3/36
USPC ........................... 524/492, 493, 546; 526/279
See application file for complete search history.

(56) References Cited

U.S. PATENT DOCUMENTS

| | | | | |
|---|---|---|---|---|
| 4,929,679 | A | 5/1990 | Akita et al. | |
| 4,945,964 | A * | 8/1990 | Takiguchi et al. | 152/209.5 |
| 5,189,109 | A | 2/1993 | Imai et al. | |
| 5,574,109 | A | 11/1996 | Lawson et al. | |
| 5,679,744 | A | 10/1997 | Kawauzra et al. | |
| 5,834,552 | A | 11/1998 | Kawazura et al. | |
| 5,902,856 | A | 5/1999 | Suzuki et al. | |
| 5,932,662 | A | 8/1999 | Lawson et al. | |
| 5,932,866 | A | 8/1999 | Terada et al. | |
| 7,084,228 | B2 * | 8/2006 | Labauze et al. | 526/335 |
| 7,351,761 | B2 | 4/2008 | Hochi | |

(Continued)

FOREIGN PATENT DOCUMENTS

| | | | |
|---|---|---|---|
| CN | 1134434 | A | 10/1996 |
| CN | 1148606 | A | 4/1997 |
| CN | 1386786 | A | 12/2002 |
| CN | 1530379 | A | 9/2004 |
| CN | 1821293 | A | 8/2006 |
| CN | 1990532 | A | 7/2007 |
| CN | 101113217 | A | 1/2008 |
| CN | 101659729 | A | 3/2010 |
| CN | 101659731 | A | 3/2010 |
| CN | 101671418 | A | 3/2010 |

(Continued)

OTHER PUBLICATIONS

English Machine Translation for JP-2000-239444-A, published Sep. 5, 2000.

(Continued)

*Primary Examiner* — Vickey Nerangis
(74) *Attorney, Agent, or Firm* — Birch, Stewart, Kolasch & Birch, LLP

(57) ABSTRACT

Provided are: a rubber composition a achieving balanced improvement in processability, fuel economy, rubber strength, abrasion resistance, wet-grip performance, and handling stability, and a pneumatic tire including the composition. Included is a rubber composition including a conjugated diene polymer and a silica having $N_2SA$ of 40-400 $m^2/g$, the diene polymer being obtained by polymerizing a monomer component including a conjugated diene compound and a silicon-containing vinyl compound in the presence of a polymerization initiator of formula (I):

(I)

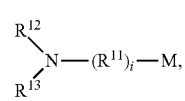

to produce, a copolymer, and reacting a compound containing nitrogen and/or silicon atoms with an active terminal of the copolymer, wherein the amount of the diene polymer is 1-90% by mass and the amount of a polyisoprene-based rubber is 0-70% by mass, each per 100% by mass of the rubber component, and the amount of the silica is 10-150 parts by mass per 100 parts by mass of the rubber component.

17 Claims, No Drawings

(56) References Cited

U.S. PATENT DOCUMENTS

| | | | | |
|---|---|---|---|---|
| 2004/0152845 | A1 | 8/2004 | Oshima et al. | |
| 2005/0209413 | A1 | 9/2005 | Labauze et al. | |
| 2006/0173118 | A1 | 8/2006 | Hochi et al. | |
| 2007/0149688 | A1 | 6/2007 | Hochi | |
| 2008/0289740 | A1 | 11/2008 | Mori et al. | |
| 2009/0247696 | A1* | 10/2009 | Fujii et al. | 524/572 |
| 2010/0048806 | A1 | 2/2010 | Inagaki et al. | |
| 2010/0056703 | A1 | 3/2010 | Oshima | |
| 2010/0056709 | A1 | 3/2010 | Oshima | |
| 2010/0056710 | A1 | 3/2010 | Oshima | |
| 2010/0056712 | A1 | 3/2010 | Oshima | |
| 2010/0056713 | A1 | 3/2010 | Oshima | |
| 2010/0144954 | A1 | 6/2010 | Kikuchi et al. | |
| 2010/0184908 | A1 | 7/2010 | Kikuchi et al. | |
| 2011/0166254 | A1 | 7/2011 | Nishimura | |
| 2011/0237737 | A1 | 9/2011 | Fujii et al. | |
| 2011/0245398 | A1 | 10/2011 | Hama et al. | |
| 2012/0190771 | A1 | 7/2012 | Ito et al. | |
| 2012/0283354 | A1 | 11/2012 | Hattori et al. | |
| 2013/0085225 | A1 | 4/2013 | Nishioka et al. | |
| 2014/0114014 | A1* | 4/2014 | Tokimune et al. | 524/547 |
| 2014/0213693 | A1* | 7/2014 | Mabuchi et al. | 523/156 |
| 2014/0213714 | A1* | 7/2014 | Ono et al. | 524/492 |
| 2014/0228501 | A1* | 8/2014 | Ono et al. | 524/493 |
| 2014/0256847 | A1* | 9/2014 | Sato et al. | 523/156 |
| 2014/0275430 | A1* | 9/2014 | Ishino et al. | 525/326.5 |
| 2014/0296376 | A1 | 10/2014 | Sato et al. | |
| 2014/0329930 | A1* | 11/2014 | Sato | 523/156 |
| 2014/0329931 | A1* | 11/2014 | Sato | 523/156 |

FOREIGN PATENT DOCUMENTS

| | | | |
|---|---|---|---|
| CN | 102093602 | A | 6/2011 |
| CN | 102093605 | A | 6/2011 |
| CN | 102108141 | A | 6/2011 |
| CN | 102603975 | A | 7/2012 |
| CN | 103003346 | A | 3/2013 |
| EP | 0 585 012 | A1 | 3/1994 |
| EP | 0 881 101 | A1 | 12/1998 |
| EP | 1 484 362 | A1 | 12/2004 |
| EP | 1 803 770 | A2 | 7/2007 |
| EP | 1 925 636 | A1 | 5/2008 |
| EP | 2 196 324 | A1 | 6/2010 |
| EP | 2 223 959 | A1 | 9/2010 |
| EP | 2 236 554 | A1 | 10/2010 |
| EP | 2 329 964 | A1 | 6/2011 |
| EP | 2 338 698 | A1 | 6/2011 |
| EP | 2 338 919 | A1 | 6/2011 |
| EP | 2 366 557 | A1 | 9/2011 |
| EP | 2 366 558 | A1 | 9/2011 |
| EP | 2 404 944 | A1 | 1/2012 |
| JP | 48-17674 | B1 | 5/1973 |
| JP | 56-131640 | A | 10/1981 |
| JP | 63-99249 | A | 4/1988 |
| JP | 63-99252 | A | 4/1988 |
| JP | 8-193147 | A | 7/1996 |
| JP | 8-231766 | A | 9/1996 |
| JP | 8-253520 | A | 10/1996 |
| JP | 2000-239444 | A | 9/2000 |
| JP | 2000-344955 | A | 12/2000 |
| JP | 2001-151940 | A | 6/2001 |
| JP | 2004-137463 | A | 5/2004 |
| JP | 2004-277696 | A | 10/2004 |
| JP | 2004-331940 | A | 11/2004 |
| JP | 2006-182940 | A | 7/2006 |
| JP | 2006/233177 | A | 9/2006 |
| JP | 2006-233177 | A | 9/2006 |
| JP | 2006-257260 | A | 9/2006 |
| JP | 2007-197671 | A | 8/2007 |
| JP | 2008-101158 | A | 5/2008 |
| JP | 2009-1721 | A | 1/2009 |
| JP | 2009-35643 | A | 2/2009 |
| JP | 2010-77412 | A | 4/2010 |
| JP | 2010-77413 | A | 4/2010 |
| JP | 2010-77414 | A | 4/2010 |
| JP | 2010-254852 | A | 11/2010 |
| JP | 2011-79913 | A | 4/2011 |
| JP | 2011-144324 | A | 7/2011 |
| JP | 2012-167257 | A | 9/2012 |
| WO | WO 2009/048006 | A1 | 4/2009 |
| WO | WO 2010/116988 | A1 | 10/2010 |
| WO | WO 2011/087004 | A1 | 7/2011 |
| WO | WO 2012/011571 | A1 | 1/2012 |

OTHER PUBLICATIONS

English Machine Translation for JP-2000-344955-A, published Dec. 12, 2000.

English Machine Translation for JP-2004-137463-A, published May 13, 2004.

English Machine Translation for JP-2011-144324-A, published Jul. 28, 2011.

English Machine Translation for JP-2011-79913-A, published Apr. 21, 2011.

* cited by examiner

RUBBER COMPOSITION, AND PNEUMATIC TIRE

TECHNICAL FIELD

The present invention relates to a rubber composition and a pneumatic tire formed from the rubber composition.

BACKGROUND ART

With the increase in concern about environmental issues, the demands on automobiles for better fuel economy have been increasing in recent years. Better fuel economy is also being required of rubber compositions used for automotive tires. For example, rubber compositions containing a conjugated diene polymer (e.g., polybutadiene, butadiene-styrene copolymer) and a filler (e.g., carbon black, silica) are used for automotive tires.

Patent Literature 1 proposes an example of a method for improving the fuel economy; this method uses a diene rubber (modified rubber) that is modified by an organosilicon compound containing an amino group and an alkoxy group. Although the use of a modified rubber increases reaction efficiency between silica and rubber (polymer) to improve the fuel economy, it tends to increase the Mooney viscosity so that the processability tends to deteriorate. Thus, good fuel economy and good processability cannot be achieved simultaneously. Furthermore, the use of a modified rubber may lead to excessively tight bond between silica and rubber so that the rubber strength and the abrasion resistance may decrease.

Additionally, as rubber compositions for automobile tires need to be excellent in wet-grip performance and handling stability in view of safety, a technique is desired which achieves a balanced improvement in these properties as well as fuel economy, processability, rubber strength and abrasion resistance at high levels.

CITATION LIST

Patent Literature

Patent Literature 1: JP 2000-344955 A

SUMMARY OF INVENTION

Technical Problem

An object of the present invention is to solve the problems identified above by providing a rubber composition capable of achieving a balanced improvement in processability, fuel economy, rubber strength, abrasion resistance, wet-grip performance, and handling stability, and by providing a pneumatic tire formed from the rubber composition.

Solution to Problem

The present invention relates to a rubber composition, including a conjugated diene polymer and a silica having a nitrogen adsorption specific surface area of 40 to 400 $m^2/g$, the conjugated diene polymer being obtained by polymerizing a monomer component including a conjugated diene compound and a silicon-containing vinyl compound in the presence of a polymerization initiator represented by the following formula (I):

(I)

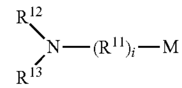

wherein i represents 0 or 1; $R^{11}$ represents a $C_{1-100}$ hydrocarbylene group; $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one, as a hetero atom, selected from the group consisting of a silicon atom, a nitrogen atom, and an oxygen atom; and M represents an alkali metal atom, to produce a copolymer, and then reacting a compound containing at least one of a nitrogen atom and a silicon atom with an active terminal of the copolymer, wherein an amount of the conjugated diene polymer is 1 to 90% by mass and an amount of a polyisoprene-based rubber is 0 to 70% by mass, each based on 100% by mass of a rubber component of the rubber composition, and an amount of the silica is 10 to 150 parts by mass for each 100 parts by mass of the rubber component.

$R^{11}$ in the formula (I) is preferably a group represented by the following formula (Ia):

$$—\!(CH_2)_n\!—R^{14}— \qquad \text{(Ia)}$$

wherein $R^{14}$ represents a hydrocarbylene group including at least one of a structural unit derived from a conjugated diene compound and a structural unit derived from an aromatic vinyl compound; and n represents an integer of 1 to 10.

$R^{14}$ in the formula (Ia) is preferably a hydrocarbylene group including from one to ten isoprene-derived structural unit(s).

The silicon-containing vinyl compound is preferably a compound represented by the following formula (II):

(II)

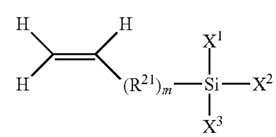

wherein m represents 0 or 1; $R^{21}$ represents a hydrocarbylene group; $X^1$, $X^2$, and $X^3$ each represent a substituted amino group, a hydrocarbyloxy group, or an optionally substituted hydrocarbyl group.

The conjugated diene polymer preferably contains a structural unit derived from an aromatic vinyl compound.

The silica preferably includes silica (1) having a nitrogen adsorption specific surface area of at least 50 $m^2/g$ but less than 120 $m^2/g$, and silica (2) having a nitrogen adsorption specific surface area of at least 120 $m^2/g$.

The rubber composition preferably includes a solid resin having a glass transition temperature of 60 to 120° C. in an amount of 1 to 30 parts by mass for each 100 parts by mass of the rubber component.

Preferably, the silica includes silica (1) having a nitrogen adsorption specific surface area of at least 50 $m^2/g$ but less than 120 $m^2/g$, and silica (2) having a nitrogen adsorption specific surface area of not less than 120 $m^2/g$, and the rubber composition includes a solid resin having a glass transition temperature of 60 to 120° C. in an amount of 1 to 30 parts by mass for each 100 parts by mass of the rubber component.

The rubber composition preferably includes a mercapto group-containing silane coupling agent in an amount of 0.5 to 20 parts by mass for each 100 parts by mass of the silica.

Preferably, the rubber composition includes a mercapto group-containing silane coupling agent in an amount of 0.5 to 20 parts by mass for each 100 parts by mass of the silica, and the silica includes silica (1) having a nitrogen adsorption specific surface area of at least 50 $m^2/g$ but less than 120 $m^2/g$, and silica (2) having a nitrogen adsorption specific surface area of not less than 120 $m^2/g$.

The rubber composition preferably includes a mercapto group-containing silane coupling agent in an amount of 0.5 to 20 parts by mass for each 100 parts by mass of the silica, and a solid resin having a glass transition temperature of 60 to 120° C. in an amount of 1 to 30 parts by mass for each 100 parts by mass of the rubber component.

Preferably, the rubber composition includes a mercapto group-containing silane coupling agent in an amount of 0.5 to 20 parts by mass for each 100 parts by mass of the silica, the silica includes silica (1) having a nitrogen adsorption specific surface area of at least 50 $m^2/g$ but less than 120 $m^2/g$, and silica (2) having a nitrogen adsorption specific surface area of not less than 120 $m^2/g$, and the rubber composition includes a solid resin having a glass transition temperature of 60 to 120° C. in an amount of 1 to 30 parts by mass for each 100 parts by mass of the rubber component.

Preferably, the rubber composition includes a mercapto group-containing silane coupling agent in an amount of 0.5 to 20 parts by mass for each 100 parts by mass of the silica, and the silane coupling agent is at least one of a compound represented by the formula (I) below, and a compound containing a linking unit A represented by the formula (2) below and a linking unit B represented by the formula (3) below, (1)

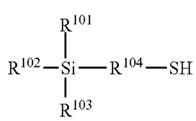

wherein $R^{101}$ to $R^{103}$ each represent a branched or unbranched $C_{1-12}$ alkyl group, a branched or unbranched $C_{1-12}$ alkoxy group, or a group represented by —O—($R^{111}$—O)$_z$—$R^{112}$ where z $R^{111}$s each represent a branched or unbranched $C_{1-30}$ divalent hydrocarbon group, and z $R^{111}$s may be the same as or different from one another; $R^{112}$ represents a branched or unbranched $C_{1-30}$ alkyl group, a branched or unbranched $C_{2-30}$ alkenyl group, a $C_{6-30}$ aryl group, or a $C_{7-30}$ aralkyl group; and z represents an integer of 1 to 30, and $R^{101}$ to $R^{103}$ may be the same as or different from one another; and $R^{104}$ represents a branched or unbranched $C_{1-6}$ alkylene group;

(2)

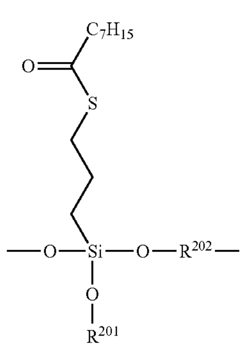

and

-continued (3)

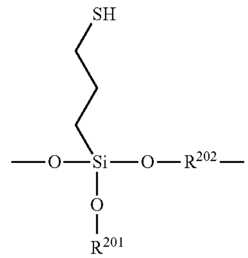

wherein $R^{201}$ represents a hydrogen atom, a halogen atom, a branched or unbranched $C_{1-30}$ alkyl group, a branched or unbranched $C_{2-30}$ alkenyl group, a branched or unbranched $C_{2-30}$ alkynyl group, or the alkyl group in which a terminal hydrogen atom is replaced with a hydroxyl group or a carboxyl group; $R^{202}$ represents a branched or unbranched $C_{1-30}$ alkylene group, a branched or unbranched $C_{2-30}$ alkenylene group, or a branched or unbranched $C_{2-30}$ alkynylene group; and $R^{201}$ and $R^{202}$ may be joined together to form a cyclic structure.

Preferably, the silica includes silica (1) having a nitrogen adsorption specific surface area of at least 50 $m^2/g$ but less than 120 $m^2/g$, and silica (2) having a nitrogen adsorption specific surface area of not less than 120 $m^2/g$, and the nitrogen adsorption specific surface areas and amounts of the silica (1) and the silica (2) satisfy the following inequalities:

(Nitrogen adsorption specific surface area of silica (2))/(Nitrogen adsorption specific surface area of silica 1))≥1.4, and (Amount of silica (1))×0.06≤(Amount of silica (2))≤(Amount of silica (1))×15.

Preferably, the rubber composition includes at least one of at least one liquid resin having a glass transition temperature of −40 to 20° C. selected from the group consisting of aromatic petroleum resins, terpene resins, and rosin resins, and a plasticizer having a glass transition temperature of −40 to 20° C., and a combined amount of the liquid resin and the plasticizer is 1 to 30 parts by mass for each 100 parts by mass of the rubber component.

The rubber composition preferably has a tan δ peak temperature of lower than −16° C.

The rubber composition is preferably for use in a tread.

The present invention also relates to a pneumatic tire, formed from the rubber composition.

Advantageous Effects of Invention

The rubber composition of the present invention is a rubber composition including a specific amount of a specific conjugated diene polymer and a specific amount of a specific silica. Thus, the rubber composition enables to provide a pneumatic tire that achieves a balanced improvement in processability, fuel economy, rubber strength, abrasion resistance, wet-grip performance, and handling stability.

DESCRIPTION OF EMBODIMENTS

As used herein, the hydrocarbyl group denotes a monovalent group provided by removing one hydrogen atom from a hydrocarbon; the hydrocarbylene group denotes a divalent group provided by removing two hydrogen atoms from a hydrocarbon; the hydrocarbyloxy group denotes a monovalent group provided by replacing the hydrogen atom of a hydroxyl group with a hydrocarbyl group; the substituted amino group denotes a group provided by replacing at least one hydrogen atom of an amino group with a monovalent atom other than a hydrogen atom or with a monovalent group, or denotes a group provided by replacing two hydrogen atoms of an amino group with a divalent group; the hydrocarbyl group having a substituent (hereinafter, also referred to as substituted hydrocarbyl group) denotes a monovalent group provided by replacing at least one hydrogen atom of a hydrocarbyl group with a substituent; and the hydrocarbylene group containing a hetero atom (hereinafter, also referred to as hetero atom-containing hydrocarbylene group) denotes a divalent group provided by replacing a hydrogen atom and/or a carbon atom other than the carbon atoms from which a hydrogen atom has been removed in a hydrocarbylene group with a group containing a hetero atom (an atom other than carbon and hydrogen atoms).

The conjugated diene polymer according to the present invention is obtained by polymerizing a monomer component including a conjugated diene compound and a silicon-containing vinyl compound in the presence of a polymerization initiator represented by the following formula (I):

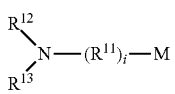

(I)

wherein i represents 0 or 1; $R^{11}$ represents a $C_{1-100}$ hydrocarbylene group; $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one, as a hetero atom, selected from the group consisting of a silicon atom, a nitrogen atom, and an oxygen atom; and M represents an alkali metal atom, to produce a copolymer, and then reacting a compound containing a nitrogen atom and/or a silicon atom with an active terminal of the copolymer.

As used herein, the term "modifying" means bonding a copolymer derived from a diene compound alone or with an aromatic vinyl compound, to a compound other than the compounds. The above conjugated diene polymer has a structure in which a polymerization initiation terminal is modified by the polymerization initiator represented by the formula (I); a main chain is modified by copolymerization with a silicon-containing vinyl compound; and a termination terminal is modified by a compound containing a nitrogen atom and/or a silicon atom, a silicon-containing vinyl compound. The use of the conjugated diene polymer in combination with other rubbers (e.g. polyisoprene-based rubbers) enables to disperse silica well and achieve a balanced improvement in fuel economy, rubber strength, abrasion resistance, wet-grip performance, and handling stability. In general, the use of a modified rubber in which all of an initiation terminal, a main chain and a termination terminal are modified tends to greatly deteriorate the processability. In contrast, the use of the conjugated diene polymer in which each of an initiation terminal, a main chain and a termination terminal is modified by a specific compound enables to ensure good processability, and furthermore, enables to synergistically enhance the effects of improving the fuel economy, rubber strength, abrasion resistance, wet-grip performance, and handling stability. Thus, a balanced improvement in processability, fuel economy, rubber strength, abrasion resistance, wet-grip performance, and handling stability can be achieved at high levels.

In the formula (I), i is 0 or 1, and preferably 1.

$R^{11}$ in the formula (I) is a $C_{1-100}$ hydrocarbylene group, preferably a $C_{6-100}$ hydrocarbylene group, and more preferably a $C_{7-80}$ hydrocarbylene group. If the $R^{11}$ has more than 100 carbon atoms, the polymerization initiator has an increased molecular weight, which may reduce the cost efficiency and the workability during the polymerization.

Plural kinds of compounds different in the carbon number of $R^{11}$ may be used in combination as the polymerization initiator represented by the formula (I).

$R^{11}$ in the formula (I) is preferably a group represented by the following formula (Ia):

$$-(CH_2)_n-R^{14}- \qquad \text{(Ia)}$$

wherein $R^{14}$ represents a hydrocarbylene group including a structural unit derived from a conjugated diene compound and/or a structural unit derived from an aromatic vinyl compound; and n represents an integer of 1 to 10.

$R^{14}$ in the formula (Ia) represents a hydrocarbylene group including a structural unit derived from a conjugated diene compound and/or a structural unit derived from an aromatic vinyl compound, preferably a hydrocarbylene group including an isoprene-derived structural unit, and more preferably a hydrocarbylene group including from one to ten isoprene-derived structural unit(s).

The number of the structural unit derived from a conjugated diene compound and/or the structural unit derived from an aromatic vinyl compound in $R^{14}$ is preferably from one to ten, and more preferably from one to five.

In the formula (Ia), n represents an integer of 1 to 10, and preferably an integer of 2 to 4.

Examples of $R^{11}$ include a group obtained by bonding from one to ten isoprene-derived structural unit(s) and a methylene group, a group obtained by bonding from one to ten isoprene-derived structural unit(s) and an ethylene group, and a group obtained by bonding from one to ten isoprene-derived structural unit(s) and a trimethylene group; and preferably a group obtained by bonding from one to ten isoprene-derived structural unit(s) and a trimethylene group.

In the formula (I), $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one, as a hetero atom, selected from the group consisting of a silicon atom, a nitrogen atom, and an oxygen atom.

The optionally substituted hydrocarbyl group is a hydrocarbyl group or substituted hydrocarbyl group. Examples of the substituent in the substituted hydrocarbyl group include a substituted amino group and a hydrocarbyloxy group. Examples of the hydrocarbyl group include acyclic alkyl groups such as a methyl group, an ethyl group, an n-propyl group, an isopropyl group, an n-butyl group, an isobutyl group, a sec-butyl group, a tert-butyl group, an n-pentyl group, an n-hexyl group, an n-octyl group, and an n-dodecyl group; cyclic alkyl groups such as a cyclopentyl group and a cyclohexyl group; and aryl groups such as a phenyl group and a benzyl group, and preferably acyclic alkyl groups, and more preferably $C_{1-4}$ acyclic alkyl groups. Examples of the substituted hydrocarbyl group in which the substituent is a substituted amino group include an N,N-dimethylaminomethyl group, a 2-N,N-dimethylaminoethyl group, and a 3-N,N-dimethylaminopropyl group. Examples of the substituted hydrocarbyl group in which the substituent is a hydrocarbyloxy group include a methoxymethyl group, a methoxyethyl group, and an ethoxymethyl group. Among the above examples, a hydrocarbyl group is preferable; a $C_{1-4}$ acyclic alkyl group is more preferable; and a methyl group or an ethyl group is still more preferable.

Examples of the trihydrocarbylsilyl group include a trimethylsilyl group, and a tert-butyl-dimethylsilyl group. A trimethylsilyl group is preferable.

The hydrocarbylene group optionally containing at least one, as a hetero atom, selected from the group consisting of a silicon atom, a nitrogen atom, and an oxygen atom is a hydrocarbylene group, or a hetero atom-containing hydrocarbylene group in which the hetero atom is at least one selected from the group consisting of a silicon atom, a nitrogen atom and an oxygen atom. Examples of the hetero atom-containing hydrocarbylene group in which the hetero atom is at least one selected from the group consisting of a silicon atom, a nitrogen atom and an oxygen atom include a hetero atom-containing hydrocarbylene group in which the hetero atom is a silicon atom, a hetero atom-containing hydrocarbylene group in which the hetero atom is a nitrogen atom, and a hetero atom-containing hydrocarbylene group in which the hetero atom is an oxygen atom. Examples of the hydrocarbylene group include alkylene groups such as a tetramethylene group, a pentamethylene group, a hexamethylene group, a pent-2-ene-1,5-diyl group, and a 2,2,4-trimethylhexane-1,6-diyl group; and alkenediyl groups such as a pent-2-ene-1,5-diyl group, and preferably alkylene groups, and more preferably $C_{4-7}$ alkylene groups. Examples of the hetero atom-containing hydrocarbylene group in which the hetero atom is a silicon atom include a group represented by —$Si(CH_3)_2$—$CH_2$—$CH_2$—$Si(CH_3)_2$—. Examples of the hetero atom-containing hydrocarbylene group in which the hetero atom is a nitrogen atom include a group represented by —CH═N—CH═CH— and a group represented by —CH—N—$CH_2$—$CH_2$—. Examples of the hetero atom-containing hydrocarbylene group in which the hetero atom is an oxygen atom include a group represented by —$CH_2$—$CH_2$—O—$CH_2$—$CH_2$—. Among the above examples, a hydrocarbylene group is preferable; a $C_{4-7}$ alkylene group is more preferable; and a tetramethylene group, a pentamethylene group, and a hexamethylene group are still more preferable.

Preferably, $R^{12}$ and $R^{13}$ each are a hydrocarbyl group, or $R^{12}$ and $R^{13}$ are bonded to each other to form a hydrocarbylene group. More preferably, $R^{12}$ and $R^{13}$ each are a $C_{1-4}$ acyclic alkyl group, or $R^{12}$ and $R^{13}$ are bonded to each other to form a $C_{4-7}$ alkylene group. Still more preferably, $R^{12}$ and $R^{13}$ each are a methyl group or an ethyl group.

M in the formula (I) represents an alkali metal atom. Examples of the alkali metal atom include Li, Na, K, and Cs; and a preferable example thereof is Li.

The polymerization initiator represented by the formula (I) in which i is 1 may be a compound formed from one to five isoprene-derived structural unit(s) polymerized with an aminoalkyllithium compound. Examples of the aminoalkyllithium compound include N,N-dialkylaminoalkyllithiums such as 3-(N,N-dimethylamino)-1-propyllithium, 3-(N,N-diethylamino)-1-propyllithium, 3-(N,N-di-n-butylamino)-1-propyllithium, 4-(N,N-dimethylamino)-1-butyllithium, 4-(N,N-diethylamino)-1-butyllithium, 4-(N,N-di-n-propylamino)-1-butyllithium, and 3-(N,N-di-n-butylamino)-1-butyllithium; hetero atom-free cyclic aminoalkyllithium compounds such as 3-(1-pyrrolidino)-1-propyllithium, 3-(1-piperidino)-1-propyllithium, 3-(1-hexamethyleneimino)-1-propyllithium, and 3-[1-(1,2,3,6-tetrahydropyridino)]-1-propyllithium; and hetero atom-containing cyclic aminoalkyllithium compounds such as 3-(1-morpholino)-1-propyllithium, 3-(1-imidazolyl)-1-propyllithium, 3-(4,5-dihydro-1-imidazolyl)-1-propyllithium, and 3-(2,2,5,5-tetramethyl-1-aza-2,5-disila-1-cyclopentyl)-1-propyllithium, and preferably N,N-dialkylaminoalkyllithium, and more preferably 3-(N,N-dimethylamino)-1-propyllithium or 3-(N,N-diethylamino)-1-propyllithium.

Examples of the polymerization initiator represented by the formula (I) in which i is 0 include lithium hexamethyleneimide, lithium pyrrolidide, lithium piperidide, lithium heptamethyleneimide, lithium dodecamethyleneimide, lithium dimethylamide, lithium diethylamide, lithium dipropylamide, lithium dibutylamide, lithium dihexylamide, lithium diheptylamide, lithium dioctylamide, lithium di-2-ethylhexylamide, lithium didecylamide, lithium-N-methylpiperadide, lithium ethylpropylamide, lithium ethylbutylamide, lithium methylbutylamide, lithium ethylbenzylamide, and lithium methylphenethylamide.

The polymerization initiator represented by the formula (I) in which i is 0 may be prepared in advance from a secondary amine and a hydrocarbyllithium compound before it is used for the polymerization reaction, or may be prepared in the polymerization system. Examples of the secondary amine include dimethylamine, diethylamine, dibutylamine, dioctylamine, dicyclohexylamine, and diisobutylamine. Other examples thereof include cyclic amines, such as azacycloheptane (i.e. hexamethyleneimine), 2-(2-ethylhexyl)pyrrolidine, 3-(2-propyl)pyrrolidine, 3,5-bis(2-ethylhexyl)piperidine, 4-phenylpiperidine, 7-decyl-1-azacyclotridecane, 3,3-dimethyl-1-azacyclotetradecane, 4-dodecyl-1-azacyclooctane, 4-(2-phenylbutyl)-1-azacyclooctane, 3-ethyl-5-cyclohexyl-1-azacycloheptane, 4-hexyl-1-azacycloheptane, 9-isoamyl-1-azacycloheptadecane, 2-methyl-1-azacycloheptadec-9-ene, 3-isobutyl-1-azacyclododecane, 2-methyl-7-t-butyl-1-azacyclododecane, 5-nonyl-1-azacyclododecane, 8-(4-methylphenyl)-5-pentyl-3-azabicyclo[5.4.0]undecane, 1-butyl-6-azabicyclo[3.2.1]octane, 8-ethyl-3-azabicyclo[3.2.1]octane, 1-propyl-3-azabicyclo[3.2.2]nonane, 3-(t-butyl)-7-azabicyclo[4.3.0]nonane, and 1,5,5-trimethyl-3-azabicyclo[4.4.0]decane.

The polymerization initiator represented by the formula (I) is preferably a compound in which i is 1, more preferably a compound formed from one to five isoprene-derived structural unit(s) polymerized with N,N-aminoalkyllithium, and still more preferably a compound formed from one to five isoprene-derived structural unit(s) polymerized with 3-(N,N-dimethylamino)-1-propyllithium or 3-(N,N-diethylamino)-1-propyllithium.

The amount of the polymerization initiator represented by the formula (I) to be used is preferably 0.01 to 15 mmol, and more preferably 0.1 to 10 mmol, for each 100 g of the monomer component used in the polymerization.

In the present invention, other polymerization initiators, such as n-butyllithium, may be used in combination, if necessary.

Examples of the conjugated diene compound include 1,3-butadiene, isoprene, 1,3-pentadiene, 2,3-dimethyl-1,3-butadiene, 1,3-hexadiene, and myrcene. Any of these may be used alone or two or more of these may be used in combination. In view of easy availability, the conjugated diene compound is preferably 1,3-butadiene or isoprene.

The silicon-containing vinyl compound is preferably a compound represented by the following formula (II):

(II)

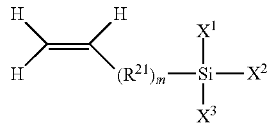

wherein m represents 0 or 1; $R^{21}$ represents a hydrocarbylene group; $X^1$, $X^2$ and $X^3$ each represent a substituted amino group, a hydrocarbyloxy group, or an optionally substituted hydrocarbyl group.

Here, m in the formula (II) is 0 or 1, and preferably 0.

Examples of the hydrocarbylene group in the formula (II) include an alkylene group, an alkenediyl group, an arylene group, and a group in which an arylene group and an alkylene group are bonded. Examples of the alkylene group include a methylene group, an ethylene group, and a trimethylene group. Examples of the alkenediyl group include a vinylene group and an ethylene-1,1-diyl group. Examples of the arylene group include a phenylene group, a naphthylene group, and a biphenylene group. Examples of the group in which an arylene group and an alkylene group are bonded include a group in which a phenylene group and a methylene group are bonded, and a group in which a phenylene group and an ethylene group are bonded.

$R^{21}$ is preferably an arylene group, and more preferably a phenylene group.

In the formula (II), $X^1$, $X^2$ and $X^3$ each are a substituted amino group, a hydrocarbyloxy group, or an optionally substituted hydrocarbyl group. Preferably, at least one of $X^1$, $X^2$ and $X^3$ is a substituted amino group. More preferably, two of $X^1$, $X^2$ and $X^3$ are substituted amino groups.

In the formula (II), the substituted amino group is preferably a group represented by the following formula (IIa):

(IIa)

wherein $R^{22}$ and $R^{23}$ each represent an optionally substituted hydrocarbyl group or a trihydrocarbylsilyl group, or $R^{22}$ and $R^{23}$ are bonded to each other to form a hydrocarbylene group optionally containing, as a hetero atom, a nitrogen atom and/or an oxygen atom.

The optionally substituted hydrocarbyl group in the formula (IIa) is a hydrocarbyl group or a substituted hydrocarbyl group. Examples of the substituted hydrocarbyl group include a substituted hydrocarbyl group in which the substituent is a hydrocarbyloxy group. Examples of the hydrocarbyl group include acyclic alkyl groups such as a methyl group, an ethyl group, an n-propyl group, an isopropyl group, an n-butyl group, an isobutyl group, a sec-butyl group, a tert-butyl group, an n-pentyl group, an n-hexyl group, and an n-octyl group; cyclic alkyl groups such as a cyclopentyl group and a cyclohexyl group; and aryl groups such as a phenyl group, a benzyl group, and a naphthyl group. The hydrocarbyl group is preferably an acyclic alkyl group, and more preferably a methyl group or an ethyl group. Examples of the substituted hydrocarbyl group in which the substituent is a hydrocarbyloxy group include alkoxyalkyl groups such as a methoxymethyl group, an ethoxymethyl group, and a methoxyethyl group; and aryloxyalkyl groups such as a phenoxymethyl group.

Examples of the trihydrocarbylsilyl group in the formula (IIa) include trialkylsilyl groups such as a trimethylsilyl group, a triethylsilyl group, and a tert-butyldimethylsilyl group.

The hydrocarbylene group optionally containing, as a hetero atom, a nitrogen atom and/or an oxygen atom in the formula (IIa) is a hydrocarbylene group, or a hetero atom-containing hydrocarbylene group in which the hetero atom is a nitrogen atom and/or an oxygen atom. Examples of the hetero atom-containing hydrocarbylene group in which the hetero atom is a nitrogen atom and/or an oxygen atom include a hydrocarbylene group containing a nitrogen atom as a hetero atom, and a hydrocarbylene group containing an oxygen atom as a hetero atom. Examples of the hydrocarbylene group include alkylene groups such as a trimethylene group, a tetramethylene group, a pentamethylene group, a hexamethylene group, a heptamethylene group, an octamethylene group, a decamethylene group, a dodecamethylene group, and a 2,2,4-trimethylhexane-1,6-diyl group; and alkenediyl groups such as a pent-2-ene-1,5-diyl group. Examples of the hetero atom-containing hydrocarbylene group in which the hetero atom is a nitrogen atom include a group represented by —CH═N—CH═CH— and a group represented by —CH═N—$CH_2$—$CH_2$—. Examples of the hetero atom-containing hydrocarbylene group in which the hetero atom is an oxygen atom include a group represented by —$CH_2$—$CH_2$—O—$CH_2$—$CH_2$—.

Preferably, $R^{22}$ and $R^{23}$ each are an alkyl group, or $R^{22}$ and $R^{23}$ are bonded to each other to form an alkylene group. $R^{22}$ and $R^{23}$ each are more preferably an alkyl group, and still more preferably a methyl group or an ethyl group.

Examples of the substituted amino group represented by the formula (IIa) in which $R^{22}$ and $R^{23}$ each are a hydrocarbyl group include dialkylamino groups such as a dimethylamino group, a diethylamino group, an ethylmethylamino group, a di-n-propylamino group, a diisopropylamino group, a di-n-butylamino group, a diisobutylamino group, a di-sec-butylamino group, and a di-tert-butylamino group; and diarylamino groups such as a diphenylamino group. Preferable examples thereof include dialkylamino groups, and more preferable examples thereof include dimethylamino groups, diethylamino groups, and di-n-butylamino groups. Examples of the substituted amino group in which $R^{22}$ and $R^{23}$ each are a substituted hydrocarbyl group in which the substituent is a hydrocarbyloxy group include di(alkoxyalkyl)amino groups such as a di(methoxymethyl)amino group and a di(ethoxymethyl)amino group. Examples of the substituted amino group in which $R^{22}$ and $R^{23}$ each are a trihydrocarbylsilyl group include trialkylsilyl group-containing amino groups such as a bis(trimethylsilyl)amino group, a bis(tert-butyldimethylsilyl)amino group, and an N-trimethylsilyl-N-methylamino group.

Examples of the substituted amino group represented by the formula (IIa) in which $R^{22}$ and $R^{23}$ are bonded to each other to form a hydrocarbylene group include 1-alkyleneimino groups such as a 1-trimethyleneimino group, a 1-pyrrolidino group, a 1-piperidino group, a 1-hexamethyleneimino group, a 1-heptamethyleneimino group, a 1-octamethyleneimino group, a 1-decamethyleneimino group, and a 1-dodecamethyleneimino group. Examples of the substituted amino group in which $R^{22}$ and $R^{23}$ are bonded to each other to form a hydrocarbylene group containing a nitrogen atom as a hetero atom include a 1-imidazolyl group and a 4,5-dihydro-1-imidazolyl group. Examples of the substituted amino group in which $R^{22}$ and $R^{23}$ are bonded to each other to form a hydrocarbylene group containing an oxygen atom as a hetero atom include a morpholino group.

The substituted amino group represented by the formula (IIa) is preferably a dialkylamino group or a 1-alkyleneimino group; more preferably a dialkylamino group; and still more preferably a dimethylamino group, a diethylamino group, or a di-n-butylamino group.

Examples of the hydrocarbyloxy group in the formula (II) include alkoxy groups such as a methoxy group, an ethoxy group, an n-propoxy group, an isopropoxy group, an n-butoxy group, a sec-butoxy group, and a tert-butoxy group; and aryloxy groups such as a phenoxy group and a benzyloxy group.

The optionally substituted hydrocarbyl group in the formula (II) is a hydrocarbyl group or a substituted hydrocarbyl group. Examples of the substituted hydrocarbyl group include a substituted hydrocarbyl group in which the substituent is a hydrocarbyloxy group. Examples of the hydrocarbyl group include alkyl groups such as a methyl group, an ethyl group, an n-propyl group, an isopropyl group, an n-butyl group, a sec-butyl group, and a tert-butyl group; and aryl groups such as a phenyl group, a 4-methyl-1-phenyl group, and a benzyl group. Examples of the substituted hydrocarbyl group in which the substituent is a hydrocarbyloxy group include alkoxyalkyl groups such as a methoxymethyl group, an ethoxymethyl group, and an ethoxyethyl group.

Examples of the silicon-containing vinyl compound represented by the formula (II) in which one of $X^1$, $X^2$, and $X^3$ is a substituted amino group, and m is 0 include (dialkylamino)dialkylvinylsilanes such as (dimethylamino)dimethylvinylsilane, (ethylmethylamino)dimethylvinylsilane, (di-n-propylamino)dimethylvinylsilane, (diisopropylamino)dimethylvinylsilane, (dimethylamino)diethylvinylsilane, (ethylmethylamino)diethylvinylsilane, (di-n-propylamino)diethylvinylsilane, and (diisopropylamino)diethylvinylsilane; [bis(trialkylsilyl)amino]dialkylvinylsilanes such as [bis(trimethylsilyl)amino]dimethylvinylsilane, [bis(t-butyldimethylsilyl)amino]dimethylvinylsilane, [bis(trimethylsilyl)amino]diethylvinylsilane, and [bis(t-butyldimethylsilyl)amino]diethylvinylsilane; (dialkylamino)di(alkoxyalkyl)vinylsilanes such as (dimethylamino)di(methoxymethyl)vinylsilane, (dimethylamino)di(methoxyethyl)vinylsilane, (dimethylamino)di(ethoxymethyl)vinylsilane, (dimethylamino)di(ethoxyethyl)vinylsilane, (diethylamino)di(methoxymethyl)vinylsilane, (diethylamino)di(methoxyethyl)vinylsilane, (diethylamino)di(ethoxymethyl)vinylsilane, and (diethylamino)di(ethoxyethyl)vinylsilane; and cyclic aminodialkylvinylsilane compounds such as pyrrolidinodimethylvinylsilane, piperidinodimethylvinylsilane, hexamethyleneiminodimethylvinylsilane, 4,5-dihydro-imidazolyldimethylvinylsilane, and morpholinodimethylvinylsilane.

Examples of the silicon-containing vinyl compound represented by the formula (II) in which one of $X^1$, $X^2$, and $X^3$ is a substituted amino group, and m is 1 include (dialkylamino)dialkylvinylphenylsilanes such as (dimethylamino)dimethyl-4-vinylphenylsilane, (dimethylamino)dimethyl-3-vinylphenylsilane, (diethylamino)dimethyl-4-vinylphenylsilane, (diethylamino)dimethyl-3-vinylphenylsilane, (di-n-propylamino)dimethyl-4-vinylphenylsilane, (di-n-propylamino)dimethyl-3-vinylphenylsilane, (di-n-butylamino)dimethyl-4-vinylphenylsilane, (di-n-butylamino)dimethyl-3-vinylphenylsilane, (dimethylamino)diethyl-4-vinylphenylsilane, (dimethylamino)diethyl-3-vinylphenylsilane, (diethylamino)diethyl-4-vinylphenylsilane, (diethylamino)diethyl-3-vinylphenylsilane, (di-n-propylamino)diethyl-4-vinylphenylsilane, (di-n-propylamino)diethyl-3-vinylphenylsilane, (di-n-butylamino)diethyl-4-vinylphenylsilane, and (di-n-butylamino)diethyl-3-vinylphenylsilane.

Examples of the silicon-containing vinyl compound represented by the formula (II) in which two of $X^1$, $X^2$, and $X^3$ each are a substituted amino group, and m is 0 include bis(dialkylamino)alkylvinylsilanes such as bis(dimethylamino)methylvinylsilane, bis(diethylamino)methylvinylsilane, bis(di-n-propylamino)methylvinylsilane, bis(di-n-butylamino)methylvinylsilane, bis(dimethylamino)ethylvinylsilane, bis(diethylamino)ethylvinylsilane, bis(di-n-propylamino)ethylvinylsilane, and bis(di-n-butylamino)ethylvinylsilane; bis[bis(trialkylsilyl)amino]alkylvinylsilanes such as bis[bis(trimethylsilyl)amino]methylvinylsilane, bis[bis(tert-butyldimethylsilyl)amino]methylvinylsilane, bis[bis(trimethylsilyl)amino]ethylvinylsilane, and bis[bis(tert-butyldimethylsilyl)amino]ethylvinylsilane; bis(dialkylamino)alkoxyalkylsilanes such as bis(dimethylamino)methoxymethylvinylsilane, bis(dimethylamino)methoxyethylvinylsilane, bis(dimethylamino)ethoxymethylvinylsilane, bis(dimethylamino)ethoxyethylvinylsilane, bis(diethylamino)methoxymethylvinylsilane, bis(diethylamino)methoxyethylvinylsilane, bis(diethylamino)ethoxymethylvinylsilane, and bis(dimethylamino)ethoxyethylvinylsilane; and bis(cyclic amino)alkylvinylsilane compounds such as bis(pyrrolidino)methylvinylsilane, bis(piperidino)methylvinylsilane, bis(hexamethyleneimino)methylvinylsilane, bis(4,5-dihydroimidazolyl)methylvinylsilane, and bis(morpholino)methylvinylsilane.

Examples of the silicon-containing vinyl compound represented by the formula (II) in which two of $X^1$, $X^2$, and $X^3$ each are a substituted amino group, and m is 1 include bis(dialkylamino)alkylvinylphenylsilanes such as bis(dimethylamino)methyl-4-vinylphenylsilane, bis(dimethylamino)methyl-3-vinylphenylsilane, bis(diethylamino)methyl-4-vinylphenylsilane, bis(diethylamino)methyl-3-vinylphenylsilane, bis(di-n-propylamino)methyl-4-vinylphenylsilane, bis(di-n-propylamino)methyl-3-vinylphenylsilane, bis(di-n-butylamino)methyl-4-vinylphenylsilane, bis(di-n-butylamino)methyl-3-vinylphenylsilane, bis(dimethylamino)ethyl-4-vinylphenylsilane, bis(dimethylamino)ethyl-3-vinylphenylsilane, bis(diethylamino)ethyl-4-vinylphenylsilane, bis(diethylamino)ethyl-3-vinylphenylsilane, bis(di-n-propylamino)ethyl-4-vinylphenylsilane, bis(di-n-propylamino)ethyl-3-vinylphenylsilane, bis(di-n-butylamino)ethyl-4-vinylphenylsilane, and bis(di-n-butylamino)ethyl-3-vinylphenylsilane.

Examples of the silicon-containing vinyl compound represented by the formula (II) in which three of $X^1$, $X^2$, and $X^3$ each are a substituted amino group, and m is 0 include tris(dialkylamino)vinylsilanes such as tris(dimethylamino)vinylsilane, tris(diethylamino)vinylsilane, tris(di-n-propylamino)vinylsilane, and tris(di-n-butylamino)vinylsilane.

Examples of the silicon-containing vinyl compound represented by the formula (II) in which three of $X^1$, $X^2$, and $X^3$ each are a substituted amino group, and m is 1 include tris(dialkylamino)vinylphenylsilanes such as tris(dimethylamino)-4-vinylphenylsilane, tris(dimethylamino)-3-vinylphenylsilane, tris(diethylamino)-4-vinylphenylsilane, tris(diethylamino)-3-vinylphenylsilane, tris(di-n-propylamino)-4-vinylphenylsilane, tris(di-n-propylamino)-3-vinylphenylsilane, tris(di-n-butylamino)-4-vinylphenylsilane, and tris(di-n-butylamino)-3-vinylphenylsilane.

Examples of the silicon-containing vinyl compound represented by the formula (II) in which X', $X^2$, and $X^3$ are not a substituted amino group, and m is 0 include trialkoxyvinylsilanes such as trimethoxyvinylsilane, triethoxyvinylsilane, and tripropoxyvinylsilane; dialkoxyalkylvinylsilanes such as methyldimethoxyvinylsilane and methyldiethoxyvinylsilane; dialkoxyarylvinylsilanes such as di(tert-pentoxy)phenylvinylsilane and di(tert-butoxy)phenylvinylsilane; monoalkoxydialkylvinylsilanes such as dimethylmethoxyvinylsilane; monoalkoxydiarylvinylsilanes such as tert-butoxydiphenylvinylsilane and tert-pentoxydiphenylvinylsilane; monoalkoxyalkylarylvinylsilanes such as tert-butoxymethylphenylvinylsilane and tert-butoxyethylphenylvinylsilane; and substituted alkoxyvinylsilane compounds such as tris(β-methoxyethoxy)vinylsilane.

Moreover, examples of the silicon-containing vinyl compound include bis(trialkylsilyl)-aminostyrenes such as 4-N,N-bis(trimethylsilyl)aminostyrene and 3-N,N-bis(trimethylsilyl)aminostyrene; and bis(trialkylsilyl)aminoalkylstyrenes such as 4-bis(trimethylsilyl)aminomethylstyrene, 3-bis(trimethylsilyl)aminomethylstyrene, 4-bis(trimethylsilyl)aminoethylstyrene, and 3-bis(trimethylsilyl)aminoethylstyrene.

The silicon-containing vinyl compound is preferably a compound represented by the formula (II), more preferably a compound represented by the formula (II) in which m is 0, and still more preferably a compound represented by the formula (II) in which two of $X^1$, $X^2$ and $X^3$ are dialkyl amino groups.

The silicon-containing vinyl compound is particularly preferably bis(dimethylamino)methylvinylsilane, bis(diethylamino)methylvinylsilane, or bis(di-n-butylamino)methylvinylsilane.

The amount of the silicon-containing vinyl compound used in production of the conjugated diene polymer is preferably not less than 0.01% by mass, more preferably not less than 0.02% by mass, and still more preferably not less than 0.05% by mass based on 100% by mass of the total amount of the monomer component used in the polymerization for achieving a balanced enhancement in processability, fuel economy, rubber strength, abrasion resistance, wet-grip performance, and handling stability. The amount is preferably not more than 20% by mass, more preferably not more than 2% by mass, and still more preferably not more than 1% by mass for achieving better cost efficiency and higher rubber strength.

In the production of the conjugated diene polymer, the monomer component may further include polymerizable monomers in addition to the conjugated diene compound and silicon-containing vinyl compound. These monomers include aromatic vinyl compounds, vinyl nitriles, and unsaturated carboxylic acid esters. Examples of the aromatic vinyl compounds include styrene, α-methylstyrene, vinyltoluene, vinylnaphthalene, divinylbenzene, trivinylbenzene, and divinylnaphthalene. Examples of the vinyl nitriles include acrylonitrile. Examples of the unsaturated carboxylic acid esters include methyl acrylate, ethyl acrylate, methyl methacrylate, and ethyl methacrylate. Aromatic vinyl compounds are preferable, and styrene is more preferable among the above examples.

In the case where an aromatic vinyl compound is used in the production of the conjugated diene polymer, the amount of the aromatic vinyl compound based on 100% by mass of the combined amount of the conjugated diene compound and the aromatic vinyl compound is preferably not less than 10% by mass (the amount of the conjugated diene compound is not more than 90% by mass), and more preferably not less than 15% by mass (the amount of the conjugated diene compound is not more than 85% by mass). Moreover, from a viewpoint of fuel economy, the amount of the aromatic vinyl compound is preferably not more than 50% by mass (the amount of the conjugated diene compound is not less than 50% by mass), and more preferably not more than 45% by mass (the amount of the conjugated diene compound is not less than 55% by mass).

In the production of the conjugated diene polymer, polymerization is preferably performed in a hydrocarbon solvent that does not inactivate the polymerization initiator represented by the formula (I). Examples of the hydrocarbon solvent include aliphatic hydrocarbons, aromatic hydrocarbons, and alicyclic hydrocarbons. Examples of the aliphatic hydrocarbons include propane, n-butane, iso-butane, n-pentane, iso-pentane, n-hexane, n-heptane, and n-octane. Examples of the aromatic hydrocarbons include benzene, toluene, xylene, and ethylbenzene. Examples of the alicyclic hydrocarbons include cyclopentane and cyclohexane. The hydrocarbon solvent may be a mixture of various components, such as industrial hexane. It is preferably a $C_{2-12}$ hydrocarbon.

The polymerization reaction may be performed in the presence of an agent for adjusting the vinyl bond content of conjugated diene units, or an agent for adjusting the distribution of a conjugated diene unit and a monomer unit based on a monomer other than conjugated dienes in conjugated diene polymer chains (hereinafter, referred to collectively as "adjusting agents"). Examples of the agents include ether compounds, tertiary amine compounds, and phosphine compounds. Examples of the ether compounds include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Examples of the tertiary amine compounds include triethylamine, tripropylamine, tributylamine, N,N,N',N'-tetramethylethylenediamine, N,N-diethylaniline, pyridine, and quinoline. Examples of the phosphine compounds include trimethylphosphine, triethylphosphine, and triphenylphosphine. One or more of them are used.

In the production of the conjugated diene polymer, the polymerization initiator may be supplied to a polymerization reactor before the monomer component is supplied to the polymerization reactor; or the polymerization initiator may be supplied to the polymerization reactor after the whole amount of the monomer component used in polymerization is supplied to the polymerization reactor; or the polymerization initiator may be supplied to the polymerization reactor after a part of the monomer component used in polymerization is supplied to the polymerization reactor. The polymerization initiator may be supplied at once or continuously to the polymerization reactor.

In the production of the conjugated diene polymer, the monomer component may be supplied at once, continuously, or intermittently to the polymerization reactor. Moreover, monomers may be supplied individually or simultaneously to the polymerization reactor.

In the production of the conjugated diene polymer, the polymerization temperature is usually 25 to 100° C., preferably 35 to 90° C., and more preferably 50 to 80° C. The polymerization time is usually 10 minutes to 5 hours.

The conjugated diene polymer is obtained by polymerizing a monomer component including a conjugated diene compound and a silicon-containing vinyl compound in the presence of a polymerization initiator represented by the formula (I) to produce a copolymer, and then reacting a compound containing a nitrogen atom and/or a silicon atom with an active terminal of the copolymer (the active terminal of the copolymer is considered to contain an alkali metal derived from the polymerization initiator) (terminal modification reaction). Specifically, the conjugated diene polymer is obtained by adding a compound containing a nitrogen atom and/or a silicon atom to a polymerization solution and then mixing them. The amount of the compound containing a nitrogen atom and/or a silicon atom to be added to the polymerization solution is usually 0.1 to 3 mol, preferably 0.5 to 2 mol, and more preferably 0.7 to 1.5 mol, per mol of the alkali metal derived from the polymerization initiator represented by the formula (I).

The terminal modification reaction is performed usually at a temperature from 25 to 100° C., preferably from 35 to 90° C., and more preferably from 50 to 80° C. The time period for the reaction is usually 60 seconds to 5 hours, preferably 5 minutes to 1 hour, and more preferably 15 minutes to 1 hour.

Preferable examples of the compound containing a nitrogen atom and/or a silicon atom include a compound containing a nitrogen atom and a carbonyl group.

The compound containing a nitrogen atom and a carbonyl group is preferably a compound represented by the following formula (III):

(III)

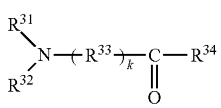

wherein $R^{31}$ represents an optionally substituted hydrocarbyl group, or is bonded with $R^{32}$ to form a hydrocarbylene group optionally containing, as a hetero atom, a nitrogen atom and/or an oxygen atom, or is bonded with $R^{34}$ to form a divalent group; $R^{32}$ represents an optionally substituted hydrocarbyl group, or is bonded with $R^{31}$ to form a hydrocarbylene group optionally containing, as a hetero atom, a nitrogen atom and/or an oxygen atom; and $R^{34}$ represents an optionally substituted hydrocarbyl group, or a hydrogen atom, or is bonded with $R^{31}$ to form a divalent group; $R^{33}$ represents a divalent group; and k represents 0 or 1.

In the formula (III), the optionally substituted hydrocarbyl group in $R^{31}$, $R^{32}$ or $R^{34}$ is a hydrocarbyl group or a substituted hydrocarbyl group. Examples of the substituted hydrocarbyl group include a substituted hydrocarbyl group in which the substituent is a hydrocarbyloxy group, and a substituted hydrocarbyl group in which the substituent is a substituted amino group. Examples of the hydrocarbyl group include alkyl groups such as a methyl group, an ethyl group, an n-propyl group, an isopropyl group, and an n-butyl group; alkenyl groups such as a vinyl group, an allyl group, and an isopropenyl group; and aryl groups such as a phenyl group. Examples of the substituted hydrocarbyl group in which the substituent is a hydrocarbyloxy group include alkoxyalkyl groups such as a methoxymethyl group, an ethoxymethyl group, and an ethoxyethyl group. Examples of the substituted hydrocarbyl group in which the substituent is a substituted amino group include (N,N-dialkylamino)alkyl groups such as a 2-(N,N-dimethylamino)ethyl group, a 2-(N,N-diethylamino)ethyl group, a 3-(N,N-dimethylamino)propyl group, and a 3-(N,N-diethylamino)propyl group; (N,N-dialkylamino)aryl groups such as a 4-(N,N-dimethylamino)phenyl group, a 3-(N,N-dimethylamino)phenyl group, a 4-(N,N-diethylamino)phenyl group, and a 3-(N,N-diethylamino)phenyl group; (N,N-dialkylamino)alkylaryl groups such as a 4-(N,N-dimethylamino)methylphenyl group and a 4-(N,N-dimethylamino)ethylphenyl group; cyclic amino group-containing alkyl groups such as a 3-pyrrolidinopropyl group, a 3-piperidinopropyl group, and a 3-imidazolylpropyl group; cyclic amino group-containing aryl groups such as a 4-pyrrolidinophenyl group, a 4-piperidinophenyl group, and a 4-imidazolylphenyl group; and cyclic amino group-containing alkylaryl groups such as a 4-pyrrolidinoethylphenyl group, a 4-piperidinoethylphenyl group, and a 4-imidazolylethylphenyl group.

In the formula (III), the hydrocarbylene group optionally containing, as a hetero atom, a nitrogen atom and/or an oxygen atom, formed by bonding of $R^{31}$ and $R^{32}$, is a hydrocarbylene group or a hetero atom-containing hydrocarbylene group in which the hetero atom is a nitrogen atom and/or an oxygen atom. Examples of the hetero atom-containing hydrocarbylene group in which the hetero atom is a nitrogen atom and/or an oxygen atom include a hetero atom-containing hydrocarbylene group in which the hetero atom is a nitrogen atom and a hetero atom-containing hydrocarbylene group in which the hetero atom is an oxygen atom. Examples of the hydrocarbylene group include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of the hetero atom-containing hydrocarbylene group in which the hetero atom is a nitrogen atom include a group represented by —CH═N—CH═CH— and a group represented by —CH═N—$CH_2$—$CH_2$—. Examples of the hetero atom-containing hydrocarbylene group in which the hetero atom is an oxygen atom include a group represented by —$(CH_2)_s$—O—$(CH_2)_t$— (s and t each are an integer of 1 or more).

In the formula (III), examples of the divalent group formed by bonding of $R^{31}$ and $R^{34}$, and the divalent group of $R^{33}$ include a hydrocarbylene group, a hetero atom-containing hydrocarbylene group in which the hetero atom is a nitrogen atom, a hetero atom-containing hydrocarbylene group in which the hetero atom is an oxygen atom, a group in which a hydrocarbylene group and an oxygen atom are bonded, and a group in which a hydrocarbylene group and a group represented by —$NR^{35}$— ($R^{35}$ represents a hydrocarbyl group or a hydrogen atom) are bonded. Examples of the hydrocarbylene group include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of the hetero atom-containing hydrocarbylene group in which the hetero atom is a nitrogen atom include a group represented by —CH═N—CH═CH— and a group represented by —CH═N—$CH_2$—$CH_2$—. Examples of the hetero atom-containing hydrocarbylene group in which the hetero atom is an oxygen atom include a group represented by —$(CH_2)_s$—O—$(CH_2)_t$— (s and t each are an integer of 1 or more). Examples of the group in which a hydrocarbylene group and an oxygen atom are bonded include a group represented by —$(CH_2)_r$—O— (r represents an integer of 1 or more). Examples of the group in which a hydrocarbylene group and a group represented by —$NR^{35}$— ($R^{35}$ represents a hydrocarbyl group or a hydrogen atom) are bonded include a group represented by —$(CH_2)_p$—$NR^{35}$— ($R^{35}$ represents a hydrocarbyl group (preferably a $C_{1-6}$ hydrocarbyl group), or a hydrogen atom; and p represents an integer of 1 or more).

Preferable examples of a compound represented by the formula (III) include a compound represented by the formula (III) in which k is 0, and $R^{34}$ is an optionally substituted hydrocarbyl group or a hydrogen atom, represented by the following formula (IIIa):

(IIIa)

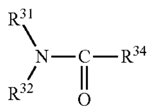

wherein, $R^{31}$ represents an optionally substituted hydrocarbyl group, or is bonded with $R^{32}$ to form a hydrocarbylene group optionally containing, as a hetero atom, a nitrogen atom and/or an oxygen atom; $R^{32}$ represents an optionally substituted hydrocarbyl group, or is bonded with $R^{31}$ to form a hydrocarbylene group optionally containing, as a hetero atom, a nitrogen atom and/or an oxygen atom; and $R^{34}$ represents an optionally substituted hydrocarbyl group or a hydrogen atom.

In the formula (IIIa), description and examples of the optionally substituted hydrocarbyl group for $R^{31}$, $R^{32}$ or $R^{34}$, and the hydrocarbylene group optionally containing, as a hetero atom, a nitrogen atom and/or an oxygen atom, formed by bonding of $R^{31}$ and $R^{32}$, are the same as those stated in the description of the formula (III).

In the formula (IIIa), $R^{31}$ is preferably a $C_{1-10}$ hydrocarbyl group, or is bonded with $R^{32}$ to form a $C_{3-10}$ hydrocarbylene group or a hetero atom-containing $C_{3-10}$ hydrocarbylene group in which the hetero atom is a nitrogen atom. $R^{31}$ is more preferably a $C_{1-10}$ alkyl group or a $C_{6-10}$ aryl group, or is bonded with $R^{32}$ to form a $C_{3-10}$ alkylene group, a group represented by —CH═N—CH═CH—, or a group represented by —CH═N—$CH_2$—$CH_2$—. $R^{31}$ is still more preferably a $C_{1-6}$ alkyl group, and particularly preferably a methyl group or an ethyl group.

In the formula (IIIa), $R^{32}$ is preferably a $C_{1-10}$ hydrocarbyl group, or is bonded with $R^{31}$ to form a $C_{3-10}$ hydrocarbylene group or a hetero atom-containing $C_{3-10}$ hydrocarbylene group in which the hetero atom is a nitrogen atom. $R^{32}$ is more preferably a $C_{1-10}$ alkyl group or a $C_{6-10}$ aryl group, or is bonded with $R^{31}$ to form a $C_{3-10}$ alkylene group, a group represented by —CH═N—CH═CH—, or a group represented by —CH═N—$CH_2$—$CH_2$—. $R^{32}$ is still more preferably a $C_{1-6}$ alkyl group, and particularly preferably a methyl group or an ethyl group.

In the formula (IIIa), $R^{34}$ is preferably a hydrocarbyl group or a hydrogen atom, more preferably a $C_{1-10}$ hydrocarbyl group or a hydrogen atom, still more preferably a $C_{1-6}$ alkyl group or a hydrogen atom, and particularly preferably a hydrogen atom, a methyl group or an ethyl group.

Examples of the compound represented by the formula (IIIa) in which $R^{34}$ is a hydrocarbyl group include N,N-dihydrocarbylacetamides such as N,N-dimethylacetamide, N,N-diethylacetamide, and N-methyl-N-ethylacetamide; N,N-dihydrocarbylacrylamides such as N-dimethylacrylamide, N,N-diethylacrylamide, and N-methyl-N-ethylacrylamide; and N,N-dihydrocarbylmethacrylamides such as N,N-dimethylmethacrylamide, N,N-diethylmethacrylamide, and N-methyl-N-ethylmethacrylamide.

Examples of the compound represented by the formula (IIIa) in which $R^{34}$ is a hydrogen atom include N,N-dihydrocarbylformamides such as N,N-dimethylformamide, N,N-dimethylformamide, and N-methyl-N-ethylformamide.

Preferable examples of the compound represented by the formula (III) include a compound represented by the formula (III) in which k is 0; and $R^{34}$ is bonded with $R^{31}$ to form a divalent group, represented by the following formula (IIIb):

(IIIb)

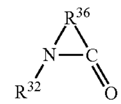

wherein $R^{32}$ represents an optionally substituted hydrocarbyl group; and $R^{36}$ represents a hydrocarbylene group, or a group in which a hydrocarbylene group and a group represented by —$NR^{35}$— are bonded, where $R^{35}$ represents a hydrocarbyl group or a hydrogen atom.

In the formula (IIIb), description and examples of an optionally substituted hydrocarbyl group for $R^{32}$ are the same as those stated in the description of the formula (III).

In the formula (IIIb), examples of the hydrocarbylene group for $R^{36}$ include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of the group in which a hydrocarbylene group and a group represented by —$NR^{35}$— ($R^{35}$ represents a hydrocarbyl group or a hydrogen atom) are bonded for $R^{36}$ include a group represented by —$(CH_2)_p$—$NR^{35}$— ($R^{35}$ represents a hydrocarbyl group or a hydrogen atom, and p represents an integer of 1 or more).

In the formula (IIIb), $R^{32}$ is preferably a $C_{1-10}$ hydrocarbyl group, more preferably a $C_{1-10}$ alkyl group or a $C_{6-10}$ aryl group, still more preferably a $C_{1-6}$ alkyl group or a phenyl group, and particularly preferably a methyl group, an ethyl group, or a phenyl group.

In the formula (IIIb), $R^{36}$ is preferably a $C_{1-10}$ hydrocarbylene group, or a group in which a $C_{1-10}$ hydrocarbylene group and a group represented by —$NR^{35}$— ($R^{35}$ represents a hydrocarbyl group (preferably a $C_{1-10}$ hydrocarbyl group) or a hydrogen atom) are bonded, more preferably a $C_{3-6}$ alkylene group or a group represented by —$(CH_2)_p$—$NR^{35}$— ($R^{35}$ represents a hydrocarbyl group (preferably a $C_{1-10}$ hydrocarbyl group), and p represents an integer of not less than 1 (preferably an integer of 2 to 5)), and further preferably a trimethylene group, a tetramethylene group, a pentamethylene group, or a group represented by —$(CH_2)_2$—$N(CH_3)$—.

Examples of the compound represented by the formula (IIIb) in which $R^{36}$ is a hydrocarbylene group include N-hydrocarbyl-β-propiolactams such as N-methyl-β-propiolactam and N-phenyl-β-propiolactam; N-hydrocarbyl-2-pyrrolidones such as N-methyl-2-pyrrolidone, N-vinyl-2-pyrrolidone, N-phenyl-2-pyrrolidone, N-tert-butyl-2-pyrrolidone, and N-methyl-5-methyl-2-pyrrolidone; N-hydrocarbyl-2-piperidones such as N-methyl-2-piperidone, N-vinyl-2-piperidone, and N-phenyl-2-piperidone; N-hydrocarbyl-ϵ-caprolactams such as N-methyl-ϵ-caprolactam and N-phenyl-ϵ-caprolactam; and N-hydrocarbyl-ω-laurilolactams such as N-methyl-ω-laurilolactam and N-vinyl-ω-laurilolactam. N-phenyl-2-pyrrolidone and N-methyl-ϵ-caprolactam are preferable among the above examples.

Examples of the compound represented by the formula (IIIb) in which $R^{36}$ is a group in which a hydrocarbylene group and a group represented by —$NR^{35}$— ($R^{35}$ is a hydrocarbyl group or a hydrogen atom) are bonded include 1,3-dihydrocarbyl-2-imidazolidinones such as 1,3-dimethyl-2-imidazolidinone, 1,3-diethyl-2-imidazolidinone, 1,3-divinyl-2-imidazolidinone, and 1-methyl-3-ethyl-2- imidazolidinone. Among the above examples, 1,3-dimethyl-2-imidazolidinone is preferred.

Preferable examples of the compound represented by the formula (III) include a compound represented by the formula (III) in which k is 1; and $R^{33}$ is a hydrocarbylene group, represented by the following formula (IIIc):

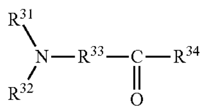

(IIIc)

wherein $R^{31}$ represents an optionally substituted hydrocarbyl group, or is bonded with $R^{32}$ to form a hydrocarbylene group optionally containing, as a hetero atom, a nitrogen atom and/or an oxygen atom; $R^{32}$ represents an optionally substituted hydrocarbyl group, or is bonded with $R^{31}$ to form a hydrocarbylene group optionally containing, as a hetero atom, a nitrogen atom and/or an oxygen atom; $R^{33}$ represents a hydrocarbylene group, and $R^{34}$ represents an optionally substituted hydrocarbyl group or a hydrogen atom.

In the formula (IIIc), description and examples of the optionally substituted hydrocarbyl group for $R^{31}$, $R^{32}$ or $R^{34}$; the hydrocarbylene group optionally containing, as a hetero atom, a nitrogen atom and/or an oxygen atom, formed by bonding of $R^{31}$ and $R^{32}$; and the hydrocarbylene group for $R^{33}$ are the same as those stated in the description of the formula (III).

In the formula (IIIc), $R^{33}$ is preferably a $C_{1-10}$ hydrocarbylene group, more preferably an a $C_{1-10}$ alkylene group or a $C_{6-10}$ arylene group, still more preferably a $C_{1-6}$ alkylene group or a phenylene group, and particularly preferably an ethylene group, a trimethylene group, or a 1,4-phenylene group.

In the formula (IIIc), $R^{34}$ is preferably a $C_{1-10}$ hydrocarbyl group, or a substituted $C_{1-10}$ hydrocarbyl group in which the substituent is a dialkylamino group, more preferably a $C_{1-6}$ alkyl group, a $C_{6-10}$ aryl group, a $C_{1-6}$ dialkylaminoalkyl group, or a $C_{6-10}$ dialkylaminoaryl group, and still more preferably a methyl group, an ethyl group, a phenyl group, a 3-dimethylaminoethyl group, or a 4-diethylaminophenyl group.

In the formula (IIIc), $R^{31}$ is preferably a $C_{1-10}$ hydrocarbyl group, or is bonded with $R^{32}$ to form a $C_{3-10}$ hydrocarbylene group, or a hetero atom-containing $C_{3-10}$ hydrocarbylene group in which the hetero atom is a nitrogen atom or an oxygen atom; more preferably a $C_{1-10}$ alkyl group or a $C_{6-10}$ aryl group, or is bonded with $R^{32}$ to form a $C_{3-10}$ alkylene group, a group represented by —CH═N—CH═CH—, a group represented by —CH═N—$CH_2$—$CH_2$—, or a group represented by —$(CH_2)_2$—O—$(CH_2)_2$—; still more preferably a $C_{1-6}$ alkyl group, or is bonded with $R^{32}$ to form a $C_{3-6}$ alkylene group, a group represented by —CH═N—CH═CH—, or a group represented by —CH═N—$CH_2$—$CH_2$—; and particularly preferably a methyl group or an ethyl group, or is bonded with $R^{32}$ to form a tetramethylene group, a hexamethylene group, or a group represented by —CH═N—CH═CH—.

In the formula (IIIc), $R^{32}$ is preferably a $C_{1-10}$ hydrocarbyl group, or is bonded with $R^{31}$ to form a $C_{3-10}$ hydrocarbylene group, or a hetero atom-containing $C_{3-10}$ hydrocarbylene group in which the hetero atom is a nitrogen atom or an oxygen atom; more preferably a $C_{1-10}$ alkyl group or a $C_{6-10}$ aryl group, or is bonded with $R^{31}$ to form a $C_{3-10}$ alkylene group, a group represented by —CH═N—CH═CH—, a group represented by —CH═N—$CH_2$—$CH_2$—, or a group represented by —$(CH_2)_2$—O—$(CH_2)_2$—; still more preferably a $C_{1-6}$ alkyl group, or is bonded with $R^{31}$ to form a $C_{3-6}$ alkylene group, a group represented by —CH═N—CH═CH—, or a group represented by —CH═N—$CH_2$—$CH_2$—; and particularly preferably a methyl group or an ethyl group, or is bonded with $R^{31}$ to form a tetramethylene group, a hexamethylene group, or a group represented by —CH═N—CH═CH—.

Examples of the compound represented by the formula (IIIc) in which $R^{34}$ is a hydrocarbyl group include 4-N,N-dihydrocarbylaminoacetophenones such as 4-(N,N-dimethylamino)acetophenone, 4-N-methyl-N-ethylaminoacetophenone, and 4-N,N-diethylaminoacetophenone; and 4-cyclic aminoacetophenone compounds such as 4'-(imidazol-1-yl)acetophenone and 4-pyrazolylacetophenone. Among the above examples, 4-cyclic aminoacetophenone compounds are preferable, and 4'-(imidazol-1-yl)acetophenone is more preferable.

Examples of the compound represented by the formula (IIIc) in which $R^{34}$ is a substituted hydrocarbyl group include bis(dihydrocarbylaminoalkyl)ketones such as 1,7-bis(methylethylamino)-4-heptanone and 1,3-bis(diphenylamino)-2-propanone; 4-(dihydrocarbylamino)benzophenones such as 4-N,N-dimethylaminobenzophenone, 4-N,N-di-t-butylaminobenzophenone, and 4-N,N-diphenylaminobenzophenone; and 4,4'-bis(dihydrocarbylamino)benzophenones such as 4,4'-bis(dimethylamino)benzophenone, 4,4'-bis(diethylamino)benzophenone, and 4,4'-bis(diphenylamino)benzophenone. Among the above examples, 4,4'-bis(dihydrocarbylamino)benzophenone is preferable, and 4,4'-bis(diethylamino)benzophenone is more preferable.

Preferable examples of the compound represented by the formula (III) include a compound represented by the formula (III) in which k is 1, and $R^{33}$ is a group in which a hydrocarbylene group and an oxygen atom are bonded, or a group in which a hydrocarbylene group and a group represented by —$NR^{35}$— ($R^{35}$ represents a hydrocarbyl group or a hydrogen atom) are bonded, represented by the following formula (IIId):

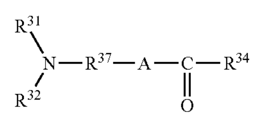

(IIId)

wherein $R^{31}$ represents an optionally substituted hydrocarbyl group, or is bonded with $R^{32}$ to form a hydrocarbylene group optionally containing, as a hetero atom, a nitrogen atom and/or an oxygen atom; $R^{32}$ represents an optionally substituted hydrocarbyl group, or is bonded with $R^{31}$ to form a hydrocarbylene group optionally containing, as a hetero atom, a nitrogen atom and/or an oxygen atom; $R^{37}$ represents a hydrocarbylene group; A represents an oxygen atom or —$NR^{35}$— wherein $R^{35}$ represents a hydrocarbyl group or a hydrogen atom; and $R^{34}$ represents an optionally substituted hydrocarbyl group or a hydrogen atom.

In the formula (IIId), description and examples of the optionally substituted hydrocarbyl group for $R^{31}$, $R^{32}$ or $R^{34}$, and the hydrocarbylene group optionally containing, as a hetero atom, a nitrogen atom and/or an oxygen atom, formed by bonding of $R^{31}$ and $R^{32}$, are the same as those stated in the description of the formula (III). The hydrocarbyl group for $R^{35}$ is the same as the hydrocarbyl group for $R^{31}$, $R^{32}$, or $R^{34}$.

In the formula (IIId), A is preferably an oxygen atom or a group represented by —$NR^{35}$— ($R^{35}$ is a hydrocarbyl group (preferably a $C_{1-5}$ hydrocarbyl group) or a hydrogen atom), more preferably an oxygen atom or a group represented by —NH—, and still more preferably a group represented by —NH—.

In the formula (IIId), examples of the hydrocarbylene group for $R^{37}$ include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group.

In the formula (IIId), $R^{34}$ is preferably a $C_{1-10}$ hydrocarbyl group, more preferably an alkenyl group having 2 to 5 carbon atoms, and still more preferably a vinyl group.

In the formula (IIId), $R^{37}$ is preferably a $C_{1-10}$ hydrocarbylene group, more preferably a $C_{1-6}$ alkylene group, still more preferably an ethylene group or a trimethylene group, and particularly preferably a trimethylene group.

In the formula (IIId), $R^{31}$ is preferably a $C_{1-10}$ hydrocarbyl group, or is bonded with $R^{32}$ to form a $C_{3-10}$ hydrocarbylene group, or a hetero atom-containing $C_{3-10}$ hydrocarbylene group in which the hetero atom is a nitrogen atom or an oxygen atom; more preferably a $C_{1-10}$ alkyl group or a $C_{6-10}$ aryl group, or is bonded with $R^{32}$ to form a $C_{3-10}$ alkylene group, a group represented by —CH═N—CH═CH—, a group represented by —CH═N—$CH_2$—$CH_2$—, or a group represented by —$(CH_2)_2$—O—$(CH_2)_2$—; still more preferably a $C_{1-6}$ alkyl group, or is bonded with $R^{32}$ to form a $C_{3-6}$ alkylene group, a group represented by —CH═N—CH═CH—, or a group represented by —CH═N—$CH_2$—$CH_2$—; and particularly preferably a methyl group or an ethyl group, or is bonded with $R^{32}$ to form a tetramethylene group, a hexamethylene group, or a group represented by —CH═N—CH═CH—.

In the formula (IIId), $R^{32}$ is preferably a $C_{1-10}$ hydrocarbyl group, or is bonded with $R^{31}$ to form a $C_{3-10}$ hydrocarbylene group, or a hetero atom-containing $C_{3-10}$ hydrocarbylene group in which the hetero atom is a nitrogen atom or an oxygen atom; more preferably a $C_{1-10}$ alkyl group or a $C_{6-10}$ aryl group, or is bonded with $R^{31}$ to form a $C_{3-10}$ alkylene group, a group represented by —CH═N—CH═CH—, a group represented by —CH═N—$CH_2$—$CH_2$—, or a group represented by —$(CH_2)_2$—O—$(CH_2)_2$—; still more preferably a $C_{1-6}$ alkyl group, or is bonded with $R^{31}$ to form a $C_{3-6}$ alkylene group, a group represented by —CH—N—CH═CH—, or a group represented by —CH═N—$CH_2$—$CH_2$—; and particularly preferably a methyl group or an ethyl group, or is bonded with $R^{31}$ to form a tetramethylene group, a hexamethylene group, or a group represented by —CH═N—CH═CH—.

Examples of the compound represented by the formula (IIId) in which A is an oxygen atom include 2-N,N-dihydrocarbylaminoethyl acrylates such as 2-N,N-dimethylaminoethyl acrylate and 2-N,N-diethylaminoethyl acrylate; 3-N,N-dihydrocarbylaminopropyl acrylates such as 3-N,N-dimethylaminopropyl acrylate; 2-N,N-dihydrocarbylaminoethyl methacrylates such as 2-N,N-dimethylaminoethyl methacrylate and 2-N,N-diethylaminoethyl methacrylate; and 3-N,N-dihydrocarbylaminopropyl methacrylates such as 3-N,N-dimethylaminopropyl methacrylate. The compound is preferably 3-N,N-dihydrocarbylaminopropyl acrylate, and more preferably 3-N,N-dimethylaminopropyl acrylate.

Examples of the compound represented by the formula (IIId) in which A is a group represented by —$NR^{35}$— ($R^{35}$ is a hydrocarbyl group or a hydrogen atom) include N,N-dihydrocarbylaminoethylacrylamides such as N,N-dimethylaminoethylacrylamide and N,N-diethylaminoethylacrylamide; N,N-dihydrocarbylaminopropylacrylamides such as N,N-dimethylaminopropylacrylamide and N,N-diethylaminopropylacrylamide; N,N-dihydrocarbylaminobutylacrylamides such as N,N-dimethylaminobutylacrylamide and N,N-diethylaminobutylacrylamide; N,N-dihydrocarbylaminoethylmethacrylamides such as N,N-dimethylaminoethylmethacrylamide and N,N-diethylaminoethylmethacrylamide; N,N-dihydrocarbylaminopropylmethacrylamides such as N,N-dimethylaminopropylmethacrylamide and N,N-diethylaminopropylmethacrylamide; and N,N-dihydrocarbylaminobutylmethacrylamides such as N,N-dimethylaminobutylmethacrylamide and N,N-diethylaminobutylmethacrylamide. The compound is preferably N,N-dihydrocarbylaminopropylacrylamide, and more preferably N,N-dimethylaminopropylacrylamide.

The compound represented by the formula (III) is preferably a compound represented by the formula (IIId), particularly preferably N,N-dihydrocarbylaminopropylacrylamide, and most preferably N,N-dimethylaminopropylacrylamide.

In addition to those described above, preferable examples of the compound containing a nitrogen atom and/or a silicon atom include an alkoxysilyl group-containing compound.

The alkoxysilyl group-containing compound is preferably a compound containing a nitrogen atom and an alkoxysilyl group, and more preferably a compound represented by the following formula (IV):

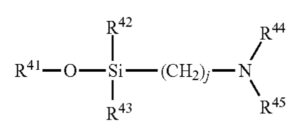

(IV)

wherein $R^{41}$ represents a hydrocarbyl group; $R^{42}$ and $R^{43}$ each represent a hydrocarbyl group or a hydrocarbyloxy group; $R^{44}$ represents an optionally substituted hydrocarbyl group or a trihydrocarbylsilyl group, or is bonded with $R^{45}$ to form a hydrocarbylene group optionally containing, as a hetero atom, at least one selected from the group consisting of a silicon atom, a nitrogen atom and an oxygen atom; $R^{45}$ represents an optionally substituted hydrocarbyl group or a trihydrocarbylsilyl group, or is bonded with $R^{44}$ to form a hydrocarbylene group optionally containing, as a hetero atom, at least one selected from the group consisting of a silicon atom, a nitrogen atom and an oxygen atom; and j represents an integer of 1 to 5.

In the formula (IV), the optionally substituted hydrocarbyl group is a hydrocarbyl group or a substituted hydrocarbyl group. Examples of the hydrocarbyl group include alkyl groups such as a methyl group, an ethyl group, an n-propyl group, an isopropyl group, and an n-butyl group; alkenyl groups such as a vinyl group, an allyl group, and an isopropenyl group; and aryl groups such as a phenyl group. The hydrocarbyl group is preferably an alkyl group, and more preferably a methyl group or an ethyl group. Examples of the substituted hydrocarbyl group include oxacycloalkyl groups such as an oxiranyl group and a tetrahydrofuranyl group, and preferably a tetrahydrofuranyl group.

Herein, the oxacycloalkyl group represents a group in which $CH_2$ on an alicycle of a cycloalkyl group is replaced with an oxygen atom.

Examples of the hydrocarbyloxy group include alkoxy groups such as a methoxy group, an ethoxy group, an n-propoxy group, an isopropoxy group, an n-butoxy group, a sec-butoxy group, and a tert-butoxy group; and aryloxy groups such as a phenoxy group and a benzyloxy group. The hydrocarbyloxy group is preferably an alkoxy group, and more preferably a methoxy group or an ethoxy group.

Examples of the trihydrocarbylsilyl group include a trimethylsilyl group and a tert-butyl-dimethylsilyl group, and preferably a trimethylsilyl group.

The hydrocarbylene group optionally containing, as a hetero atom, at least one selected from the group consisting of a silicon atom, a nitrogen atom and an oxygen atom is a hydrocarbylene group, or a hetero atom-containing hydrocarbylene group in which the hetero atom is at least one selected from the group consisting of a silicon atom, a nitrogen atom and an oxygen atom. Examples of the hetero atom-containing hydrocarbylene group in which the hetero atom is at least one selected from the group consisting of a silicon atom, a nitrogen atom and an oxygen atom include a hetero atom-containing hydrocarbylene group in which the hetero atom is a silicon atom, a hetero atom-containing hydrocarbylene group in which the hetero atom is a nitrogen atom, and a hetero atom-containing hydrocarbylene group in which the hetero atom is an oxygen atom. Examples of the hydrocarbylene group include alkylene groups such as a tetramethylene group, a pentamethylene group, a hexamethylene group, a pentan-2-en-1,5-diyl group, and a 2,2,4-trimethylhexane-1,6-diyl group. Among them, a $C_{4-7}$ alkylene group is preferable, and a pentamethylene group or a hexamethylene group is particularly preferable. Examples of the hetero atom-containing hydrocarbylene group in which the hetero atom is a silicon atom include a group represented by $—Si(CH_3)_2—CH_2—CH_2—Si(CH_3)_2—$. Examples of the hetero atom-containing hydrocarbylene group in which the hetero atom is a nitrogen atom include a group represented by $—CH{=}N—CH{=}CH—$, or a group represented by $—CH{=}N—CH_2—CH_2—$. Examples of the hetero atom-containing hydrocarbylene group in which the hetero atom is an oxygen atom include a group represented by $—CH_2—CH_2—O—CH_2—CH_2—$.

In the formula (IV), $R^{41}$ is preferably a $C_{1-4}$ alkyl group, and more preferably a methyl group or an ethyl group. $R^{42}$ and $R^{43}$ each are preferably a hydrocarbyloxy group, more preferably a $C_{1-4}$ alkoxy group, and still more preferably a methoxy group or an ethoxy group. $R^{44}$ and $R^{45}$ each are preferably a hydrocarbyl group, more preferably a $C_{1-4}$ alkyl group, and still more preferably a methyl group or an ethyl group. Here, j is preferably an integer of 2 to 4.

Examples of the compound represented by the formula (IV) include [(dialkylamino)alkyl]alkoxysilane compounds such as 3-dimethylaminopropyltriethoxysilane, 3-dimethylaminopropyltrimethoxysilane, 3-diethylaminopropyltriethoxysilane, 3-diethylaminopropyltrimethoxysilane, 3-dimethylaminopropylmethyldiethoxysilane, 2-dimethylaminoethyltriethoxysilane, and 2-dimethylaminoethyltrimethoxysilane; cyclic aminoalkylalkoxysilane compounds such as hexamethyleneiminomethyltrimethoxysilane, 3-hexamethyleneiminopropyltriethoxysilane, N-(3-triethoxysilylpropyl)-4,5-dihydroimidazole, and N-(3-trimethoxysilylpropyl)-4,5-imidazole; [di(tetrahydrofuranyl)amino]alkylalkoxysilane compounds such as 3-[di(tetrahydrofuranyl)amino]propyltrimethoxysilane and 3-[di(tetrahydrofuranyl)amino]propyltriethoxysilane; and N,N-bis(trialkylsilyl)aminoalkylalkoxysilane compounds such as N,N-bis(trimethylsilyl)aminopropylmethyldimethoxysilane and N,N-bis(trimethylsilyl)aminopropylmethyldiethoxysilane. Among the above examples, [(dialkylamino)alkyl]alkoxysilane compounds are preferable, and 3-dimethylaminopropyltriethoxysilane, 3-dimethylaminopropyltrimethoxysilane, 3-diethylaminopropyltriethoxysilane, and 3-diethylaminopropyltrimethoxysilane are more preferable.

Examples of the compound containing an alkoxysilyl group, in addition to the aforementioned compounds containing a nitrogen atom and an alkoxysilyl group, include tetraalkoxysilanes such as tetramethoxysilane, tetraethoxysilane, and tetra-n-propoxysilane; trialkoxyhydrocarbylsilanes such as methyltrimethoxysilane, methyltriethoxysilane, ethyltrimethoxysilane, and phenyltrimethoxysilane; trialkoxyhalosilanes such as trimethoxychlorosilane, triethoxychlorosilane, and tri-n-propoxychlorosilane; dialkoxydihydrocarbylsilanes such as dimethoxydimethylsilane, diethoxydimethylsilane, and dimethoxydiethylsilane; dialkoxydihalosilanes such as dimethoxydichlorosilane, diethoxydichlorosilane, and di-n-propoxydichlorosilane; monoalkoxytrihydrocarbylsilanes such as methoxytrimethylsilane; monoalkoxytrihalosilanes such as methoxytrichlorosilane and ethoxytrichlorosilane; (glycidoxyalkyl)alkoxysilane compounds such as 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, and (3-glycidoxypropyl)methyldimethoxysilane; (3,4-epoxycyclohexyl)alkylalkoxysilane compounds such as 2-(3,4-epoxycyclohexyl)ethyltrimethoxysilane, 2-(3,4-epoxycyclohexyl)ethyltriethoxysilane, and 2-(3,4-epoxycyclohexyl)ethyl(methyl)dimethoxysilane; alkoxysilylalkylsuccinic anhydrides such as 3-trimethoxysilylpropylsuccinic anhydride and 3-triethoxysilylpropylsuccinic anhydride; and (methacryloyloxyalkyl)alkoxysilane compounds such as 3-methacryloyloxypropyltrimethoxysilane and 3-methacryloyloxypropyltriethoxysilane.

The compound containing an alkoxysilyl group may contain a nitrogen atom and a carbonyl group. Examples of the compound containing a nitrogen atom and a carbonyl group as well as an alkoxysilyl group include tris[(alkoxysilyl)alkyl]isocyanurate compounds such as tris[3-(trimethoxysilyl)propyl]isocyanurate, tris[3-(triethoxysilyl)propyl]isocyanurate, tris[3-(tripropoxysilyl)propyl]isocyanurate, and tris[3-(tributoxysilyl)propyl]isocyanurate. Among them, tris[3-(trimethoxysilyl)propyl]isocyanurate is preferable.

Examples of the compound containing a nitrogen atom and/or a silicon atom include an N,N-dialkyl-substituted carboxylic acid amide dialkyl acetal compound. Examples of the N,N-dialkyl-substituted carboxylic acid amide dialkyl acetal compound include N,N-dialkylformamide dialkyl acetals such as N,N-dimethylformamide dimethyl acetal and N,N-diethylformamide dimethyl acetal; N,N-dialkylacetamide dialkyl acetals such as N,N-dimethylacetamide dimethyl acetal and N,N-diethylacetamide dimethyl acetal; and N,N-dialkylpropionamide dialkyl acetals such as N,N-dimethylpropionamide dimethyl acetal and N,N-diethylpropionamide dimethyl acetal. Among them, N,N-dialkylformamide dialkyl acetals are preferable, and N,N-dimethylformamide dimethyl acetals are more preferable.

In a method of producing the conjugated diene polymer, a coupling agent may be added to a solution of the conjugated diene polymer in a hydrocarbon at any time from the initiation of the polymerization of monomers before the recovery of the polymer described later. Examples of the coupling agent include a compound represented by the following formula (V):

$$R^{51}{}_{a}ML_{4-a} \quad (V)$$

wherein $R^{51}$ represents an alkyl group, an alkenyl group, a cycloalkenyl group, or an aryl group; M represents a silicon atom or a tin atom; L represents a halogen atom or a hydrocarbyloxy group; and a represents an integer of 0 to 2.

Examples of the coupling agent represented by the formula (V) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

For enhancing the processability of the conjugated diene polymer, the amount of the coupling agent to be added is preferably not less than 0.03 mol and more preferably not less than 0.05 mol, per mol of an alkali metal derived from an alkali metal catalyst. For enhancing the fuel economy, the amount is preferably not more than 0.4 mol and more preferably not more than 0.3 mol.

In the method of producing the conjugated diene polymer, an unreacted active terminal may be treated with alcohol, such as methanol or isopropyl alcohol, before recovery of a polymer described later.

As a method of recovering a conjugated diene polymer from the solution of the conjugated diene polymer in a hydrocarbon, known methods may be employed. Examples of the method include (A) a method of adding a coagulant to the solution of the conjugated diene polymer in a hydrocarbon, and (B) a method of adding steam to the solution of the conjugated diene polymer in a hydrocarbon solvent (steam stripping treatment). The recovered conjugated diene polymer may be dried with a known dryer, such as a band dryer or an extrusion-type dryer.

For achieving a balanced enhancement in processability, fuel economy, rubber strength, abrasion resistance, wet-grip performance, and handling stability, the amount of the structural unit derived from the polymerization initiator represented by the formula (I) in the conjugated diene polymer, when expressed per unit mass of the polymer, is preferably not less than 0.0001 mmol/g polymer, and more preferably not less than 0.001 mmol/g polymer, but is preferably not more than 0.15 mmol/g polymer, and more preferably not more than 0.1 mmol/g polymer.

For achieving a balanced enhancement in processability, fuel economy, rubber strength, abrasion resistance, wet-grip performance, and handling stability, the amount of the structural unit derived from the silicon-containing vinyl compound in the conjugated diene polymer, when expressed per unit mass of the polymer, is preferably not less than 0.01 mmol/g polymer, and more preferably not less than 0.02 mmol/g polymer, but is preferably not more than 0.4 mmol/g polymer, and more preferably not more than 0.2 mmol/g polymer.

For achieving a balanced enhancement in processability, fuel economy, rubber strength, abrasion resistance, wet-grip performance, and handling stability, the conjugated diene polymer preferably contains a structural unit derived from the compound represented by the formula (II). The structural unit derived from the compound represented by the formula (II) in the conjugated diene polymer refers to a structural unit represented by the following formula (IIb):

(IIb)

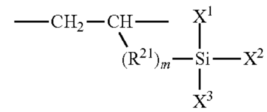

wherein m, $R^{21}$, $X^1$, $X^2$, and $X^3$ are the same as those stated in the description of the formula (II).

In the conjugated diene polymer according to the present invention, preferably, at least one of $X^1$, $X^2$ and $X^3$ is replaced by a hydroxyl group, more preferably two or more of $X^1$, $X^2$ and $X^3$ are replaced by hydroxyl groups, and still more preferably two of $X^1$, $X^2$ and $X^3$ are replaced by hydroxyl groups, in the structural unit derived from the compound represented by the formula (II). This enables to enhance the effect of enhancing the processability, fuel economy, rubber strength, abrasion resistance, wet-grip performance, and handling stability. Unlimited examples of a method of replacing at least one of $X^1$, $X^2$, and $X^3$ with a hydroxyl group include steam stripping treatment.

For achieving a balanced enhancement in processability, fuel economy, rubber strength, abrasion resistance, wet-grip performance, and handling stability, the conjugated diene polymer preferably contains a structural unit derived from an aromatic vinyl compound (aromatic vinyl unit). If the conjugated diene polymer contains an aromatic vinyl unit, the amount of the aromatic vinyl unit in the conjugated diene polymer, based on 100% by mass of the combined amount of the structural unit derived from the conjugated diene compound (conjugated diene unit) and the aromatic vinyl unit, is preferably not less than 10% by mass (the amount of the conjugated diene unit is not more than 90% by mass), and more preferably not less than 15% by mass (the amount of the conjugated diene unit is not more than 85% by mass). Also, from the viewpoint of the fuel economy, the amount of the aromatic vinyl unit is preferably not more than 50% by mass (the amount of the conjugated diene unit is not less than 50% by mass), and more preferably not more than 45% by mass (the amount of the conjugated diene unit is not less than 55% by mass).

If the conjugated diene polymer contains a structural unit derived from an aromatic vinyl compound, for enhancing the fuel economy, the vinyl bond content (vinyl content) in the conjugated diene polymer is preferably not more than 80 mol %, and more preferably not more than 70 mol %, based on the amount of the conjugated diene unit (regarded as 100 mol %). From the viewpoint of the wet-grip performance, the vinyl bond content is preferably not less than 10 mol %, more preferably not less than 15 mol %, still more preferably not less than 20 mol %, and particularly preferably not less than 40 mol %.

In particular, for enhancing the abrasion resistance, the conjugated diene polymer preferably contains no structural unit derived from an aromatic vinyl compound. In this case, the vinyl bond content (vinyl content) in the conjugated diene polymer is preferably not more than 20 mol %, and more preferably not more than 15 mol %, based on the amount of the conjugated diene unit (regarded as 100 mol %).

The vinyl bond content in the conjugated diene polymer is measured by the method described in examples below.

For enhancing the fuel economy, the molecular weight distribution of the conjugated diene polymer is preferably 1 to 5, and more preferably 1 to 2. The molecular weight distribution is obtained by measuring a number-average molecular weight (Mn) and a weight-average molecular weight (Mw) using gel permeation chromatography (GPC), and dividing Mw by Mn.

The conjugated diene polymer may be used as a rubber component in the rubber composition of the present invention.

The amount of the conjugated diene polymer based on 100% by mass of the rubber component is not more than 90% by mass, preferably not more than 80% by mass, more preferably not more than 75% by mass, and still more preferably not more than 55% by mass. An amount of more than 90% by mass tends to not only decrease the abrasion resistance but also drive up the cost. The amount of the conjugated diene polymer is not less than 1% by mass, preferably not less than 5% by mass, more preferably not less than 10% by mass, still more preferably not less than 25% by mass, and particularly preferably not less than 40% by mass. An amount of less than 1% by mass tends not to easily improve the fuel economy.

The other rubber component to be used together with the conjugated diene polymer may suitably be a polyisoprene-based rubber. If a polyisoprene-based rubber is added, the rubber strength increases, and the cohesion of the rubber compound during mixing is so good that productivity can be enhanced.

Examples of the polyisoprene-based rubber include natural rubber (NR), and polyisoprene rubber (IR). The NR is not particularly limited, and examples thereof include those usually used in the tire industry, such as SIR20, RSS#3, TSR20, deproteinized natural rubber (DPNR), highly purified natural rubber (HPNR), and epoxidized natural rubber (ENR). Similarly, IRs usually used in the tire industry may be used.

In the case where the rubber composition of the present invention includes a polyisoprene-based rubber, the amount of the polyisoprene-based rubber based on 100% by mass of the rubber component is preferably not less than 10% by mass, and more preferably not less than 25% by mass.

If the amount is less than 10% by mass, the rubber strength may decrease and the cohesion of the rubber compound during mixing may be so poor that productivity can be deteriorated. The amount of the polyisoprene-based rubber is not more than 70% by mass, preferably not more than 50% by mass, and more preferably not more than 40% by mass. If the amount of the polyisoprene-based rubber exceeds 70% by mass, sufficient wet-grip performance may not be achieved.

Examples of materials that can be used in the rubber component, other than polyisoprene-based rubbers, include conventional rubbers such as styrene-butadiene copolymer rubber (SBR), polybutadiene rubber (BR), butadiene-isoprene copolymer rubber, and butyl rubber. Ethylene-propylene copolymers, and ethylene-octene copolymers may also be mentioned. Two or more kinds of the rubber materials may be used in combination. From the viewpoint of achieving a balanced improvement in processability, fuel economy, rubber strength, abrasion resistance, wet-grip performance, and handling stability, a rubber component containing not less than 50% by mass of a structural unit derived from a conjugated diene compound is preferably used. Specifically, BR or SBR is preferred.

The BR is not particularly limited, and examples thereof include BRs usually used in the tire industry. For example, BRs with a high cis content such as BR1220 (produced by ZEON Corporation), and BR130B and BR150B (produced by Ube Industries, Ltd.); and syndiotactic polybutadiene crystal-containing BRs such as VCR412 and VCR617 (produced by Ube Industries, Ltd.) may be used.

If the rubber composition of the present invention contains BR, the amount of BR based on 100% by mass of the rubber component is preferably not less than 5% by mass, more preferably not less than 10% by mass, and still more preferably not less than 15% by mass. If the amount is less than 5% by mass, the abrasion resistance tends to decrease. The amount of BR is preferably not more than 60% by mass, and more preferably not more than 50% by mass. If the amount is more than 60% by mass, the wet grip performance tends to decrease.

The SBR is not particularly limited, and examples thereof include SBRs usually used in the tire industry, such as Nipol NS116R (produced by ZEON Corporation).

If the rubber composition of the present invention contains SBR, the amount of SBR based on 100% by mass of the rubber component is preferably not less than 15% by mass, and more preferably not less than 25% by mass. If the amount is less than 15% by mass, the wet-grip performance tends to decrease. The amount of SBR is preferably not more than 90% by mass, and more preferably not more than 80% by mass. If the amount is more than 90% by mass, the fuel economy tends to deteriorate.

The rubber composition of the present invention contains silica having a nitrogen adsorption specific surface area ($N_2SA$) of 40 to 400 $m^2/g$. Unlimited examples of the silica include dry silica (anhydrous silica) and wet silica (hydrous silica). Wet silica is preferable because it has more silanol groups.

The silica has a nitrogen adsorption specific surface area ($N_2SA$) of not less than 40 $m^2/g$, preferably not less than 50 $m^2/g$, and more preferably not less than 60 $m^2/g$. If the silica has a $N_2SA$ of less than 40 $m^2/g$, the silica tends to have little reinforcement, and thus the abrasion resistance and rubber strength tend to decrease. The silica has a $N_2SA$ of not more than 400 $m^2/g$, preferably not more than 360 $m^2/g$, and more preferably not more than 300 $m^2/g$. Silica having a $N_2SA$ of more than 400 $m^2/g$ tends not to disperse easily, and thus the fuel economy and processability tend to deteriorate.

The $N_2SA$ of silica is determined by the BET method in accordance with ASTM D3037-93.

The amount of the silica (total amount if two or more kinds of silica are used) for each 100 parts by mass of the rubber component is not less than 10 parts by mass, preferably not less than 30 parts by mass, and more preferably not less than 45 parts by mass. If the amount is less than 10 parts by mass, the effect producible by blending silica tends not to be sufficiently achieved, and the abrasion resistance and rubber strength tend to decrease. The amount of the silica is not more than 150 parts by mass, and preferably not more than 100 parts by mass. If the amount exceeds 150 parts by mass, the processability tends to deteriorate.

One kind of silica may solely be used, but preferably two or more kinds of silica are used in combination. A combination use of silica (1) having a nitrogen adsorption specific surface area of at least 50 $m^2/g$ but less than 120 $m^2/g$, and silica (2) having a nitrogen adsorption specific surface area of not less than 120 $m^2/g$ is more preferable. If the silica (1) and the silica (2) are mixed with the conjugated diene polymer, the silica (1) and the silica (2) disperse well so that the effect of improving the properties can be synergistically enhanced. Moreover, if the silica (1) and the silica (2) are used together with a mercapto group-containing silane coupling agent or a specific solid resin, which is described later, the effect of improving the properties can further be enhanced.

The silica (1) and the silica (2) preferably satisfy the inequality: ($N_2SA$ of silica (2))/($N_2SA$ of silica (1))≥1.4, and more preferably satisfy the inequality: ($N_2SA$ of silica (2))/($N_2SA$ of silica (1))≥2.0. If the ratio of ($N_2SA$ of silica (2))/($N_2SA$ of silica (1)) is less than 1.4, the difference in the particle diameter between the silica (1) and the silica (2) is small. Thus, a dispersibility-improving effect producible by blending two kinds of silica tends not to be sufficiently achieved.

The silica (1) has a $N_2SA$ of not less than 50 $m^2/g$, and preferably not less than 70 $m^2/g$. If the silica (1) has a $N_2SA$ of less than 50 $m^2/g$, the silica tends to have an insufficient reinforcement, and the rubber strength, abrasion resistance, and handling stability may deteriorate. The silica (1) has a $N_2SA$ of less than 120 $m^2/g$, and preferably not more than 115 $m^2/g$. If the silica (1) has a $N_2SA$ of not less than 120 $m^2/g$, the effect producible by the combination use of the silica (1) and the silica (2) may not be sufficiently achieved.

The silica (2) has a $N_2SA$ of not less than 120 $m^2/g$, and preferably not less than 150 $m^2/g$. If the silica (2) has a $N_2SA$ of less than 120 $m^2/g$, the effect producible by the combination use of the silica (1) and the silica (2) may not be sufficiently achieved. The silica (2) has a $N_2SA$ of preferably not more than 250 $m^2/g$, and more preferably not more than 220 $m^2/g$. If the silica (2) has a $N_2SA$ of more than 250 $m^2/g$, the fuel economy and processability tend to deteriorate.

The amounts of the silica (1) and the silica (2) preferably satisfy the following inequality:

$$(\text{Amount of silica (1)})\times 0.06 \leq (\text{Amount of silica (2)}) \leq (\text{Amount of silica (1)})\times 15.$$

If the amount of the silica (2) is less than 0.06 times the amount of the silica (1), a sufficient rubber strength tends not to be achieved. If the amount of the silica (2) is more than 15 times the amount of the silica (1), the rolling resistance tends to increase. The amount of the silica (2) is more preferably not less than 0.3 times the amount of the silica (1), and still more preferably not less than 0.5 times the amount of the silica (1). Also, the amount of the silica (2) is more preferably not more than 7 times the amount of the silica (1), and still more preferably not more than 4 times the amount of the silica (1).

The amount of the silica (1) is preferably not less than 5 parts by mass, and more preferably not less than 10 parts by mass for each 100 parts by mass of the rubber component. If the amount of the silica (1) is less than 5 parts by mass, the fuel economy may not be sufficiently improved. Also, the amount of the silica (1) is preferably not more than 90 parts by mass, and more preferably not more than 70 parts by mass. If the amount of the silica (1) is more than 90 parts by mass, good fuel economy is achieved, but the rubber strength and abrasion resistance tend to decrease.

The amount of the silica (2) is preferably not less than 5 parts by mass, and more preferably not less than 10 parts by mass for each 100 parts by mass of the rubber component. If the amount of the silica (2) is less than 5 parts by mass, sufficient handling stability may not be achieved. Also, the amount of the silica (2) is preferably not more than 90 parts by mass, and more preferably not more than 70 parts by mass. If the amount of the silica (2) is more than 90 parts by mass, good handling stability is achieved; however, the processability tends to deteriorate.

The total amount of the silica (1) and the silica (2) is preferably not less than 10 parts by mass, more preferably not less than 30 parts by mass, and still more preferably not less than 45 parts by mass for each 100 parts by mass of the rubber component. If the total amount is less than 10 parts by mass, the effect producible by blending the silica (1) and the silica (2) may not be sufficiently achieved. Thus, the abrasion resistance and rubber strength tend to decrease. The total amount of the silica (1) and the silica (2) is not more than 150 parts by mass, and preferably not more than 100 parts by mass. If the total amount exceeds 150 parts by mass, the processability tends to deteriorate.

The silica may be used together with a silane coupling agent. From a viewpoint that a combination use of the conjugated diene polymer and the silica can synergistically improve the properties, preferable examples of silane coupling agents include mercapto group-containing silane coupling agents. If a mercapto group-containing silane coupling agent is used together with the silica (1) and the silica (2) or a specific solid resin mentioned later, the effect of improving the properties can further be enhanced.

Preferable examples of the mercapto group-containing silane coupling agent include a compound represented by the formula (I) below, and a compound containing a linking unit A represented by the formula (2) below and a linking unit B represented by the formula (3) below, (1)

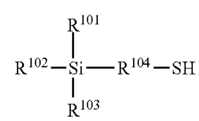

wherein $R^{101}$ to $R^{103}$ each represent a branched or unbranched $C_{1-12}$ alkyl group, a branched or unbranched $C_{1-12}$ alkoxy group, or a group represented by —O—($R^{111}$—O)$_z$—$R^{112}$ where z $R^{111}$s may be the same as or different from one another and z $R^{111}$s each represent a branched or unbranched $C_{1-30}$ divalent hydrocarbon group; $R^{112}$ represents a branched or unbranched $C_{1-30}$ alkyl group, a branched or unbranched $C_{2-30}$ alkenyl group, a $C_{6-30}$ aryl group, or a $C_{7-30}$ aralkyl group; and z represents an integer of 1 to 30, and $R^{101}$ to $R^{103}$ may be the same as or different from one another; and $R^{104}$ represents a branched or unbranched $C_{1-6}$ alkylene group, (2)

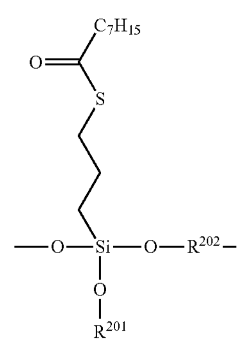

and (3)

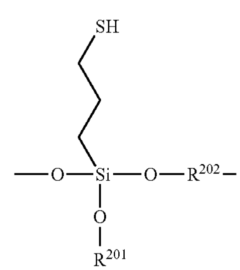

wherein $R^{201}$ represents a hydrogen atom, a halogen atom, a branched or unbranched $C_{1-30}$ alkyl group, a branched or unbranched $C_{2-30}$ alkenyl group, a branched or unbranched $C_{2-30}$ alkynyl group, or the alkyl group in which a terminal hydrogen atom is replaced with a hydroxyl group or a carboxyl group; $R^{202}$ represents a branched or unbranched $C_{1-30}$ alkylene group, a branched or unbranched $C_{2-30}$ alkenylene group, or a branched or unbranched $C_{2-30}$ alkynylene group; and $R^{201}$ and $R^{202}$ may be joined together to form a cyclic structure.

The following describes the compound represented by the formula (I).

The use of the compound represented by the formula (1) allows the silica to disperse well, and thus the effects of the present invention are well achieved. In particular, the use of the compound represented by the formula (1) can greatly improve the wet grip performance and fuel economy.

$R^{101}$ to $R^{103}$ each are a branched or unbranched $C_{1-12}$ alkyl group, a branched or unbranched $C_{1-12}$ alkoxy group, or a group represented by $—O—(R^{111}—O)_z—R^{112}$. In view of achieving the effects of the present invention well, preferably at least one of $R^{101}$ to $R^{103}$ is a group represented by $—O—(R^{111}—O)_z—R^{112}$, and more preferably two of $R^{101}$ to $R^{103}$ are groups represented by $—O—(R^{111}—O)_z—R^{112}$ and the other is a branched of unbranched $C_{1-12}$ alkoxy group.

Examples of the branched or unbranched $C_{1-12}$ (preferably $C_{1-5}$) alkyl group for $R^{101}$ to $R^{103}$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, and a nonyl group.

Examples of the branched or unbranched $C_{1-12}$ (preferably $C_{1-5}$) alkoxy group for $R^{101}$ to $R^{103}$ include a methoxy group, an ethoxy group, an n-propoxy group, an isopropoxy group, an n-butoxy group, an iso-butoxy group, a sec-butoxy group, a tert-butoxy group, a pentyloxy group, a hexyloxy group, a heptyloxy group, a 2-ethylhexyloxy group, an octyloxy group, and a nonyloxy group.

$R^{111}$ in the group represented by $—O—(R^{111}—O)_z—R^{112}$ for $R^{101}$ to $R^{103}$ represents a branched or unbranched $C_{1-30}$ (preferably $C_{1-15}$, more preferably $C_{1-3}$) divalent hydrocarbon group.

Examples of the hydrocarbon group include branched or unbranched $C_{1-30}$ alkylene groups, branched or unbranched $C_{2-30}$ alkenylene groups, branched or unbranched $C_{2-30}$ alkynylene groups, and branched or unbranched $C_{6-30}$ arylene groups. Branched or unbranched $C_{1-30}$ alkylene groups are preferred among the examples.

Examples of the branched or unbranched $C_{1-30}$ (preferably $C_{1-15}$, more preferably $C_{1-3}$) alkylene group for $R^{111}$ include a methylene group, an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group.

Examples of the branched or unbranched $C_{2-30}$ (preferably $C_{2-15}$, more preferably $C_{2-3}$) alkenylene group for $R^{111}$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group.

Examples of the branched or unbranched $C_{2-30}$ (preferably $C_{2-15}$, more preferably $C_{2-3}$) alkynylene group for $R^{111}$ include an ethynylene group, a propynylene group, a butynylene group, a pentynylene group, a hexynylene group, a heptynylene group, an octynylene group, a nonynylene group, a decynylene group, an undecynylene group, and a dodecynylene group.

Examples of the $C_{6-30}$ (preferably $C_{6-15}$) arylene group for $R^{111}$ include a phenylene group, a tolylene group, a xylylene group, and a naphthylene group.

Here, z represents an integer of 1 to 30 (preferably 2 to 20, more preferably 3 to 7, and still more preferably 5 or 6).

$R^{112}$ represents a branched or unbranched $C_{1-30}$ alkyl group, a branched or unbranched $C_{2-30}$ alkenyl group, a $C_{6-30}$ aryl group, or a $C_{7-30}$ aralkyl group. $R^{112}$ is especially preferably a branched or unbranched $C_{1-30}$ alkyl group.

Examples of the branched or unbranched $C_{1-30}$ (preferably $C_{3-25}$, more preferably $C_{10-15}$) alkyl group for $R^{112}$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, a nonyl group, a decyl group, an undecyl group, a dodecyl group, a tridecyl group, a tetradecyl group, a pentadecyl group, and an octadecyl group.

Examples of the branched or unbranched $C_{2-30}$ (preferably $C_{3-25}$, more preferably $C_{10-15}$) alkenyl group for $R^{112}$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, a 1-octenyl group, a decenyl group, an undecenyl group, a dodecenyl group, a tridecenyl group, a tetradecenyl group, a pentadecenyl group, and an octadecenyl group.

Examples of the $C_{6-30}$ (preferably $C_{10-20}$) aryl group for $R^{112}$ include a phenyl group, a tolyl group, a xylyl group, a naphthyl group, and a biphenyl group.

Examples of the $C_{7-30}$ (preferably $C_{10-20}$) aralkyl group for $R^{112}$ include a benzyl group and a phenethyl group.

Specific examples of the group represented by $—O—(R^{111}—O)_z—R^{112}$ include groups represented by $—O—(C_2H_4—O)_5—C_{11}H_{23}$, $—O—(C_2H_4—O)_5—C_{12}H_{25}$, $—O—(C_2H_4—O)_5—C_{13}H_{27}$, $—O—(C_2H_4—O)_5—C_{14}H_{29}$, $—O—(C_2H_4—O)_5—C_{15}H_{31}$, $—O—(C_2H_4—O)_3—C_{13}H_{27}$, $—O—(C_2H_4—O)_4—C_{13}H_{27}$, $—O—(C_2H_4—O)_6—C_{13}H_{27}$ and $—O—(C_2H_4—O)_7—C_{13}H_{27}$. Among the examples, groups represented by $—O—(C_2H_4—O)_5—C_{11}H_{23}$, $—O—(C_2H_4—O)_5—C_{13}H_{27}$, $—O—(C_2H_4—O)_5—C_{15}H_{31}$, and $—O—(C_2H_4—O)_6—C_{13}H_{27}$ are preferable.

Examples of the branched or unbranched $C_{1-6}$ (preferably $C_{1-5}$) alkylene group for $R^{104}$ include groups as mentioned for the branched or unbranched $C_{1-30}$ alkylene groups for $R^{111}$.

Examples of the compound represented by the formula (1) include 3-mercaptopropyltrimethoxysilane, 3-mercaptopropyltriethoxysilane, 2-mercaptoethyl-trimethoxysilane, 2-mercaptoethyltriethoxysilane, and a compound represented by the following formula (Si363 produced by Evonik Degussa). Use of the compound represented by the following formula is preferred. Any of these compounds may be used alone or two or more of these may be used in combination.

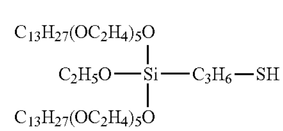

The following describes the compound containing a linking unit A represented by the formula (2) and a linking unit B represented by the formula (3).

In the case where the compound containing a linking unit A represented by the formula (2) and a linking unit B represented by the formula (3) is used, the increase in viscosity during the processing is suppressed as compared to the case where polysulfide silane such as bis-(3-triethoxysilylpropyl) tetrasulfide is used. This is presumably because, since the sulfide moiety of the linking unit A is a C—S—C bond, the compound is thermally more stable than tetrasulfide or disulfide, and thus the Mooney viscosity is less likely to increase.

Moreover, the decrease in the scorch time is suppressed compared to the case where mercapto silane such as 3-mercaptopropyltrimethoxysilane is used. This is presumably because, though the linking unit B has a mercapto silane structure, the —$C_7H_{15}$ moiety of the linking unit A covers a —SH group of the linking unit B, as a result of which the SH group is less likely to react with polymers. Thus, scorch is less likely to occur.

From the viewpoint of enhancing the effects of suppressing the viscosity increase during the processing and of suppressing the decrease in the scorch time as mentioned above, the linking unit A content in the silane coupling agent having the foregoing structure is preferably not less than 30 mol %, and more preferably not less than 50 mol %, but is preferably not more than 99 mol %, and more preferably not more than 90 mol %. The linking unit B content is preferably not less than 1 mol %, more preferably not less than 5 mol %, and still more preferably not less than 10 mol %, but is preferably not more than 70 mol %, more preferably not more than 65 mol %, and still more preferably not more than 55 mol %. The combined amount of the linking unit A and the linking unit B is preferably not less than 95 mol %, more preferably not less than 98 mol %, and particularly preferably 100 mol %.

The amount of the linking unit A or B is the amount including the linking unit A or B that is present at the terminal of the silane coupling agent, if any. In the case where the linking unit A or B is present at the terminal of the silane coupling agent, its form is not particularly limited as long as it forms a unit corresponding to the formula (2) representing the linking unit A or the formula (3) representing the linking unit B.

Examples of the halogen atom for $R^{201}$ include chlorine, bromine, and fluorine.

Examples of the branched or unbranched $C_{1-30}$ alkyl group for $R^{201}$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, a nonyl group, and a decyl group. The alkyl group preferably has 1 to 12 carbon atom(s).

Examples of the branched or unbranched $C_{2-30}$ alkenyl group for $R^{201}$ include a vinyl group, a 1-propenyl group, a 2-propenyl group, a 1-butenyl group, a 2-butenyl group, a 1-pentenyl group, a 2-pentenyl group, a 1-hexenyl group, a 2-hexynyl group, and a 1-octenyl group. The alkenyl group preferably has 2 to 12 carbon atoms.

Examples of the branched or unbranched $C_{2-30}$ alkynyl group for $R^{201}$ include an ethynyl group, a propynyl group, a butynyl group, a pentynyl group, a hexynyl group, a heptynyl group, an octynyl group, a nonynyl group, a decynyl group, an undecynyl group, and a dodecynyl group. The alkynyl group preferably has 2 to 12 carbon atoms.

Examples of the branched or unbranched $C_{1-30}$ alkylene group for $R^{202}$ include an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group. The alkylene group preferably has 1 to 12 carbon atom(s).

Examples of the branched or unbranched $C_{2-30}$ alkenylene group for $R^{202}$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group. The alkenylene group preferably has 2 to 12 carbon atoms.

Examples of the branched or unbranched $C_{2-30}$ alkynylene group for $R^{202}$ include an ethynylene group, a propynylene group, a butynylene group, a pentynylene group, a hexynylene group, a heptynylene group, an octynylene group, a nonynylene group, a decynylene group, an undecynylene group, and a dodecynylene group. The alkynylene group preferably has 2 to 12 carbon atoms.

In the compound containing the linking unit A represented by the formula (2) and the linking unit B represented by the formula (3), the total number of repetitions (x+y) of the number of repetitions (x) of the linking unit A and the number of repetitions (y) of the linking unit B is preferably in the range of 3 to 300. If the total number of repetitions is in the range mentioned above, the —$C_7H_{15}$ moiety of the linking unit A covers the mercaptosilane of the linking unit B, which enables not only to suppress the decrease in the scorch time but also to surely achieve good reactivity to silica and the rubber component.

Examples of the compound containing the linking unit A represented by the formula (2) and the linking unit B represented by the formula (3) include NXT-Z30, NXT-Z45, and NXT-Z60 (produced by Momentive Performance Materials). Any of these may be used alone, or two or more of these may be used in combination.

The amount of the mercapto group-containing silane coupling agent is preferably not less than 0.5 parts by mass, and more preferably not less than 3 parts by mass for each 100 parts by mass of the silica. If the amount is less than 0.5 parts by mass, the resulting unvulcanized rubber composition tends to have high viscosity. Thus, sufficient processability may not be surely achieved. Also, the amount of the mercapto group-containing silane coupling agent is preferably not more than 20 parts by mass, and more preferably not more than 10 parts by mass. If the amount exceeds 20 parts by mass, the rubber strength and abrasion resistance tend to deteriorate.

The rubber composition of the present invention preferably includes other silane coupling agents as well as the mercapto group-containing silane coupling agent. This enables to enhance the effect of improving the properties. Examples of other silane coupling agents include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, 3-trimethoxysilylpropyl-N,N-dimethylthiocarbamoyl tetrasulfide, bis(3-trimethoxysilylpropyl)tetrasulfide, bis(2-trimethoxysilylethyl)tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazolyl tetrasulfide, 3-triethoxysilylpropylmethacrylate monosulfide, 3-trimethoxysilylpropylmethacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, and dimethoxymethylsilylpropylbenzothiazole tetrasulfide. Preferred among these is bis(3-triethoxysilylpropyl)tetrasulfide.

The amount of the other silane coupling agent is preferably not less than 0.5 parts by mass, and more preferably not less than 3 parts by mass for each 100 parts by mass of the silica. If the amount is less than 0.5 parts by mass, the resulting unvulcanized rubber composition has high viscosity. Thus, sufficient processability may not be surely achieved. Also, the amount of the other silane coupling agent is preferably not more than 20 parts by mass, and more preferably not more than 10 parts by mass. If the amount exceeds 20 parts by mass, the rubber strength and abrasion resistance tend to deteriorate.

The total amount of the silane coupling agents is preferably not less than 0.5 parts by mass, and more preferably not less than 3 parts by mass for each 100 parts by mass of the silica. If the amount is less than 0.5 parts by mass, the resulting unvulcanized rubber composition has high viscosity. Thus, sufficient processability may not be surely achieved. Also, the total amount of the silane coupling agents is preferably not more than 20 parts by mass, and more preferably not more than 10 parts by mass. If the total amount exceeds 20 parts by mass, the rubber strength and abrasion resistance tend to deteriorate.

The rubber composition of the present invention preferably includes a solid resin having a glass transition temperature of 60 to 120° C. If the solid resin is used together with the conjugated diene polymer, the effect of improving the properties can be synergistically enhanced. Moreover, if the solid resin is used together with the mercapto group-containing silane coupling agent, or the silica (1) and the silica (2), the effect of improving the properties can further be enhanced.

The solid resin has a glass transition temperature (Tg) of not lower than 60° C., and preferably not lower than 75° C. If the solid resin has a glass transition temperature of lower than 60° C., the effect of improving the wet-grip performance may not be sufficiently achieved. The solid resin has a Tg of not higher than 120° C., and preferably not higher than 100° C. If the solid resin has a Tg of higher than 120° C., the loss elastic modulus at high temperature ranges increases greatly so that the fuel economy tends to deteriorate.

The Tg of the solid resin is a value (midpoint glass transition temperature) measured at a rate of temperature rise of 10° C./min. with a differential scanning calorimeter Q200 (produced by TA Instruments Japan Inc.) in accordance with JIS-K7121.

Any solid resin may be used as the solid resin as long as it has a Tg mentioned above. Examples of the solid resin include an aromatic resin, such as an aromatic vinyl polymer prepared by polymerizing α-methyl styrene and/or styrene, a coumarone-indene resin, or an indene resin; a terpene resin; and a rosin resin. The derivatives of those resins may also be used. An aromatic resin is preferable, and an aromatic vinyl polymer prepared by polymerizing α-methyl styrene and/or styrene and a coumarone-indene resin are more preferable, as the use of such solid rubber enables to provide an unvulcanized rubber composition with good adhesion property and to achieve good fuel economy.

Styrene and/or α-methyl styrene is used as an aromatic vinyl monomer (unit) of the aromatic vinyl polymer prepared by polymerizing α-methyl styrene and/or styrene (resin obtained by polymerizing α-methyl styrene and/or styrene). The aromatic vinyl polymer may be a homopolymer of one monomer, or a copolymer of both monomers. Preferably, the aromatic vinyl polymer is a homopolymer of α-methyl styrene, or a copolymer of α-methyl styrene and styrene as use of such a homopolymer or copolymer is cost efficient, and enables to achieve good processability and excellent wet-grip performance.

The aromatic vinyl polymer has a weight-average molecular weight (Mw) of preferably not less than 500, and more preferably not less than 800. If the Mw is less than 500, the effect of improving the wet-grip performance tends not to be easily achieved sufficiently. The aromatic vinyl polymer has a weight-average molecular weight of preferably not more than 3000, and more preferably not more than 2000. If the Mw is more than 3000, the dispersibility of the filler decreases so that the fuel economy tends to deteriorate.

Herein, the weight-average molecular weight can be measured using gel permeation chromatography (GPC) (GPC-8000 series produced by Tosoh Corporation, detector: differential refractometer) and expressed as a polystyrene-equivalent value.

The coumarone-indene resin and the indene resin are a coal or petroleum resin containing coumarone having eight carbon atoms and indene having nine carbon atoms as principal monomers, and a coal or petroleum resin containing indene as a principal monomer, respectively. Specific examples thereof include vinyltoluene-α-methylstyrene-indene resin, vinyltoluene-indene resin, α-methylstyrene-indene resin, and α-methylstyrene-vinyltoluene-indene copolymer resin.

The terpene resin is a resin that is derived from, as a principal monomer, a terpene compound having a terpene backbone such as a monoterpene, a sesquiterpene or a diterpene. Examples thereof include α-pinene resin, β-pinene resin, limonene resin, dipentene resin, β-pinene/limonene resins, aromatic modified terpene resin, terpene phenolic resin, and hydrogenated terpene resin. Examples of the rosin resin include natural rosin resin (polymerized rosin) such as gum rosin, wood rosin and tall oil rosin, hydrogenated rosin resins, maleic acid-modified rosin resin, rosin-modified phenolic resin, rosin glycerol esters, and disproportionated rosin resin. Natural rosin resins can be produced by processing pine resin, and each mainly contains a resin acid such as abietic acid or pimaric acid.

The amount of the solid resin is preferably not less than 1 part by mass, more preferably not less than 3 parts by mass, and still more preferably not less than 5 parts by mass for each 100 parts by mass of the rubber component. If the amount is less than 1 part by mass, the effect of improving the wet-grip performance tends not to be sufficiently achieved. The amount of the solid resin is preferably not more than 30 parts by mass, and more preferably not more than 15 parts by mass. If the amount is more than 30 parts by mass, the elastic modulus of the rubber composition at low temperature ranges increases greatly. Thus, the grip performance on snowy roads and the wet-grip performance in cold regions tend to deteriorate.

The rubber composition of the present invention preferably includes at least one liquid resin having a glass transition temperature of −40 to 20° C. selected from the group consisting of aromatic petroleum resins, terpene resins, and rosin resins, and/or a plasticizer having a glass transition temperature of −40 to 20° C. The rubber composition more preferably includes the solid resin as well as the liquid resin and/or the plasticizer. This enables not only to improve the grip performance in wide temperature ranges but also to improve the rubber strength while maintaining the fuel economy.

The liquid resin and the plasticizer each have a Tg of not lower than −40° C., and preferably not lower than −20° C. A Tg of lower than −40° C. excessively increases the action of plasticizing rubber so that the abrasion resistance tends to deteriorate. The liquid resin and the plasticizer each have a Tg of not higher than 20° C., and preferably not higher than 10° C. A Tg of higher than 20° C. leads to a large loss elastic modulus so that the fuel economy tends to deteriorate.

The Tg of the liquid resin and that of the plasticizer are values (midpoint glass transition temperatures) measured at a rate of temperature rise of 10° C./min. with a differential scanning calorimeter Q200 (produced by TA Instruments Japan Inc.) in accordance with JIS-K7121.

The liquid resin to be used is at least one selected form the group consisting of aromatic petroleum resins, terpene resins, and rosin resins. An aromatic petroleum resin is preferable as it has a higher effect of improving the rubber strength.

The aromatic petroleum resin applicable as the liquid resin is a resin obtained by polymerizing an aromatic fraction having 9 carbon atoms (C9) containing, as a principal monomer, vinyl toluene or indene which is usually produced by thermal decomposition of naphtha. Examples thereof include low molecular weight forms listed for the solid resin, such as an aromatic vinyl polymer prepared by polymerizing α-methyl styrene and/or styrene, a coumarone resin, or a coumarone-indene resin. Preferred among these are a homopolymer of α-methyl styrene, a copolymer of α-methyl styrene and styrene, a coumarone resin, and a coumarone-indene resin, and more preferred is a coumarone-indene resin, as these resins have a higher effect of improving the rubber strength, abrasion resistance, and wet-grip performance.

Examples of commercially available products of such resins include NOVARES C10 (produced by Rutgers chemicals AG), and Picco A-10 (produced by Eastoman Chemical Company).

Low molecular weight forms of the terpene resins and the rosin resins listed for the solid resin may be used as the liquid resin. Examples of commercially available products of the terpene resin that can be used as the liquid resin include YS resin PX300, YS resin PX300N, Dimerone, and YS Polyster T30 (produced by Yasuhara Chemical Co., Ltd.). Examples of commercially available products of the rosin resin that can be used as the liquid resin include HARIESTER SK-501NS (produced by Harima Chemicals, Inc.).

Any plasticizer may be used as the plasticizer as long as it has a Tg mentioned above. Examples of the plasticizer include a diene polymer having a weight average molecular weight (Mw) of 3,000 to 150,000. In the case of using a diene polymer as the plasticizer, a diene polymer having an epoxidation degree of not more than 25 mol % is preferably used.

The combined amount of the liquid resin and the plasticizer is preferably not less than 1 part by mass, and more preferably not less than 5 parts by mass for each 100 parts by mass of the rubber component. If the combined amount is less than 1 part by mass, the rubber strength and the grip performance in wide temperature ranges may not be sufficiently improved. The combined amount is preferably not more than 30 parts by mass, more preferably not more than 20 parts by mass, and still more preferably not more than 10 parts by mass. If the combined amount is more than 30 parts by mass, the rigidity of the rubber composition tends to be greatly impaired, and the handling stability tends to decrease.

The combined amount of the solid resin, the liquid resin and the plasticizer for each 100 parts by mass of the rubber component is preferably not less than 2 parts by mass, and more preferably not less than 6 parts by mass, but is preferably not more than 60 parts by mass, more preferably not more than 30 parts by mass, and still more preferably not more than 20 parts by mass. If the combined amount is within the range mentioned above, a balanced improvement in processability, fuel economy, rubber strength, abrasion resistance, wet-grip performance, and handling stability can be achieved at high levels.

Known additives may be used, and examples thereof include vulcanization agents such as sulfur; vulcanization accelerators such as a thiazole-based vulcanization accelerator, a thiuram-based vulcanization accelerator, a sulfenamide-based vulcanization accelerator, and a guanidine-based vulcanization accelerator; vulcanization activating agents such as stearic acid and zinc oxide; organic peroxides; fillers such as carbon black, calcium carbonate, talc, alumina, clay, aluminum hydroxide, and mica; processing aids such as extender oils and lubricants; and antioxidants.

Examples of the carbon black include furnace black (furnace carbon black) such as SAF, ISAF, HAF, MAF, FEF, SRF, GPF, APF, FF, CF, SCF or ECF; acetylene black (acetylene carbon black); thermal black (thermal carbon black) such as FT or MT; channel black (channel carbon black) such as EPC, MPC or CC; and graphite. Any of these may be used alone or two or more of these may be used in combination.

The amount of carbon black is preferably not less than 1 part by mass, and more preferably not less than 3 parts by mass for each 100 parts by mass of the rubber component. If the amount is less than 1 part by mass, sufficient reinforcement may not be achieved. Also, the amount of carbon black is preferably not more than 60 parts by mass, more preferably not more than 30 parts by mass, still more preferably not more than 15 parts by mass, and particularly preferably not more than 10 parts by mass. If the amount is more than 60 parts by mass, the fuel economy tends to deteriorate.

The nitrogen adsorption specific surface area ($N_2SA$) of carbon black is usually 5 to 200 $m^2/g$, and preferably the lower limit and the upper limit thereof are 50 $m^2/g$ and 150 $m^2/g$, respectively. The dibutyl phthalate (DBP) absorption of carbon black is usually 5 to 300 mL/100 g, and preferably the lower limit and the upper limit thereof are 80 mL/100 g and 180 mL/100 g, respectively. If the $N_2SA$ or DBP absorption of carbon black is lower than the lower limit of the range mentioned above, the reinforcement is small, and the abrasion resistance tends to decrease. If the $N_2SA$ or DBP absorption of carbon black is larger than the upper limit of the range mentioned above, the carbon black does not disperse well, and the hysteresis loss increases. Thus, the fuel economy tends to deteriorate. The nitrogen adsorption specific surface area is measured in accordance with ASTM D4820-93. The DBP absorption is measured in accordance with ASTM D2414-93. Examples of commercially available carbon black include SEAST 6, SEAST 7HM, and SEAST KH (trade name, produced by Tokai Carbon Co., Ltd.), and CK 3 and Special Black 4A (trade name, produced by Evonik Degussa).

Examples of the extender oil include aromatic mineral oils (viscosity gravity constant (V.G.C. value) 0.900 to 1.049), naphthenic mineral oils (V.G.C. value 0.850 to 0.899), and paraffinic mineral oils (V.G.C. value 0.790 to 0.849). The polycyclic aromatic content in the extender oil is preferably less than 3% by mass, and more preferably less than 1% by mass. The polycyclic aromatic content is measured according to the British Institute of Petroleum 346/92 Method. The aromatic compound (CA) content in the extender oil is preferably not less than 20% by mass. Two or more kinds of these extender oils may be used in combination.

Examples of the vulcanization accelerator include thiazole-based vulcanization accelerators such as 2-mercaptobenzothiazole, dibenzothiazyl disulfide, and N-cyclohexyl-2-benzothiazylsulfenamide; thiuram-based vulcanization accelerators such as tetramethylthiuram monosulfide and tetramethylthiuram disulfide; sulfenamide-based vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, diorthotolylguanidine, and orthotolylbiguanidine. The amount thereof to be used is preferably 0.1 to 5 parts by mass, and more preferably 0.2 to 3 parts by mass for each 100 parts by mass of the rubber component.

Known methods may be employed for producing a rubber composition by adding other rubber materials and additives to the conjugated diene polymer. Examples of the method include a method of kneading components with a known mixer such as a roll mill or a Banbury mixer.

With regard to the kneading conditions for the case where additives other than the vulcanization agent and the vulcanization accelerator are mixed, the kneading temperature is usually 50 to 200° C., and preferably 80 to 190° C., and the kneading time is usually 30 seconds to 30 minutes, and preferably 1 minute to 30 minutes.

In the case where the vulcanization agent and the vulcanization accelerator are mixed, the kneading temperature is usually not higher than 100° C., and preferably room temperature to 80° C. The composition containing a vulcanization agent and a vulcanization accelerator is usually used after it is vulcanized by press vulcanization or the like. The vulcanization temperature is usually 120 to 200° C., and preferably 140 to 180° C.

The rubber composition of the present invention has a tan δ peak temperature of preferably lower than −16° C., and more preferably not higher than −18° C. If the rubber composition has a tan δ peak temperature of not lower than −16° C., the temperature dependence increases. Thus, sufficient wet-grip performance may not be easily exerted in wide temperature ranges. The rubber composition of the present invention has a tan δ peak temperature of preferably not lower than −60° C., and more preferably not lower than −50° C. If the rubber composition has a tan δ peak temperature of lower than −60° C., sufficient wet-grip performance may not be easily exerted.

Meanwhile, the tan δ peak temperature is measured by the method described in examples below.

The rubber composition of the present invention is excellent in balance among the processability, fuel economy, rubber strength, abrasion resistance, wet-grip performance, and handling stability, and has effects of significantly improving these properties.

The rubber composition of the present invention may be used in a component of a tire, suitably in a tread (particularly a tread of all-season tires).

The pneumatic tire of the present invention is formed from the rubber composition by a usual method. Namely, before vulcanization, the rubber composition optionally containing various additives is extruded and processed into the shape of a tire component (e.g., tread), and then molded in a normal manner on a tire building machine and assembled with other tire components to provide an unvulcanized tire. Then, the unvulcanized tire is heated and pressed in a vulcanizer into a pneumatic tire. Thus, the pneumatic tire of the present invention can be produced.

The pneumatic tire of the present invention can be suitably used as all-season tires (particularly, all-season tires for passenger vehicles).

EXAMPLES

The present invention is more specifically described based on examples. However, the present invention is not limited thereto.

The following is a list of chemical agents used in the synthesis or polymerization. The chemical agents were purified as needed by usual methods.

THF: anhydrous tetrahydrofuran, produced by Kanto Chemical Co., Inc.

Sodium hydride: produced by Kanto Chemical Co., Inc.

Diethylamine: produced by Kanto Chemical Co., Inc.

Methylvinyldichlorosilane: produced by Shin-Etsu Chemical Co., Ltd.

Anhydrous hexane: produced by Kanto Chemical Co., Inc.

Styrene: produced by Kanto Chemical Co., Inc.

Butadiene: 1,3-butadiene, produced by Tokyo Chemical Industry Co., Ltd.

TMEDA: tetramethylethylenediamine, produced by Kanto Chemical Co., Inc.

n-Butyllithium solution: 1.6 M n-butyllithium in hexane, produced by Kanto Chemical Co., Inc.

Initiator (1): AI-200CE2 (compound prepared by bonding 3-(N,N-dimethylamino)-1-propyllithium and two isoprene-derived structural units, represented by the following formula) (0.9 M), produced by FMC

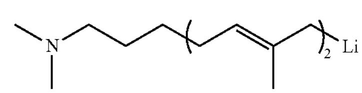

Piperidine: produced by Tokyo Chemical Industry Co., Ltd.

Diamylamine: produced by Tokyo Chemical Industry Co., Ltd.

2,6-Di-tert-butyl-p-cresol: Nocrac 200, produced by Ouchi Shinko Chemical Industrial Co., Ltd.

Bis(dimethylamino)methylvinylsilane: produced by Shin-Etsu Chemical Co., Ltd.

N,N-dimethylaminopropylacrylamide: produced by Tokyo Chemical Industry Co., Ltd.

3-Diethylaminopropyltriethoxysilane: produced by Azmax Co., Ltd.

1,3-Dimethyl-2-imidazolidinone: produced by Tokyo Chemical Industry Co., Ltd.

N-phenyl-2-pyrrolidone: produced by Tokyo Chemical Industry Co., Ltd.

N-methyl-ϵ-caprolactam: produced by Tokyo Chemical Industry Co., Ltd.

Tris[3-(trimethoxysilyl)propyl]isocyanurate: produced by Shin-Etsu Chemical Co., Ltd.

N,N-dimethylformamide dimethyl acetal: produced by Tokyo Chemical Industry Co., Ltd.

1,3-Diisopropenylbenzene: produced by Tokyo Chemical Industry Co., Ltd.

sec-Butyllithium solution: produced by Kanto Chemical Co., Inc. (1.0 mol/L)

Cyclohexane: produced by Kanto Chemical Co., Inc.

<Production of Modifier (1) (Main Chain Modifier)>

In a nitrogen atmosphere, 15.8 g of bis(dimethylamino) methylvinylsilane was charged into a 100-mL volumetric flask, and also anhydrous hexane was added to increase the total amount to 100 mL. In this manner, a modifier (1) was produced.

<Production of Modifier (2) (Terminal Modifier)>

In a nitrogen atmosphere, 15.6 g of N,N-dimethylaminopropylacrylamide was charged into a 100-mL volumetric flask, and also anhydrous hexane was added to increase the total amount to 100 mL. In this manner, a modifier (2) was produced.

<Production of Modifier (3) (Main Chain Modifier)>

THF (1000 mL) and sodium hydride (13 g) were charged into a sufficiently nitrogen-purged 2-L three-necked flask, and diethylamine (36.5 g) was slowly added dropwise thereto on an ice water bath while stirring. After stirring for 30 minutes, methylvinyldichlorosilane (36 g) was added dropwise over 30 minutes, followed by stirring for 2 hours. The resulting solution was concentrated, filtered, and purified by distillation under reduced pressure to give bis(diethylamino) methylvinylsilane. The bis(diethylamino)methylvinylsilane (21.4 g) was charged into a 100-mL volumetric flask in a nitrogen atmosphere, and also anhydrous hexane was added to increase the total amount to 100 mL. In this manner, a modifier (3) was produced.

<Production of Initiator (2)>

Anhydrous hexane (127.6 mL) and piperidine (8.5 g) were charged into a sufficiently nitrogen-purged 200-mL recovery flask, and cooled to 0° C. Then, an n-butyllithium solution (62.5 mL) was slowly added over 1 hour to give an initiator (2).

<Production of Initiator (3)>

Anhydrous hexane (117 mL) and diamylamine (15.7 g) were charged into a sufficiently nitrogen-purged 200-mL recovery flask, and cooled to 0° C. Then, an n-butyllithium solution (62.5 mL) was slowly added over 1 hour to give an initiator (3).

<Production of Modifier (4) (Terminal Modifier)>

In a nitrogen atmosphere, 3-diethylaminopropyltriethoxysilane (27.7 g) was charged into a 100-mL volumetric flask, and also anhydrous hexane was added to increase the total amount to 100 mL. In this manner, a modifier (4) was produced.

<Production of Initiator (4) (Bifunctional Initiator)>

Cyclohexane (550 mL), TMEDA (27 mL), and a sec-butyllithium solution (200 mL) were charged into a sufficiently dried and nitrogen-purged 1-L recovery flask. While the mixture was stirred at 45° C., 1,3-diisopropenylbenzene (17 mL) was slowly added thereto over 30 minutes. The resulting mixed solution was stirred for another 1 hour, and then cooled to room temperature to give an initiator (4).

<Production of Modifier (5) (Terminal Modifier)>

In a nitrogen atmosphere, 1,3-dimethyl-2-imidazolidinone (11.4 g) was charged into a 100-mL volumetric flask, and also anhydrous hexane was added to increase the total amount to 100 mL. In this manner, a modifier (5) was produced.

<Production of Modifier (6) (Terminal Modifier)>

In a nitrogen atmosphere, N-phenyl-2-pyrrolidone (16.1 g) was charged into a 100-mL volumetric flask, and also anhydrous hexane was added to increase the total amount to 100 mL. In this manner, a modifier (6) was produced.

<Production of Modifier (7) (Terminal Modifier)>

In a nitrogen atmosphere, N-methyl-ϵ-caprolactam (12.7 g) was charged into a 100-mL volumetric flask, and also anhydrous hexane was added to increase the total amount to 100 mL. In this manner, a modifier (7) was produced.

<Production of Modifier (8) (Terminal Modifier)>

In a nitrogen atmosphere, tris[3-(trimethoxysilyl)propyl] isocyanurate (30.7 g) was charged into a 100-mL volumetric flask, and also anhydrous hexane was added to increase the total amount to 200 mL. In this manner, a modifier (8) was produced.

<Production of Modifier (9) (Terminal Modifier)>

In a nitrogen atmosphere, N,N-dimethylformamide dimethyl acetal (11.9 g) was charged into a 100-mL volumetric flask, and also anhydrous hexane was added to increase the total amount to 200 mL. In this manner, a modifier (9) was produced.

<Copolymer Analysis>

Copolymers (conjugated diene polymers) obtained as mentioned later were analyzed by the following methods.

<Measurement of Weight-Average Molecular Weight (Mw) and Number-Average Molecular Weight (Mn)>

The weight-average molecular weight (Mw) and number-average molecular weight (Mn) of each copolymer were measured using gel permeation chromatography (GPC) (GPC-8000 series produced by Tosoh Corporation, detector: differential refractometer, column: TSKGEL SUPERMULTIPORE HZ-M produced by Tosoh Corporation), and expressed relative to polystyrene standards. A molecular weight distribution Mw/Mn was calculated from the measurement results.

<Structural Identification of Copolymers>

Structures (styrene content, vinyl content) of copolymers were identified with a device of JNM-ECA series produced by JEOL Ltd. Each polymer (0.1 g) was dissolved in toluene (15 mL), and the solution was slowly introduced in methanol (30 mL) for reprecipitation. The resulting precipitate was dried under reduced pressure, and then measured.

<Synthesis of Copolymer (1)> n-Hexane (18 L), styrene (600 g), butadiene (1400 g), the modifier (1) (40 mL), and TMEDA (10 mmol) were charged into a sufficiently nitrogen-purged 30-L pressure resistant container, and heated to 40° C. After further addition of the initiator (2) (34 mL), the mixture was heated to 50° C., and stirred for 3 hours. Next, the modifier (2) (20 mL) was added, followed by stirring for 30 minutes, and the reaction solution was mixed with methanol (15 mL) and 2,6-tert-butyl-p-cresol (0.1 g). Thereafter, a coagulum was recovered from the polymer solution by steam stripping treatment, and the coagulum was dried under reduced pressure for 24 hours to give a copolymer (1). Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (2)) containing a nitrogen atom and/or a silicon atom was added per mol of the alkali metal derived from the polymerization initiator added.

<Synthesis of Copolymer (2)>

A copolymer (2) was produced based on the same formulation as that for synthesis of the copolymer (1), except that the initiator (3) (34 mL) was used instead of the initiator (2) (34 mL). Here, 0.32 g of the silicon-containing vinyl compound (modifier (1)) was added for each 100 g of the monomer component; 0.85 mmol of the polymerization initiator (initiator (3)) was added for each 100 g of the monomer component; and 1.18 mol of the compound (modifier (2)) containing a nitrogen atom and/or a silicon atom was added per mol of the alkali metal derived from the polymerization initiator added.

<Synthesis of Copolymer (3)>

A copolymer (3) was produced based on the same formulation as that for synthesis of the copolymer (1), except that the amounts of styrene and butadiene were changed to 900 g and 1100 g, respectively. Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (2)) containing a nitrogen atom and/or a silicon atom was added per mol of the alkali metal derived from the polymerization initiator added.

<Synthesis of Copolymer (4)>

A copolymer (4) was produced based on the same formulation as that for synthesis of the copolymer (1), except that the initiator (1) (19 mL) was used instead of the initiator (2) (34 mL). Here, 0.32 g of the silicon-containing vinyl compound (modifier (1)) was added for each 100 g of the monomer component; 0.85 mmol of the polymerization initiator (initiator (1)) was added for each 100 g of the monomer component; and 1.18 mol of the compound (modifier (2)) containing a nitrogen atom and/or a silicon atom was added per mol of the alkali metal derived from the polymerization initiator added.

<Synthesis of Copolymer (5)> n-Hexane (18 L), styrene (600 g), butadiene (1400 g), the modifier (1) (75 mL), and TMEDA (10 mmol) were charged into a sufficiently nitrogen-purged 30-L pressure resistant container, and heated to 40° C. After further addition of the initiator (1) (19 mL), the mixture was heated to 50° C. and stirred for 30 minutes. Further, the modifier (1) (75 mL) was added, and the mixture was stirred for 2.5 hours. Next, the modifier (2) (20 mL) was added, followed by stirring for 30 minutes, and the reaction solution was mixed with methanol (1 mL) and 2,6-tert-butyl-p-cresol (0.1 g). Thereafter, a coagulum was recovered from the polymer solution by steam stripping treatment, and the coagulum was dried under reduced pressure for 24 hours to give a copolymer (5). Here, 1.19 g of the silicon-containing vinyl compound (modifier (1)) was added for each 100 g of the monomer component; 0.85 mmol of the polymerization initiator (initiator (1)) was added for each 100 g of the monomer component; and 1.18 mol of the compound (modifier (2)) containing a nitrogen atom and/or a silicon atom was added per mol of the alkali metal derived from the polymerization initiator added.

<Synthesis of Copolymer (6)>

A copolymer (6) was produced based on the same formulation as that for synthesis of the copolymer (4), except that the amounts of styrene and butadiene were changed to 0 g and 2000 g, respectively; THF (5 mmol) was used instead of TMEDA (10 mmol); and the initiator (1) (23 mL) was used instead of the initiator (1) (19 mL). Here, 0.32 g of the silicon-containing vinyl compound (modifier (1)) was added for each 100 g of the monomer component; 1.05 mmol of the polymerization initiator (initiator (1)) was added for each 100 g of the monomer component; and 0.95 mol of the compound (modifier (2)) containing a nitrogen atom and/or a silicon atom was added per mol of the alkali metal derived from the polymerization initiator added.

<Synthesis of Copolymer (7)>

A copolymer (7) was produced based on the same formulation as that for synthesis of the copolymer (4), except that the modifier (3) (40 mL) was used instead of the modifier (1) (40 mL). Here, 0.43 g of the silicon-containing vinyl compound (modifier (3)) was added for each 100 g of the monomer component; 0.85 mmol of the polymerization initiator (initiator (1)) was added for each 100 g of the monomer component; and 1.18 mol of the compound (modifier (2)) containing a nitrogen atom and/or a silicon atom was added per mol of the alkali metal derived from the polymerization initiator added.

<Synthesis of Copolymer (8)>

A copolymer (8) was produced based on the same formulation as that for synthesis of the copolymer (7), except that an n-butyllithium solution (10.6 mL) was used instead of the initiator (1) (19 mL). Here, 0.43 g of the silicon-containing vinyl compound (modifier (3)) was added for each 100 g of the monomer component; and 1.18 mol of the compound (modifier (2)) containing a nitrogen atom and/or a silicon atom was added per mol of the alkali metal derived from the polymerization initiator added.

<Synthesis of Copolymer (9)>

A copolymer (9) was produced based on the same formulation as that for synthesis of the copolymer (6), except that an n-butyllithium solution (13 mL) was used instead of the initiator (1) (23 mL). Here, 0.43 g of the silicon-containing vinyl compound (modifier (1)) was added for each 100 g of the monomer component; and 0.95 mol of the compound (modifier (2)) containing a nitrogen atom and/or a silicon atom was added per mol of the alkali metal derived from the polymerization initiator added.

<Synthesis of Copolymer (10)>

A copolymer (10) was produced based on the same formulation as that for synthesis of the copolymer (1), except that the amount of the modifier (1) was changed from 40 mL to 0 mL. Here, 0.85 mmol of the polymerization initiator (initiator (2)) was added for each 100 g of the monomer component; and 1.18 mol of the compound (modifier (2)) containing a nitrogen atom and/or a silicon atom was added per mol of the alkali metal derived from the polymerization initiator added.

<Synthesis of Copolymer (11)>

A copolymer (11) was produced based on the same formulation as that for synthesis of the copolymer (1), except that the amount of the modifier (2) was changed from 20 mL to 0 mL. Here, 0.32 g of the silicon-containing vinyl compound (modifier (1)) was added for each 100 g of the monomer component; and 0.85 mmol of the polymerization initiator (initiator (2)) was added for each 100 g of the monomer component.

<Synthesis of Copolymer (12)> n-Hexane (18 L), styrene (600 g), butadiene (1400 g), and TMEDA (10 mmol) were charged into a sufficiently nitrogen-purged 30-L pressure resistant container, and heated to 40° C. After further addition of an n-butyllithium solution (11 mL), the mixture was heated to 50° C. and stirred for 3 hours. Next, the reaction solution was mixed with methanol (1 mL) and 2,6-tert-butyl-p-cresol (0.1 g). A coagulum was recovered from the polymer solution by steam stripping treatment, and the coagulum was dried under reduced pressure for 24 hours to give a copolymer (12).

<Synthesis of Copolymer (13)>

A copolymer (13) was produced based on the same formulation as that for synthesis of the copolymer (7), except that a coagulum was recovered from the polymer solution not by steam stripping treatment but by evaporating the polymer solution at room temperature for 24 hours, followed by drying the coagulum under reduced pressure. Here, 0.43 g of the silicon-containing vinyl compound (modifier (3)) was added for each 100 g of the monomer component; 0.85 mmol of the polymerization initiator (initiator (1)) was added for each 100 g of the monomer component; and 1.18 mol of the compound (modifier (2)) containing a nitrogen atom and/or a silicon atom was added per mol of the alkali metal derived from the polymerization initiator added.

<Synthesis of Copolymer (14)>

A copolymer (14) was produced based on the same formulation as that for synthesis of the copolymer (7), except that the amounts of the modifier (3) (40 mL) and the modifier (2) (20 mL) were changed to 0 mL. Here, 8.5 mmol of the polymerization initiator (initiator (1)) was added for each 100 g of the monomer component.

<Synthesis of Copolymer (15)>

A copolymer (15) was produced based on the same formulation as that for synthesis of the copolymer (7), except that an n-butyllithium solution (6.8 mL) was used instead of the initiator (1) (19 mL), and the amount of the modifier (2) was changed from 20 mL to 0 mL. Here, 0.43 g of the silicon-containing vinyl compound (modifier (3)) was added for each 100 g of the monomer component.

<Synthesis of Copolymer (16)>

A copolymer (16) was produced based on the same formulation as that for synthesis of the copolymer (7), except that an n-butyllithium solution (6.8 mL) was used instead of the initiator (1) (19 mL); and the amount of the modifier (3) was changed from 40 mL to 0 mL. Here, 1.18 mol of the compound (modifier (2)) containing a nitrogen atom and/or a silicon atom was added per mol of the alkali metal derived from the polymerization initiator added.

<Synthesis of Copolymer (17)>

A copolymer (17) was produced based on the same formulation as that for synthesis of the copolymer (1), except that the initiator (4) (bifunctional initiator, 68 mL) was used instead of the initiator (2) (34 mL); and the amount of the modifier (2) was changed from 20 mL to 40 mL. Here, 0.32 g of the silicon-containing vinyl compound (modifier (1)) was added for each 100 g of the monomer component; and 2.28 mol (1.14 mol for each terminal) of the compound (modifier (2)) containing a nitrogen atom and/or a silicon atom was added per mol of the alkali metal derived from the polymerization initiator added.

<Synthesis of Copolymer (18)>

A copolymer (18) was produced based on the same formulation as that for synthesis of the copolymer (7), except that the amounts of styrene and butadiene were changed to 0 g and 2000 g, respectively; THF (5 mmol) was used instead of TMEDA (10 mmol); and the amount of the initiator (1) was changed from 19 mL to 23 mL. Here, 0.43 g of the silicon-containing vinyl compound (modifier (3)) was added for each 100 g of the monomer component; 0.85 mmol of the polymerization initiator (initiator (1)) was added for each 100 g of the monomer component; and 1.18 mol of the compound (modifier (2)) containing a nitrogen atom and/or a silicon atom was added per mol of the alkali metal derived from the polymerization initiator added.

<Synthesis of Copolymer (19)>

A copolymer (19) was produced based on the same formulation as that for synthesis of the copolymer (8), except that the amounts of styrene and butadiene were changed to 0 g and 2000 g, respectively; and THF (5 mmol) was used instead of TMEDA (10 mmol). Here, 0.43 g of the silicon-containing vinyl compound (modifier (3)) was added for each 100 g of the monomer component; and 1.18 mol of the compound (modifier (2)) containing a nitrogen atom and/or a silicon atom was added per mol of the alkali metal derived from the polymerization initiator added.

<Synthesis of Copolymer (20)> n-Hexane (18 L), butadiene (2000 g), and THF (5 mmol) were charged into a sufficiently nitrogen-purged 30-L pressure resistant container, and heated to 40° C. After further addition of an n-butyllithium solution (11 mL), the mixture was heated to 50° C., and stirred for 3 hours. Next, the reaction solution was mixed with methanol (1 mL) and 2,6-tert-butyl-p-cresol (0.1 g). Then, a coagulum was recovered from the polymer solution by steam stripping treatment, and the coagulum was dried under reduced pressure for 24 hours to give a copolymer (20).

<Synthesis of Copolymer (21)>

A copolymer (21) was produced based on the same formulation as that for synthesis of the copolymer (18), except that a coagulum was recovered from the polymer solution not by steam stripping treatment but by evaporating the polymer solution at room temperature for 24 hours, followed by drying the coagulum under reduced pressure. Here, 0.43 g of the silicon-containing vinyl compound (modifier (3)) was added for each 100 g of the monomer component; 0.85 mmol of the polymerization initiator (initiator (1)) was added for each 100 g of the monomer component; and 1.18 mol of the compound (modifier (2)) containing a nitrogen atom and/or a silicon atom was added per mol of the alkali metal derived from the polymerization initiator added.

<Synthesis of Copolymer (22)>

A copolymer (22) was produced based on the same formulation as that for synthesis of the copolymer (1), except that the modifier (4) (20 mL) was used instead of the modifier (2) (20 mL). Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (4)) containing a nitrogen atom and/or a silicon atom was added per mol of the alkali metal derived from the polymerization initiator added.

<Synthesis of Copolymer (23)>

A copolymer (23) was produced based on the same formulation as that for synthesis of the copolymer (2), except that the modifier (4) (20 mL) was used instead of the modifier (2) (20 mL). Here, 0.32 g of the silicon-containing vinyl compound (modifier (1)) was added for each 100 g of the monomer component; 0.85 mmol of the polymerization initiator (initiator (3)) was added for each 100 g of the monomer component; and 1.18 mol of the compound (modifier (4)) containing a nitrogen atom and/or a silicon atom was added per mol of the alkali metal derived from the polymerization initiator added.

<Synthesis of Copolymer (24)>

A copolymer (24) was produced based on the same formulation as that for synthesis of the copolymer (3), except that the modifier (4) (20 mL) was used instead of the modifier (2) (20 mL). Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (4)) containing a nitrogen atom and/or a silicon atom was added per mol of the alkali metal derived from the polymerization initiator added.

<Synthesis of Copolymer (25)>

A copolymer (25) was produced based on the same formulation as that for synthesis of the copolymer (4), except that the modifier (4) (20 mL) was used instead of the modifier (2) (20 mL). Here, 0.32 g of the silicon-containing vinyl compound (modifier (1)) was added for each 100 g of the monomer component; 0.85 mmol of the polymerization initiator (initiator (1)) was added for each 100 g of the monomer component; and 1.18 mol of the compound (modifier (4)) containing a nitrogen atom and/or a silicon atom was added per mol of the alkali metal derived from the polymerization initiator added.

<Synthesis of Copolymer (26)>

A copolymer (26) was produced based on the same formulation as that for synthesis of the copolymer (5), except that the modifier (4) (20 mL) was used instead of the modifier (2) (20 mL). Here, 1.19 g of the silicon-containing vinyl compound (modifier (1)) was added for each 100 g of the monomer component; 0.85 mmol of the polymerization initiator (initiator (1)) was added for each 100 g of the monomer component; and 1.18 mol of the compound (modifier (4)) containing a nitrogen atom and/or a silicon atom was added per mol of the alkali metal derived from the polymerization initiator added.

<Synthesis of Copolymer (27)>

A copolymer (27) was produced based on the same formulation as that for synthesis of the copolymer (6), except that the modifier (4) (20 mL) was used instead of the modifier (2) (20 mL). Here, 0.32 g of the silicon-containing vinyl compound (modifier (1)) was added for each 100 g of the monomer component; 1.05 mmol of the polymerization initiator (initiator (1)) was added for each 100 g of the monomer component; and 0.95 mol of the compound (modifier (4)) containing a nitrogen atom and/or a silicon atom was added per mol of the alkali metal derived from the polymerization initiator added.

<Synthesis of Copolymer (28)>

A copolymer (28) was produced based on the same formulation as that for synthesis of the copolymer (7), except that the modifier (4) (20 mL) was used instead of the modifier (2) (20 mL). Here, 0.32 g of the silicon-containing vinyl compound (modifier (3)) was added for each 100 g of the monomer component; 0.85 mmol of the polymerization initiator (initiator (1)) was added for each 100 g of the monomer component; and 1.18 mol of the compound (modifier (4)) containing a nitrogen atom and/or a silicon atom was added per mol of the alkali metal derived from the polymerization initiator added.

<Synthesis of Copolymer (29)>

A copolymer (29) was produced based on the same formulation as that for synthesis of the copolymer (28), except that a coagulum was recovered from the polymer solution not by steam stripping treatment but by evaporating the polymer solution at room temperature for 24 hours, followed by drying the coagulum under reduced pressure. Here, 0.32 g of the silicon-containing vinyl compound (modifier (3)) was added for each 100 g of the monomer component; 0.85 mmol of the polymerization initiator (initiator (1)) was added for each 100 g of the monomer component; and 1.18 mol of the compound (modifier (4)) containing a nitrogen atom and/or a silicon atom was added per mol of the alkali metal derived from the polymerization initiator added.

<Synthesis of Copolymer (30)>

A copolymer (30) was produced based on the same formulation as that for synthesis of the copolymer (28), except that an n-butyllithium solution (10.6 mL) was used instead of the initiator (1) (19 mL); and the amount of the modifier (3) was changed from 40 mL to 0 mL. Here, 1.18 mol of the compound (modifier (4)) containing a nitrogen atom and/or a silicon atom was added per mol of the alkali metal derived from the polymerization initiator added.

<Synthesis of Copolymer (31)>

A copolymer (31) was produced based on the same formulation as that for synthesis of the copolymer (18), except that the modifier (4) (20 mL) was used instead of the modifier (2) (20 mL). Here, 0.32 g of the silicon-containing vinyl compound (modifier (3)) was added for each 100 g of the monomer component; 0.85 mmol of the polymerization initiator (initiator (1)) was added for each 100 g of the monomer component; and 1.18 mol of the compound (modifier (4)) containing a nitrogen atom and/or a silicon atom was added per mol of the alkali metal derived from the polymerization initiator added.

<Synthesis of Copolymer (32)>

A copolymer (32) was produced based on the same formulation as that for synthesis of the copolymer (31), except that a coagulum was recovered from the polymer solution not by steam stripping treatment but by evaporating the polymer solution at room temperature for 24 hours, followed by drying the coagulum under reduced pressure. Here, 0.32 g of the silicon-containing vinyl compound (modifier (3)) was added for each 100 g of the monomer component; 0.85 mmol of the polymerization initiator (initiator (1)) was added for each 100 g of the monomer component; and 1.18 mol of the compound (modifier (4)) containing a nitrogen atom and/or a silicon atom was added per mol of the alkali metal derived from the polymerization initiator added.

<Synthesis of Copolymer (33)>

A copolymer (33) was produced based on the same formulation as that for synthesis of the copolymer (1), except that the modifier (5) (20 mL) was used instead of the modifier (2) (20 mL). Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (5)) containing a nitrogen atom and/or a silicon atom was added per mol of the alkali metal derived from the polymerization initiator added.

<Synthesis of Copolymer (34)>

A copolymer (34) was produced based on the same formulation as that for synthesis of the copolymer (2), except that the modifier (5) (20 mL) was used instead of the modifier (2) (20 mL). Here, 0.32 g of the silicon-containing vinyl compound (modifier (1)) was added for each 100 g of the monomer component; 0.85 mmol of the polymerization initiator (initiator (3)) was added for each 100 g of the monomer component; and 1.18 mol of the compound (modifier (5)) containing a nitrogen atom and/or a silicon atom was added per mol of the alkali metal derived from the polymerization initiator added.

<Synthesis of Copolymer (35)>

A copolymer (35) was produced based on the same formulation as that for synthesis of the copolymer (3), except that the modifier (5) (20 mL) was used instead of the modifier (2) (20 mL). Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (5)) containing a nitrogen atom and/or a silicon atom was added per mol of the alkali metal derived from the polymerization initiator added.

<Synthesis of Copolymer (36)>

A copolymer (36) was produced based on the same formulation as that for synthesis of the copolymer (4), except that the modifier (5) (20 mL) was used instead of the modifier (2) (20 mL). Here, 0.32 g of the silicon-containing vinyl compound (modifier (1)) was added for each 100 g of the monomer component; 0.85 mmol of the polymerization initiator (initiator (1)) was added for each 100 g of the monomer component; and 1.18 mol of the compound (modifier (5)) containing a nitrogen atom and/or a silicon atom was added per mol of the alkali metal derived from the polymerization initiator added.

<Synthesis of Copolymer (37)>

A copolymer (37) was produced based on the same formulation as that for synthesis of the copolymer (5), except that the modifier (5) (20 mL) was used instead of the modifier (2) (20 mL). Here, 1.19 g of the silicon-containing vinyl compound (modifier (1)) was added for each 100 g of the monomer component; 0.85 mmol of the polymerization initiator (initiator (1)) was added for each 100 g of the monomer component; and 1.18 mol of the compound (modifier (5)) containing a nitrogen atom and/or a silicon atom was added per mol of the alkali metal derived from the polymerization initiator added.

<Synthesis of Copolymer (38)>

A copolymer (38) was produced based on the same formulation as that for synthesis of the copolymer (7), except that the modifier (5) (20 mL) was used instead of the modifier (2) (20 mL). Here, 0.32 g of the silicon-containing vinyl compound (modifier (3)) was added for each 100 g of the monomer component; 0.85 mmol of the polymerization initiator (initiator (1)) was added for each 100 g of the monomer component; and 1.18 mol of the compound (modifier (5)) containing a nitrogen atom and/or a silicon atom was added per mol of the alkali metal derived from the polymerization initiator added.

<Synthesis of Copolymer (39)>

A copolymer (39) was produced based on the same formulation as that for synthesis of the copolymer (38), except that a coagulum was recovered from the polymer solution not by steam stripping treatment but by evaporating the polymer solution at room temperature for 24 hours, followed by drying the coagulum under reduced pressure. Here, 0.32 g of the silicon-containing vinyl compound (modifier (3)) was added for each 100 g of the monomer component; 0.85 mmol of the polymerization initiator (initiator (1)) was added for each 100 g of the monomer component; and 1.18 mol of the compound (modifier (5)) containing a nitrogen atom and/or a silicon atom was added per mol of the alkali metal derived from the polymerization initiator added.

<Synthesis of Copolymer (40)>

A copolymer (40) was produced based on the same formulation as that for synthesis of the copolymer (7), except that the modifier (6) (20 mL) was used instead of the modifier (2) (20 mL). Here, 0.32 g of the silicon-containing vinyl compound (modifier (3)) was added for each 100 g of the monomer component; 0.85 mmol of the polymerization initiator (initiator (1)) was added for each 100 g of the monomer component; and 1.18 mol of the compound (modifier (6)) containing a nitrogen atom and/or a silicon atom was added per mol of the alkali metal derived from the polymerization initiator added.

<Synthesis of Copolymer (41)>

A copolymer (41) was produced based on the same formulation as that for synthesis of the copolymer (7), except that the modifier (7) (20 mL) was used instead of the modifier (2) (20 mL). Here, 0.32 g of the silicon-containing vinyl compound (modifier (3)) was added for each 100 g of the monomer component; 0.85 mmol of the polymerization initiator (initiator (1)) was added for each 100 g of the monomer component; and 1.18 mol of the compound (modifier (7)) containing a nitrogen atom and/or a silicon atom was added per mol of the alkali metal derived from the polymerization initiator added.

<Synthesis of Copolymer (42)>

A copolymer (42) was produced based on the same formulation as that for synthesis of the copolymer (38), except that a butyllithium solution (10.6 mL) was used instead of the initiator (1) (19 mL), and the amount of the modifier (3) was changed from 40 mL to 0 mL. Here, 1.18 mol of the compound (modifier (5)) containing a nitrogen atom and/or a silicon atom was added per mol of the alkali metal derived from the polymerization initiator added.

<Synthesis of Copolymer (43)>

A copolymer (43) was produced based on the same formulation as that for synthesis of the copolymer (1), except that the modifier (8) (20 mL) was used instead of the modifier (2) (20 mL). Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (8)) containing a nitrogen atom and/or a silicon atom was added per mol of the alkali metal derived from the polymerization initiator added.

<Synthesis of Copolymer (44)>

A copolymer (44) was produced based on the same formulation as that for synthesis of the copolymer (2), except that the modifier (8) (20 mL) was used instead of the modifier (2) (20 mL). Here, 0.32 g of the silicon-containing vinyl compound (modifier (1)) was added for each 100 g of the monomer component; 0.85 mmol of the polymerization initiator (initiator (3)) was added for each 100 g of the monomer component; and 1.18 mol of the compound (modifier (8)) containing a nitrogen atom and/or a silicon atom was added per mol of the alkali metal derived from the polymerization initiator added.

<Synthesis of Copolymer (45)>

A copolymer (45) was produced based on the same formulation as that for synthesis of the copolymer (3), except that the modifier (8) (20 mL) was used instead of the modifier (2) (20 mL). Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (8)) containing a nitrogen atom and/or a silicon atom was added per mol of the alkali metal derived from the polymerization initiator added.

<Synthesis of Copolymer (46)>

A copolymer (46) was produced based on the same formulation as that for synthesis of the copolymer (4), except that the modifier (8) (20 mL) was used instead of the modifier (2) (20 mL). Here, 0.32 g of the silicon-containing vinyl compound (modifier (1)) was added for each 100 g of the monomer component; 0.85 mmol of the polymerization initiator (initiator (1)) was added for each 100 g of the monomer component; and 1.18 mol of the compound (modifier (8)) containing a nitrogen atom and/or a silicon atom was added per mol of the alkali metal derived from the polymerization initiator added.

<Synthesis of Copolymer (47)>

A copolymer (47) was produced based on the same formulation as that for synthesis of the copolymer (5), except that the modifier (8) (20 mL) was used instead of the modifier (2) (20 mL). Here, 1.19 g of the silicon-containing vinyl compound (modifier (1)) was added for each 100 g of the monomer component; 0.85 mmol of the polymerization initiator (initiator (1)) was added for each 100 g of the monomer component; and 1.18 mol of the compound (modifier (8)) containing a nitrogen atom and/or a silicon atom was added per mol of the alkali metal derived from the polymerization initiator added.

<Synthesis of Copolymer (48)>

A copolymer (48) was produced based on the same formulation as that for synthesis of the copolymer (7), except that the modifier (8) (20 mL) was used instead of the modifier (2) (20 mL). Here, 0.32 g of the silicon-containing vinyl compound (modifier (3)) was added for each 100 g of the monomer component; 0.85 mmol of the polymerization initiator (initiator (1)) was added for each 100 g of the monomer component; and 1.18 mol of the compound (modifier (8)) containing a nitrogen atom and/or a silicon atom was added per mol of the alkali metal derived from the polymerization initiator added.

<Synthesis of Copolymer (49)>

A copolymer (49) was produced based on the same formulation as that for synthesis of the copolymer (48), except that a coagulum was recovered from the polymer solution not by steam stripping treatment but by evaporating the polymer solution at room temperature for 24 hours, followed by drying the coagulum under reduced pressure. Here, 0.32 g of the silicon-containing vinyl compound (modifier (3)) was added for each 100 g of the monomer component; 0.85 mmol of the polymerization initiator (initiator (1)) was added for each 100 g of the monomer component; and 1.18 mol of the compound (modifier (8)) containing a nitrogen atom and/or a silicon atom was added per mol of the alkali metal derived from the polymerization initiator added.

<Synthesis of Copolymer (50)>

A copolymer (50) was produced based on the same formulation as that for synthesis of the copolymer (48), except that a butyllithium solution (10.6 mL) was used instead of the initiator (1) (19 mL), and the amount of the modifier (3) was changed from 40 mL to 0 mL. Here, 1.18 mol of the compound (modifier (8)) containing a nitrogen atom and/or a silicon atom was added per mol of the alkali metal derived from the polymerization initiator added.

<Synthesis of Copolymer (51)>

A copolymer (51) was produced based on the same formulation as that for synthesis of the copolymer (1), except that the modifier (9) (20 mL) was used instead of the modifier (2) (20 mL). Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (9)) containing a nitrogen atom and/or a silicon atom was added per mol of the alkali metal derived from the polymerization initiator added.

<Synthesis of Copolymer (52)>

A copolymer (52) was produced based on the same formulation as that for synthesis of the copolymer (2), except that the modifier (9) (20 mL) was used instead of the modifier (2) (20 mL). Here, 0.32 g of the silicon-containing vinyl compound (modifier (1)) was added for each 100 g of the monomer component; 0.85 mmol of the polymerization initiator (initiator (3)) was added for each 100 g of the monomer component; and 1.18 mol of the compound (modifier (9)) containing a nitrogen atom and/or a silicon atom was added per mol of the alkali metal derived from the polymerization initiator added.

<Synthesis of Copolymer (53)>

A copolymer (53) was produced based on the same formulation as that for synthesis of the copolymer (3), except that the modifier (9) (20 mL) was used instead of the modifier (2) (20 mL). Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (9)) containing a nitrogen atom and/or a silicon atom was added per mol of the alkali metal derived from the polymerization initiator added.

<Synthesis of Copolymer (54)>

A copolymer (54) was produced based on the same formulation as that for synthesis of the copolymer (4), except that the modifier (9) (20 mL) was used instead of the modifier (2) (20 mL). Here, 0.32 g of the silicon-containing vinyl compound (modifier (1)) was added for each 100 g of the monomer component; 0.85 mmol of the polymerization initiator (initiator (1)) was added for each 100 g of the monomer component; and 1.18 mol of the compound (modifier (9)) containing a nitrogen atom and/or a silicon atom was added per mol of the alkali metal derived from the polymerization initiator added.

<Synthesis of Copolymer (55)>

A copolymer (55) was produced based on the same formulation as that for synthesis of the copolymer (5), except that the modifier (9) (20 mL) was used instead of the modifier (2) (20 mL). Here, 1.19 g of the silicon-containing vinyl compound (modifier (1)) was added for each 100 g of the monomer component; 0.85 mmol of the polymerization initiator (initiator (1)) was added for each 100 g of the monomer component; and 1.18 mol of the compound (modifier (9)) containing a nitrogen atom and/or a silicon atom was added per mol of the alkali metal derived from the polymerization initiator added.

<Synthesis of Copolymer (56)>

A copolymer (56) was produced based on the same formulation as that for synthesis of the copolymer (7), except that the modifier (9) (20 mL) was used instead of the modifier (2) (20 mL). Here, 0.32 g of the silicon-containing vinyl compound (modifier (3)) was added for each 100 g of the monomer component; 0.85 mmol of the polymerization initiator (initiator (1)) was added for each 100 g of the monomer component; and 1.18 mol of the compound (modifier (9)) containing a nitrogen atom and/or a silicon atom was added per mol of the alkali metal derived from the polymerization initiator added.

<Synthesis of Copolymer (57)>

A copolymer (57) was produced based on the same formulation as that for synthesis of the copolymer (56), except that a coagulum was recovered from the polymer solution not by steam stripping treatment but by evaporating the polymer solution at room temperature for 24 hours, followed by drying the coagulum under reduced pressure. Here, 0.32 g of the silicon-containing vinyl compound (modifier (3)) was added for each 100 g of the monomer component; 0.85 mmol of the polymerization initiator (initiator (1)) was added for each 100 g of the monomer component; and 1.18 mol of the compound (modifier (9)) containing a nitrogen atom and/or a silicon atom was added per mol of the alkali metal derived from the polymerization initiator added.

<Synthesis of Copolymer (58)>

A copolymer (58) was produced based on the same formulation as that for synthesis of the copolymer (56), except that a butyllithium solution (10.6 mL) was used instead of the initiator (1) (19 mL), and the amount of the modifier (3) was changed from 40 mL to 0 mL. Here, 1.18 mol of the compound (modifier (9)) containing a nitrogen atom and/or a silicon atom was added per mol of the alkali metal derived from the polymerization initiator added.

Tables 1 to 5 summarize the monomer components and others of the copolymers (1) to (58).

TABLE 1

Examples in which a compound represented by the formula (IIId) is used as a Terminal modifier

| Copolymer | Initiator | Monomer component | Terminal modifier | Styrene content (% by mass) | Vinyl content (mol %) | Molecular weight distribution Mw/Mn | Molecular weight Mw (unit: ten thousand) |
|---|---|---|---|---|---|---|---|
| Copolymer (1) | Initiator (2) | Styrene, 1,3-Butadiene, Modifier (1) | Modifier (2) | 30 | 56 | 1.21 | 26.5 |
| Copolymer (2) | Initiator (3) | Styrene, 1,3-Butadiene, Modifier (1) | Modifier (2) | 30 | 57 | 1.23 | 26.8 |
| Copolymer (3) | Initiator (2) | Styrene, 1,3-Butadiene, Modifier (1) | Modifier (2) | 45 | 56 | 1.23 | 26.9 |
| Copolymer (4) | Initiator (1) | Styrene, 1,3-Butadiene, Modifier (1) | Modifier (2) | 30 | 56 | 1.13 | 24.8 |

TABLE 1-continued

| Examples in which a compound represented by the formula (IIId) is used as a Terminal modifier | | | | | | | |
|---|---|---|---|---|---|---|---|
| Copolymer | Initiator | Monomer component | Terminal modifier | Styrene content (% by mass) | Vinyl content (mol %) | Molecular weight distribution Mw/Mn | Molecular weight Mw (unit: ten thousand) |
| Copolymer (5) | Initiator (1) | Styrene, 1,3-Butadiene, Modifier (1) | Modifier (2) | 30 | 56 | 1.20 | 27.1 |
| Copolymer (6) | Initiator (1) | 1,3-Butadiene, Modifier (1) | Modifier (2) | 0 | 14.2 | 1.17 | 28.9 |
| Copolymer (7) | Initiator (1) | Styrene, 1,3-Butadiene, Modifier (3) | Modifier (2) | 30 | 56 | 1.18 | 26.0 |
| Copolymer (8) | n-Butyllithium solution | Styrene, 1,3-Butadiene, Modifier (3) | Modifier (2) | 30 | 55 | 1.17 | 24.5 |
| Copolymer (9) | n-Butyllithium solution | 1,3-Butadiene, Modifier (1) | Modifier (2) | 0 | 13.5 | 1.16 | 29.3 |
| Copolymer (10) | Initiator (2) | Styrene, 1,3-Butadiene | Modifier (2) | 30 | 56 | 1.19 | 25.0 |
| Copolymer (11) | Initiator (2) | Styrene, 1,3-Butadiene, Modifier (1) | Not added | 30 | 56 | 1.25 | 25.4 |
| Copolymer (12) | n-Butyllithium solution | Styrene, 1,3-Butadiene | Not added | 30 | 56 | 1.09 | 26.5 |
| Copolymer (13) | Initiator (1) | Styrene, 1,3-Butadiene, Modifier (3) | Modifier (2) | 30 | 57 | 1.19 | 25.2 |
| Copolymer (14) | Initiator (1) | Styrene, 1,3-Butadiene | Not added | 30 | 57 | 1.16 | 26.1 |
| Copolymer (15) | n-Butyllithium solution | Styrene, 1,3-Butadiene, Modifier (3) | Not added | 30 | 56 | 1.13 | 27.9 |
| Copolymer (16) | n-Butyllithium solution | Styrene, 1,3-Butadiene | Modifier (2) | 30 | 55 | 1.10 | 27.4 |
| Copolymer (17) | Initiator (4) | Styrene, 1,3-Butadiene, Modifier (1) | Modifier (2) | 30 | 55 | 1.29 | 28.9 |
| Copolymer (18) | Initiator (1) | 1,3-Butadiene, Modifier (3) | Modifier (2) | 0 | 14.2 | 1.19 | 26.2 |
| Copolymer (19) | n-Butyllithium solution | 1,3-Butadiene, Modifier (3) | Modifier (2) | 0 | 13.7 | 1.16 | 25.2 |
| Copolymer (20) | n-Butyllithium solution | 1,3-Butadiene | Not added | 0 | 13.9 | 1.11 | 27.1 |
| Copolymer (21) | Initiator (1) | 1,3-Butadiene, Modifier (3) | Modifier (2) | 0 | 14 | 1.21 | 26.3 |

TABLE 2

| Examples in which a compound represented by the formula (IV) is used as a Terminal modifier | | | | | | | |
|---|---|---|---|---|---|---|---|
| Copolymer | Initiator | Monomer component | Terminal modifier | Styrene content (% by mass) | Vinyl content (mol %) | Molecular weight distribution Mw/Mn | Molecular weight Mw (unit: ten thousand) |
| Copolymer (22) | Initiator (2) | Styrene, 1,3-Butadiene, Modifier (1) | Modifier (4) | 30 | 57 | 1.26 | 28.3 |
| Copolymer (23) | Initiator (3) | Styrene, 1,3-Butadiene, Modifier (1) | Modifier (4) | 30 | 57 | 1.28 | 28.0 |
| Copolymer (24) | Initiator (2) | Styrene, 1,3-Butadiene, Modifier (1) | Modifier (4) | 45 | 56 | 1.25 | 29.2 |
| Copolymer (25) | Initiator (1) | Styrene, 1,3-Butadiene, Modifier (1) | Modifier (4) | 30 | 56 | 1.19 | 27.2 |
| Copolymer (26) | Initiator (1) | Styrene, 1,3-Butadiene, Modifier (1) | Modifier (4) | 30 | 57 | 1.17 | 26.1 |
| Copolymer (27) | Initiator (1) | 1,3-Butadiene, Modifier (1) | Modifier (4) | 0 | 13.9 | 1.17 | 25.9 |
| Copolymer (28) | Initiator (1) | Styrene, 1,3-Butadiene, Modifier (3) | Modifier (4) | 30 | 56 | 1.20 | 25.8 |
| Copolymer (29) | Initiator (1) | Styrene, 1,3-Butadiene, Modifier (3) | Modifier (4) | 30 | 58 | 1.18 | 26.2 |
| Copolymer (30) | n-Butyllithium solution | Styrene, 1,3-Butadiene | Modifier (4) | 30 | 56 | 1.14 | 27.1 |
| Copolymer (31) | Initiator (1) | 1,3-Butadiene, Modifier (3) | Modifier (4) | 0 | 14.1 | 1.21 | 26.2 |
| Copolymer (32) | Initiator (1) | 1,3-Butadiene, Modifier (3) | Modifier (4) | 0 | 14.2 | 1.18 | 26.8 |

TABLE 3

| Examples in which a compound represented by the formula (IIIb) is used as a Terminal modifier | | | | | | | |
|---|---|---|---|---|---|---|---|
| Copolymer | Initiator | Monomer component | Terminal modifier | Styrene content (% by mass) | Vinyl content (mol %) | Molecular weight distribution Mw/Mn | Molecular weight Mw (unit: ten thousand) |
| Copolymer (33) | Initiator (2) | Styrene, 1,3-Butadiene, Modifier (1) | Modifier (5) | 30 | 57 | 1.18 | 27.1 |
| Copolymer (34) | Initiator (3) | Styrene, 1,3-Butadiene. Modifier (1) | Modifier (5) | 30 | 56 | 1.16 | 26.3 |
| Copolymer (35) | Initiator (2) | Styrene, 1,3-Butadiene, Modifier (1) | Modifier (5) | 45 | 56 | 1.16 | 24.6 |
| Copolymer (36) | Initiator (1) | Styrene, 1,3-Butadiene, Modifier (1) | Modifier (5) | 30 | 57 | 1.12 | 24.9 |
| Copolymer (37) | Initiator (1) | Styrene, 1,3-Butadiene, Modifier (1) | Modifier (5) | 30 | 56 | 1.13 | 26.7 |
| Copolymer (38) | Initiator (1) | Styrene, 1,3-Butadiene, Modifier (3) | Modifier (5) | 30 | 56 | 1.13 | 25.6 |
| Copolymer (39) | Initiator (1) | Styrene, 1,3-Butadiene, Modifier (3) | Modifier (5) | 30 | 56 | 1.10 | 25.5 |
| Copolymer (40) | Initiator (1) | Styrene, 1,3-Butadiene, Modifier (3) | Modifier (6) | 30 | 57 | 1.14 | 25.2 |
| Copolymer (41) | Initiator (1) | Styrene, 1,3-Butadiene, Modifier (3) | Modifier (7) | 30 | 56 | 1.15 | 25.9 |
| Copolymer (42) | n-Butyllithium solution | Styrene, 1,3-Butadiene | Modifier (5) | 30 | 55 | 1.09 | 26.3 |

TABLE 4

Examples in which a compound containing an alkoxysilyl group, a nitrogen atom and a carbonyl group is used as a Terminal modifier

| Copolymer | Initiator | Monomer component | Terminal modifier | Styrene content (% by mass) | Vinyl content (mol %) | Molecular weight distribution Mw/Mn | Molecular weight Mw (unit: ten thousand) |
|---|---|---|---|---|---|---|---|
| Copolymer (43) | Initiator (2) | Styrene, 1,3-Butadiene, Modifier (1) | Modifier (8) | 30 | 56 | 1.24 | 27.5 |
| Copolymer (44) | Initiator (3) | Styrene, 1,3-Butadiene, Modifier (1) | Modifier (8) | 30 | 56 | 1.22 | 28.3 |
| Copolymer (45) | Initiator (2) | Styrene, 1,3-Butadiene, Modifier (1) | Modifier (8) | 45 | 57 | 1.23 | 27.8 |
| Copolymer (46) | Initiator (1) | Styrene, 1,3-Butadiene, Modifier (1) | Modifier (8) | 30 | 56 | 1.20 | 28.5 |
| Copolymer (47) | Initiator (1) | Styrene, 1,3-Butadiene, Modifier (1) | Modifier (8) | 30 | 55 | 1.19 | 28.6 |
| Copolymer (48) | Initiator (1) | Styrene, 1,3-Butadiene, Modifier (3) | Modifier (8) | 30 | 56 | 1.22 | 28.3 |
| Copolymer (49) | Initiator (1) | Styrene, 1,3-Butadiene, Modifier (3) | Modifier (8) | 30 | 57 | 1.18 | 28.0 |
| Copolymer (50) | n-Butyllithium solution | Styrene, 1,3-Butadiene | Modifier (8) | 30 | 56 | 1.16 | 27.3 |

TABLE 5

Examples in which an N,N-dialkyl-substituted carboxylic acid amide dialkyl acetal compound is used as a Terminal modifier

| Copolymer | Initiator | Monomer component | Terminal modifier | Styrene content (% by mass) | Vinyl content (mol %) | Molecular weight distribution Mw/Mn | Molecular weight Mw (unit: ten thousand) |
|---|---|---|---|---|---|---|---|
| Copolymer (51) | Initiator (2) | Styrene, 1,3-Butadiene, Modifier (1) | Modifier (9) | 30 | 57 | 1.20 | 27.2 |
| Copolymer (52) | Initiator (3) | Styrene, 1,3-Butadiene, Modifier (1) | Modifier (9) | 30 | 56 | 1.21 | 27.3 |
| Copolymer (53) | Initiator (2) | Styrene, 1,3-Butadiene, Modifier (1) | Modifier (9) | 45 | 55 | 1.21 | 27.8 |
| Copolymer (54) | Initiator (1) | Styrene, 1,3-Butadiene, Modifier (1) | Modifier (9) | 30 | 56 | 1.20 | 27.6 |
| Copolymer (55) | Initiator (1) | Styrene, 1,3-Butadiene, Modifier (1) | Modifier (9) | 30 | 56 | 1.19 | 26.9 |
| Copolymer (56) | Initiator (1) | Styrene, 1,3-Butadiene, Modifier (3) | Modifier (9) | 30 | 57 | 1.18 | 26.8 |
| Copolymer (57) | Initiator (1) | Styrene, 1,3-Butadiene, Modifier (3) | Modifier (9) | 30 | 56 | 1.20 | 28.1 |
| Copolymer (58) | n-Butyllithium solution | Styrene, 1,3-Butadiene | Modifier (9) | 30 | 57 | 1.17 | 27.1 |

The following describes the various chemicals used in the examples and comparative examples.

Copolymers (1) to (58): synthesized as above

Natural Rubber: TSR20

Polybutadiene rubber: Ubepol BR150B produced by Ube Industries, Ltd.

Silica 1: ZEOSIL 1085GR produced by Rhodia (nitrogen adsorption specific surface area: 80 $m^2/g$)

Silica 2: ZEOSIL 115GR produced by Rhodia (nitrogen adsorption specific surface area: 110 $m^2/g$)

Silica 3: ZEOSIL 1165 MP produced by Rhodia (nitrogen adsorption specific surface area: 160 $m^2/g$)

Silica 4: ZEOSIL 1205 MP produced by Rhodia (nitrogen adsorption specific surface area: 200 $m^2/g$)

Silane coupling agent A: Si69 (bis(3-triethoxysilylpropyl) tetrasulfide) produced by Evonik Degussa Silane coupling agent B: Si363 produced by Evonik Degussa Silane coupling agent C: NXT-Z45 (a compound containing linking unit A and linking unit B (linking unit A: 55 mol %, linking unit B: 45 mol %)) produced by Momentive Performance Materials Carbon black: Diablack N339 ($N_2SA$: 96 $m^2/g$, DBP absorption: 124 mL/100 g) produced by Mitsubishi Chemical Corporation Coumarone indene resin 1 (solid resin): NOVARES C90 (Tg: 90° C.) produced by Rutgers chemicals AG Coumarone indene resin 2 (liquid resin): NOVARES C30 (Tg: 10° C.) produced by Rutgers chemicals AG Coumarone indene resin 3 (liquid resin): NOVARES C10 (Tg: −30° C.) produced by Rutgers chemicals AG α-Methylstyrene resin (copolymer of α-methyl styrene and styrene, solid resin): SYLVARES SA85 (Tg: 95° C.) produced by Arizona Chemical Oil: X-140 produced by JX Nippon Oil & Energy Corporation Antioxidant: Antigene 3C produced by Sumitomo Chemical Co., Ltd.

Stearic acid: TSUBAKI stearic acid beads produced by NOF Corporation

Zinc oxide: Zinc oxide #1 produced by Mitsui Mining & Smelting Co., Ltd.

Wax: Sunnoc N produced by Ouchi Shinko Chemical Industrial Co., Ltd.

Sulfur: sulfur powder produced by Tsurumi Chemical Industry Co., Ltd.

Vulcanization accelerator 1: Soxinol CZ produced by Sumitomo Chemical Co., Ltd.

Vulcanization accelerator 2: Soxinol D produced by Sumitomo Chemical Co., Ltd.

EXAMPLES AND COMPARATIVE EXAMPLES

According to each of the formulations shown in Tables 6 to 25, the materials other than the sulfur and vulcanization accelerators were kneaded for 5 minutes at 150° C. using a 1.7-L Banbury mixer (produced by Kobe Steel, Ltd.) to give a kneadate. The sulfur and vulcanization accelerators were then added to the kneadate, followed by kneading for 5 minutes at 80° C. using an open roll mill to give an unvulcanized rubber composition. The unvulcanized rubber composition was press-vulcanized for 20 minutes at 170° C. in a 0.5 mm-thick mold to obtain a vulcanized rubber composition.

Separately, the unvulcanized rubber composition was formed into a tread shape and assembled with other tire components on a tire building machine to form an unvulcanized tire. The unvulcanized tire was vulcanized for 12 minutes at 170° C. to prepare a test tire (size: 195/65R15).

<Evaluation Items and Test Methods>

In the evaluations below, Comparative Example 1 was considered as a standard comparative example in Tables 6 to 13; Comparative Example 22 was considered as a standard comparative example in Tables 14 to 19; and Comparative Example 40 was considered as a standard comparative example in Tables 20 to 25.

<Mixing and Kneading Processability Index>

The Mooney viscosity ($ML_{1+4}$/130° C.) of each unvulcanized rubber composition was determined in accordance with JIS K6300-1:2001 "Rubber, unvulcanized—Physical property—Part 1: Determination of Mooney viscosity and pre-vulcanization characteristics with Mooney viscometer" using a Mooney viscosity tester. That is, under a temperature condition of 130° C. achieved by 1 minute pre-heating, the Mooney viscosity of the unvulcanized rubber composition was measured after a small rotor was rotated for 4 minutes. The result is expressed as an index. A larger value indicates a lower Mooney viscosity, which in turn indicates better mixing and kneading processability. The index was calculated based on the following equation.

(Mixing and kneading processability index)=(Mooney viscosity of standard comparative example)/(Mooney viscosity of each formulation)×100

<Low-Heat-Build-Up Property>

The tan δ of each vulcanized rubber composition was measured at a dynamic strain amplitude of 1%, a frequency of 10 Hz, and at a temperature of 50° C. using a spectrometer (produced by Ueshima Seisakusho Co., Ltd.). The reciprocal value of the tan δ is expressed as an index relative to that of a standard comparative example (regarded as 100). A larger index indicates a smaller rolling resistance (less heat build-up), which in turn indicates better fuel economy.

<Tan δ Peak Temperature>

The tan δ of each vulcanized rubber composition was measured at a dynamic strain amplitude of 1%, a frequency of 10 Hz, a rate of temperature rise of 2° C./min., and at a measurement temperature ranging from −80 to 80° C. using a spectrometer (produced by Ueshima Seisakusho Co., Ltd.). The temperature at which tan δ reached its peak was determined as a tan δ peak temperature.

<Rubber Strength Index>

Each sample was subjected to a tensile test in accordance with JIS K 6251:2010 to measure the elongation at break. The measurement result was expressed as an index relative to the result of a standard comparative example (regarded as 100). A larger index indicates larger rubber strength (tensile strength).

(Rubber strength index)=(Elongation at break of each formulation)/(Elongation at break of standard comparative example)×100

<Abrasion Resistance Index>

The volume loss of each vulcanized rubber composition was measured with a laboratory abrasion and skid tester (LAT tester) at a load of 50 N, a speed of 20 km/h, and a slip angle of 5 degrees. The values (abrasion resistance index) in Tables 6 to 25 are relative values to the volume loss in the standard comparative example regarded as 100. A larger value indicates better abrasion resistance.

<Wet-Grip Performance Index>

The test tires of each example were mounted on all the wheels of a vehicle (front-engine, front-wheel drive (FF) vehicle, 2000 cc, made in Japan). The braking distance from an initial speed of 100 km/h was determined on a wet asphalt road surface. The result is expressed as an index. A larger index indicates better wet-skid performance (wet-grip performance). The index was calculated based on the following equation.

(Wet-grip performance index)=(Braking distance in standard comparative example)/(Braking distance of each formulation)×100

<Handling Stability>

The test tires of each example were mounted on all the wheels of a front-engine, front-wheel drive (FF) vehicle (2000 cc, made in Japan), and the vehicle was driven on a test course (temperature on snow: −10 to −2° C.) of Sumitomo Rubber Industries, Ltd. in Nayoro, Hokkaido, Japan. The handling stability was evaluated based on sensory evaluation by a driver. The evaluation was scored on a scale of 1 to 10 relative to the evaluation of the standard comparative example being given 6. A higher score indicates better handling stability.

TABLE 6

Examples in which a compound represented by the formula (IIId) is used as a Terminal modifier

| | | Example | | | | | | | | | |
|---|---|---|---|---|---|---|---|---|---|---|---|
| | | 1 | 2 | 3 | 4 | 5 | 6 | 7 | 8 | 9 | 10 |
| Formulation (parts by mass) | Copolymer (1) | 45 | — | — | — | — | — | — | — | — | — |
| | Copolymer (2) | — | 45 | — | — | — | — | — | — | — | — |
| | Copolymer (3) | — | — | 45 | — | — | — | — | — | — | — |
| | Copolymer (4) | — | — | — | 45 | — | — | — | — | — | — |
| | Copolymer (5) | — | — | — | — | 45 | — | — | — | — | — |
| | Copolymer (6) | — | — | — | — | — | — | — | 30 | — | — |
| | Copolymer (7) | — | — | — | — | — | 45 | — | — | — | — |
| | Copolymer (8) | — | — | — | — | — | — | — | 45 | 45 | 45 |
| | Copolymer (9) | — | — | — | — | — | — | — | — | — | — |
| | Copolymer (10) | — | — | — | — | — | — | — | — | — | — |
| | Copolymer (11) | — | — | — | — | — | — | — | — | — | — |
| | Copolymer (12) | — | — | — | — | — | — | — | — | — | — |
| | Copolymer (13) | — | — | — | — | — | — | 45 | — | — | — |
| | Copolymer (14) | — | — | — | — | — | — | — | — | — | — |
| | Copolymer (15) | — | — | — | — | — | — | — | — | — | — |
| | Copolymer (16) | — | — | — | — | — | — | — | — | — | — |
| | Copolymer (17) | — | — | — | — | — | — | — | — | — | — |
| | Copolymer (18) | — | — | — | — | — | — | — | — | 30 | — |
| | Copolymer (19) | — | — | — | — | — | — | — | — | — | — |
| | Copolymer (20) | — | — | — | — | — | — | — | — | — | — |
| | Copolymer (21) | — | — | — | — | — | — | — | — | — | 30 |

TABLE 6-continued

Examples in which a compound represented by the formula (IIId) is used as a Terminal modifier

| | | | | | | | | | | | |
|---|---|---|---|---|---|---|---|---|---|---|---|
| | Natural rubber | 25 | 25 | 25 | 25 | 25 | 25 | 25 | 25 | 25 | 25 |
| | Polybutadiene rubber | 30 | 30 | 30 | 30 | 30 | 30 | 30 | — | — | — |
| | Silica 2 ($N_2SA$: 110 $m^2/g$) | 75 | 75 | 75 | 75 | 75 | 75 | 75 | 75 | 75 | 75 |
| | Silane coupling agent A | 6 | 6 | 6 | 6 | 6 | 6 | 6 | 6 | 6 | 6 |
| | Carbon black | 5 | 5 | 5 | 5 | 5 | 5 | 5 | 5 | 5 | 5 |
| | Oil | 20 | 20 | 20 | 20 | 20 | 20 | 20 | 20 | 20 | 20 |
| | Antioxidant | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 |
| Evaluation | Mixing and kneading processability index | 105 | 106 | 103 | 111 | 101 | 102 | 106 | 101 | 101 | 104 |
| | Low-heat-build-up property index | 125 | 127 | 126 | 138 | 135 | 137 | 109 | 125 | 130 | 111 |
| | tan δ peak temperature | −20 | −20 | −20 | −20 | −20 | −20 | −20 | −20 | −20 | −20 |
| | Rubber strength index | 103 | 104 | 105 | 102 | 101 | 101 | 104 | 101 | 100 | 102 |
| | Abrasion resistance index | 103 | 104 | 103 | 101 | 102 | 104 | 103 | 102 | 104 | 100 |
| | Wet-grip performance index | 111 | 111 | 110 | 109 | 109 | 112 | 107 | 106 | 107 | 105 |
| | Handling stability | 6.25 | 6.25 | 6.25 | 6.25 | 6.25 | 6.25 | 6.25 | 6 | 6 | 6 |

| | | Comparative Example | | | | | | | | | | |
|---|---|---|---|---|---|---|---|---|---|---|---|---|
| | | 1 | 2 | 3 | 4 | 5 | 6 | 7 | 3 | 9 | 10 | 11 |
| Formulation (parts by mass) | Copolymer (1) | — | — | — | — | — | — | — | — | — | — | — |
| | Copolymer (2) | — | — | — | — | — | — | — | — | — | — | — |
| | Copolymer (3) | — | — | — | — | — | — | — | — | — | — | — |
| | Copolymer (4) | — | — | — | — | — | — | — | — | — | — | — |
| | Copolymer (5) | — | — | — | — | — | — | — | — | — | — | — |
| | Copolymer (6) | — | — | — | — | — | — | — | — | — | — | — |
| | Copolymer (7) | — | — | — | — | — | — | — | — | — | — | — |
| | Copolymer (8) | 45 | — | — | — | — | — | — | — | 45 | 45 | 45 |
| | Copolymer (9) | — | — | — | — | — | — | — | — | 30 | — | — |
| | Copolymer (10) | — | 45 | — | — | — | — | — | — | — | — | — |
| | Copolymer (11) | — | — | 45 | — | — | — | — | — | — | — | — |
| | Copolymer (12) | — | — | — | 45 | — | — | — | — | — | — | — |
| | Copolymer (13) | — | — | — | — | — | — | — | — | — | — | — |
| | Copolymer (14) | — | — | — | — | 45 | — | — | — | — | — | — |
| | Copolymer (15) | — | — | — | — | — | 45 | — | — | — | — | — |
| | Copolymer (16) | — | — | — | — | — | — | 45 | — | — | — | — |
| | Copolymer (17) | — | — | — | — | — | — | — | 45 | — | — | — |
| | Copolymer (18) | — | — | — | — | — | — | — | — | — | — | — |
| | Copolymer (19) | — | — | — | — | — | — | — | — | — | 30 | — |
| | Copolymer (20) | — | — | — | — | — | — | — | — | — | — | 30 |
| | Copolymer (21) | — | — | — | — | — | — | — | — | — | — | — |
| | Natural rubber | 25 | 25 | 25 | 25 | 25 | 25 | 25 | 25 | 25 | 25 | 25 |
| | Polybutadiene rubber | 30 | 30 | 30 | 30 | 30 | 30 | 30 | 30 | — | — | — |
| | Silica 2 ($N_2SA$: 110 $m^2/g$) | 75 | 75 | 75 | 75 | 75 | 75 | 75 | 75 | 75 | 75 | 75 |
| | Silane coupling agent A | 6 | 6 | 6 | 6 | 6 | 6 | 6 | 6 | 6 | 6 | 6 |
| | Carbon black | 5 | 5 | 5 | 5 | 5 | 5 | 5 | 5 | 5 | 5 | 5 |
| | Oil | 20 | 20 | 20 | 20 | 20 | 20 | 20 | 20 | 20 | 20 | 20 |
| | Antioxidant | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 |
| Evaluation | Mixing and kneading processability index | 100 | 102 | 98 | 97 | 96 | 94 | 93 | 93 | 97 | 98 | 102 |
| | Low-heat-build-up property index | 100 | 96 | 99 | 93 | 100 | 99 | 98 | 102 | 105 | 107 | 98 |
| | tan δ peak temperature | −20 | −20 | −20 | −20 | −20 | −20 | −20 | −20 | −20 | −20 | −20 |
| | Rubber strength index | 100 | 103 | 101 | 106 | 101 | 100 | 102 | 100 | 97 | 97 | 99 |
| | Abrasion resistance index | 100 | 101 | 99 | 97 | 93 | 92 | 96 | 88 | 101 | 102 | 95 |
| | Wet-grip performance index | 100 | 101 | 101 | 96 | 96 | 97 | 96 | 100 | 105 | 104 | 102 |
| | Handling stability | 6 | 6 | 6 | 6 | 6 | 6 | 6 | 6 | 5.5 | 5.5 | 5.5 |

TABLE 7

Examples in which a compound represented by the formula (IV) is used as a Terminal modifier

| | | Example | | | | | | | Comparative Example | | | | | | Example | |
|---|---|---|---|---|---|---|---|---|---|---|---|---|---|---|---|---|
| | | 11 | 12 | 13 | 14 | 15 | 16 | 17 | 1 | 4 | 5 | 6 | 10 | 12 | 18 | 19 |
| Formulation (parts by mass) | Copolymer (8) | — | — | — | — | — | — | — | 45 | — | — | — | 45 | — | 45 | 45 |
| | Copolymer (12) | — | — | — | — | — | — | — | — | 45 | — | — | — | — | — | — |
| | Copolymer (14) | — | — | — | — | — | — | — | — | — | 45 | — | — | — | — | — |
| | Copolymer (15) | — | — | — | — | — | — | — | — | — | — | 45 | — | — | — | — |
| | Copolymer (19) | — | — | — | — | — | — | — | — | — | — | — | 30 | — | — | — |
| | Copolymer (22) | 45 | — | — | — | — | — | — | — | — | — | — | — | — | — | — |
| | Copolymer (23) | — | 45 | — | — | — | — | — | — | — | — | — | — | — | — | — |
| | Copolymer (24) | — | — | 45 | — | — | — | — | — | — | — | — | — | — | — | — |
| | Copolymer (25) | — | — | — | 45 | — | — | — | — | — | — | — | — | — | — | — |
| | Copolymer (26) | — | — | — | — | 45 | — | — | — | — | — | — | — | — | — | — |
| | Copolymer (28) | — | — | — | — | — | 45 | — | — | — | — | — | — | — | — | — |
| | Copolymer (29) | — | — | — | — | — | — | 45 | — | — | — | — | — | — | — | — |
| | Copolymer (30) | — | — | — | — | — | — | — | — | — | — | — | — | 45 | — | — |
| | Copolymer (31) | — | — | — | — | — | — | — | — | — | — | — | — | — | 30 | — |
| | Copolymer (32) | — | — | — | — | — | — | — | — | — | — | — | — | — | — | 30 |
| | Natural rubber | 25 | 25 | 25 | 25 | 25 | 25 | 25 | 25 | 25 | 25 | 25 | 25 | 25 | 25 | 25 |
| | Polybutadiene rubber | 30 | 30 | 30 | 30 | 30 | 30 | 30 | 30 | 30 | 30 | 30 | — | 30 | — | — |
| | Silica 2 ($N_2SA$: 110 $m^2/g$) | 75 | 75 | 75 | 75 | 75 | 75 | 75 | 75 | 75 | 75 | 75 | 75 | 75 | 75 | 75 |
| | Silane coupling agent A | 6 | 6 | 6 | 6 | 6 | 6 | 6 | 6 | 6 | 6 | 6 | 6 | 6 | 6 | 6 |
| | Carbon black | 5 | 5 | 5 | 5 | 5 | 5 | 5 | 5 | 5 | 5 | 5 | 5 | 5 | 5 | 5 |
| | Oil | 20 | 20 | 20 | 20 | 20 | 20 | 20 | 20 | 20 | 20 | 20 | 20 | 20 | 20 | 20 |
| | Antioxidant | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| Evaluation | Mixing and kneading processability index | 100 | 101 | 104 | 100 | 106 | 107 | 103 | 100 | 97 | 96 | 94 | 98 | 90 | 102 | 100 |
| | Low-heat-build-up property index | 129 | 126 | 127 | 126 | 122 | 123 | 113 | 100 | 93 | 100 | 99 | 107 | 95 | 110 | 105 |
| | tan δ peak temperature | −20 | −20 | −20 | −20 | −20 | −20 | −20 | −20 | −20 | −20 | −20 | −20 | −20 | −20 | −20 |
| | Rubber strength index | 107 | 106 | 105 | 107 | 108 | 105 | 109 | 100 | 106 | 101 | 100 | 97 | 106 | 105 | 104 |
| | Abrasion resistance index | 111 | 108 | 112 | 111 | 109 | 110 | 112 | 100 | 97 | 93 | 92 | 102 | 92 | 110 | 112 |
| | Wet-grip performance index | 107 | 106 | 105 | 108 | 109 | 107 | 106 | 100 | 96 | 96 | 97 | 104 | 95 | 107 | 105 |
| | Handling stability | 6 | 6 | 6 | 6 | 6 | 6 | 6 | 6 | 6 | 6 | 6 | 5.5 | 5.5 | 6 | 6 |

TABLE 8

Examples in which a compound represented by the formula (IIId) is used as a Terminal modifier

| | | Com. Ex. | | Ex. | | | | | | | | Com. Ex. |
|---|---|---|---|---|---|---|---|---|---|---|---|---|
| | | 1 | 4 | 6 | 20 | 21 | 22 | 23 | 24 | 25 | 26 | 13 |
| Formulation (parts by mass) | Copolymer (7) | — | — | 45 | 45 | 45 | 45 | 45 | 45 | 45 | 45 | 45 |
| | Copolymer (8) | 45 | — | — | — | — | — | — | — | — | — | — |
| | Copolymer (12) | — | 45 | — | — | — | — | — | — | — | — | — |
| | Natural rubber | 25 | 25 | 25 | 25 | 25 | 25 | 25 | 25 | 25 | 25 | 25 |
| | Polybutadiene rubber | 30 | 30 | 30 | 30 | 30 | 30 | 30 | 30 | 30 | 30 | 30 |
| | Silica 1 ($N_2SA$: 80 $m^2/g$) | — | — | — | — | — | — | — | — | — | — | — |
| | Silica 2 ($N_2SA$: 110 $m^2/g$) | 75 | 75 | 75 | 75 | 75 | 75 | 75 | 60 | 15 | 37.5 | 6 |
| | Silica 3 ($N_2SA$: 160 $m^2/g$) | — | — | — | — | — | — | — | 15 | 60 | 37.5 | 3 |
| | Silica 4 ($N_2SA$: 200 $m^2/g$) | — | — | — | — | — | — | — | — | — | — | — |
| | Silane coupling agent A | 6 | 6 | 6 | — | — | 1.5 | 1.5 | — | — | — | — |
| | Silane coupling agent B | — | — | — | 6 | — | 6 | — | — | — | — | — |
| | Silane coupling agent C | — | — | — | — | 3.75 | — | 3.75 | 3.75 | 3.75 | 3.75 | 3.75 |
| | Carbon black | 5 | 5 | 5 | 5 | 5 | 5 | 5 | 5 | 5 | 5 | 5 |
| | Coumarone indene resin 1 (Tg: 90° C.) | — | — | — | — | — | — | — | — | — | — | — |
| | Coumarone indene resin 2 (Tg: 10° C.) | — | — | — | — | — | — | — | — | — | — | — |
| | Coumarone indene resin 3 (Tg: −30° C.) | — | — | — | — | — | — | — | — | — | — | — |
| | α-Methyl styrene resin (Tg: 95° C.) | — | — | — | — | — | — | — | — | — | — | — |
| | Oil | 20 | 20 | 20 | 20 | 20 | 20 | 20 | 20 | 20 | 20 | 20 |
| | Antioxidant | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 |

TABLE 8-continued

Examples in which a compound represented by the formula (IIId) is used as a Terminal modifier

| | | | | | | | | | | | | |
|---|---|---|---|---|---|---|---|---|---|---|---|---|
| | Zinc oxide | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 |
| Evaluation | Mixing and kneading processability index | 100 | 97 | 102 | 100 | 105 | 103 | 110 | 112 | 109 | 110 | 131 |
| | Low-heat-build-up property index | 100 | 93 | 137 | 145 | 145 | 145 | 147 | 150 | 143 | 146 | 112 |
| | tan δ peak temperature | −20 | −20 | −20 | −20 | −20 | −20 | −20 | −20 | −20 | −22 | −20 |
| | Rubber strength index | 100 | 106 | 101 | 101 | 105 | 103 | 106 | 112 | 118 | 113 | 98 |
| | Abrasion resistance index | 100 | 97 | 104 | 100 | 102 | 102 | 105 | 105 | 110 | 107 | 90 |
| | Wet-grip performance index | 100 | 96 | 112 | 115 | 115 | 115 | 115 | 119 | 117 | 119 | 90 |
| | Handling stability | 6 | 6 | 6.25 | 6.25 | 6.25 | 6.25 | 6.5 | 6.25 | 6.25 | 6.25 | 6.25 |

| | | Com. Ex. | Ex. | | | | | | | | | Com. Ex. |
|---|---|---|---|---|---|---|---|---|---|---|---|---|
| | | 14 | 27 | 28 | 29 | 30 | 31 | 32 | 33 | 34 | 35 | 15 |
| Formulation (parts by mass) | Copolymer (7) | 45 | 45 | 45 | 45 | 45 | 45 | 45 | 45 | 45 | 40 | 100 |
| | Copolymer (8) | — | — | — | — | — | — | — | — | — | — | — |
| | Copolymer (12) | — | — | — | — | — | — | — | — | — | — | — |
| | Natural rubber | 25 | 25 | 25 | 25 | 25 | 25 | 25 | 25 | 25 | 40 | — |
| | Polybutadiene rubber | 30 | 30 | 30 | 30 | 30 | 30 | 30 | 30 | 30 | 20 | — |
| | Silica 1 ($N_2SA$: 80 $m^2/g$) | — | 60 | 60 | — | — | — | — | — | — | — | — |
| | Silica 2 ($N_2SA$: 110 $m^2/g$) | 120 | — | — | 60 | 75 | 75 | 75 | 75 | 60 | 75 | 75 |
| | Silica 3 ($N_2SA$: 160 $m^2/g$) | 40 | 15 | — | — | — | — | — | — | 15 | — | — |
| | Silica 4 ($N_2SA$: 200 $m^2/g$) | — | — | 15 | 15 | — | — | — | — | — | — | — |
| | Silane coupling agent A | — | — | — | — | — | — | — | — | — | 6 | 6 |
| | Silane coupling agent B | — | — | — | — | — | — | — | — | — | — | — |
| | Silane coupling agent C | 3.75 | 3.75 | 3.75 | 3.75 | 3.75 | 3.75 | 3.75 | 3.75 | 3.75 | — | — |
| | Carbon black | 5 | 5 | 5 | 5 | 5 | 5 | 5 | 5 | 5 | 5 | 5 |
| | Coumarone indene resin 1 (Tg: 90° C.) | — | — | — | — | 5 | — | 5 | 5 | 5 | — | — |
| | Coumarone indene resin 2 (Tg: 10° C.) | — | — | — | — | — | — | 5 | — | — | — | — |
| | Coumarone indene resin 3 (Tg: −30° C.) | — | — | — | — | — | — | — | 5 | — | — | — |
| | α-Methyl styrene resin (Tg: 95° C.) | — | — | — | — | — | 5 | — | — | — | — | — |
| | Oil | 20 | 20 | 20 | 20 | 20 | 20 | 20 | 20 | 20 | 20 | 20 |
| | Antioxidant | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 |
| Evaluation | Mixing and kneading processability index | 96 | 112 | 109 | 108 | 105 | 101 | 107 | 109 | 112 | 106 | 90 |
| | Low-heat-build-up property index | 134 | 146 | 146 | 141 | 145 | 144 | 142 | 145 | 150 | 132 | 100 |
| | tan δ peak temperature | −20 | −17 | −20 | −21 | −20 | −20 | −20 | −21 | −20 | −18 | −15 |
| | Rubber strength index | 134 | 101 | 106 | 109 | 109 | 109 | 113 | 114 | 116 | 115 | 95 |
| | Abrasion resistance index | 86 | 102 | 104 | 102 | 106 | 101 | 103 | 106 | 109 | 106 | 90 |
| | Wet-grip performance index | 113 | 116 | 119 | 120 | 123 | 125 | 123 | 125 | 123 | 102 | 120 |
| | Handling stability | 6 | 6.25 | 6.5 | 6.25 | 6.25 | 6.25 | 6.25 | 6.5 | 6.25 | 6.25 | 6.5 |

TABLE 9

Examples in which a compound represented by the formula (IIId) is used as a Terminal modifier

| | | Example | | | | | | | | | | |
|---|---|---|---|---|---|---|---|---|---|---|---|---|
| | | 36 | 37 | 38 | 39 | 40 | 21 | 41 | 42 | 43 | 44 | 45 |
| Formulation (parts by mass) | Copolymer (1) | 45 | — | — | — | — | — | — | — | — | — | 45 |
| | Copolymer (2) | — | 45 | — | — | — | — | — | — | — | — | — |
| | Copolymer (3) | — | — | 45 | — | — | — | — | — | — | — | — |
| | Copolymer (4) | — | — | — | 45 | — | — | — | — | — | — | — |
| | Copolymer (5) | — | — | — | — | 45 | — | — | — | — | — | — |
| | Copolymer (6) | — | — | — | — | — | — | — | 30 | — | — | — |
| | Copolymer (7) | — | — | — | — | — | 45 | — | — | — | — | — |
| | Copolymer (8) | — | — | — | — | — | — | — | 45 | 45 | 45 | — |

TABLE 9-continued

| Examples in which a compound represented by the formula (IIId) is used as a Terminal modifier | | | | | | | | | | | | |
|---|---|---|---|---|---|---|---|---|---|---|---|---|
| | Copolymer (9) | — | — | — | — | — | — | — | — | — | — | — |
| | Copolymer (10) | — | — | — | — | — | — | — | — | — | — | — |
| | Copolymer (11) | — | — | — | — | — | — | — | — | — | — | — |
| | Copolymer (12) | — | — | — | — | — | — | — | — | — | — | — |
| | Copolymer (13) | — | — | — | — | — | — | 45 | — | — | — | — |
| | Copolymer (14) | — | — | — | — | — | — | — | — | — | — | — |
| | Copolymer (15) | — | — | — | — | — | — | — | — | — | — | — |
| | Copolymer (16) | — | — | — | — | — | — | — | — | — | — | — |
| | Copolymer (17) | — | — | — | — | — | — | — | — | — | — | — |
| | Copolymer (18) | — | — | — | — | — | — | — | — | 30 | — | — |
| | Copolymer (19) | — | — | — | — | — | — | — | — | — | — | — |
| | Copolymer (20) | — | — | — | — | — | — | — | — | — | — | — |
| | Copolymer (21) | — | — | — | — | — | — | — | — | — | 30 | — |
| | Natural rubber | 25 | 25 | 25 | 25 | 25 | 25 | 25 | 25 | 25 | 25 | 25 |
| | Polybutadiene rubber | 30 | 30 | 30 | 30 | 30 | 30 | 30 | — | — | — | 30 |
| | Silica 2 ($N_2SA$: 110 $m^2/g$) | 75 | 75 | 75 | 75 | 75 | 75 | 75 | 75 | 75 | 75 | 75 |
| | Silane coupling agent B | 6 | 6 | 6 | 6 | 6 | 6 | 6 | 6 | 6 | 6 | — |
| | Silane coupling agent C | — | — | — | — | — | — | — | — | — | — | 3.75 |
| | Carbon black | 5 | 5 | 5 | 5 | 5 | 5 | 5 | 5 | 5 | 5 | 5 |
| | Oil | 20 | 20 | 20 | 20 | 20 | 20 | 20 | 20 | 20 | 20 | 20 |
| | Antioxidant | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 |
| Evaluation | Mixing and kneading processability index | 103 | 104 | 101 | 109 | 99 | 100 | 104 | 99 | 99 | 102 | 108 |
| | Low-heat-build-up property index | 133 | 135 | 134 | 146 | 143 | 145 | 117 | 133 | 138 | 119 | 133 |
| | tan δ peak temperature | −20 | −20 | −20 | −20 | −20 | −20 | −20 | −20 | −20 | −20 | −20 |
| | Rubber strength index | 106 | 107 | 108 | 105 | 104 | 101 | 107 | 104 | 103 | 105 | 107 |
| | Abrasion resistance index | 99 | 100 | 99 | 97 | 98 | 100 | 99 | 98 | 100 | 96 | 101 |
| | Wet-grip performance index | 114 | 114 | 113 | 112 | 112 | 115 | 110 | 109 | 110 | 108 | 114 |
| | Handling stability | 6.25 | 6.25 | 6.25 | 6.25 | 6.25 | 6.25 | 6.25 | 6 | 6 | 6 | 6.25 |

| | | Example | | | | | | | | |
|---|---|---|---|---|---|---|---|---|---|---|
| | | 46 | 47 | 48 | 49 | 22 | 50 | 51 | 52 | 53 |
| Formulation (parts by mass) | Copolymer (1) | — | — | — | — | — | — | — | — | — |
| | Copolymer (2) | 45 | — | — | — | — | — | — | — | — |
| | Copolymer (3) | — | 45 | — | — | — | — | — | — | — |
| | Copolymer (4) | — | — | 45 | — | — | — | — | — | — |
| | Copolymer (5) | — | — | — | 45 | — | — | — | — | — |
| | Copolymer (6) | — | — | — | — | — | — | 30 | — | — |
| | Copolymer (7) | — | — | — | — | 45 | — | — | — | — |
| | Copolymer (8) | — | — | — | — | — | — | 45 | 45 | 45 |
| | Copolymer (9) | — | — | — | — | — | — | — | — | — |
| | Copolymer (10) | — | — | — | — | — | — | — | — | — |
| | Copolymer (11) | — | — | — | — | — | — | — | — | — |
| | Copolymer (12) | — | — | — | — | — | — | — | — | — |
| | Copolymer (13) | — | — | — | — | — | 45 | — | — | — |
| | Copolymer (14) | — | — | — | — | — | — | — | — | — |
| | Copolymer (15) | — | — | — | — | — | — | — | — | — |
| | Copolymer (16) | — | — | — | — | — | — | — | — | — |
| | Copolymer (17) | — | — | — | — | — | — | — | — | — |
| | Copolymer (18) | — | — | — | — | — | — | — | 30 | — |
| | Copolymer (19) | — | — | — | — | — | — | — | — | — |
| | Copolymer (20) | — | — | — | — | — | — | — | — | — |
| | Copolymer (21) | — | — | — | — | — | — | — | — | 30 |
| | Natural rubber | 25 | 25 | 25 | 25 | 25 | 25 | 25 | 25 | 25 |
| | Polybutadiene rubber | 30 | 30 | 30 | 30 | 30 | 30 | — | — | — |
| | Silica 2 ($N_2SA$: 110 $m^2/g$) | 75 | 75 | 75 | 75 | 75 | 75 | 75 | 75 | 75 |
| | Silane coupling agent B | — | — | — | — | — | — | — | — | — |
| | Silane coupling agent C | 3.75 | 3.75 | 3.75 | 3.75 | 3.75 | 3.75 | 3.75 | 3.75 | 3.75 |
| | Carbon black | 5 | 5 | 5 | 5 | 5 | 5 | 5 | 5 | 5 |
| | Oil | 20 | 20 | 20 | 20 | 20 | 20 | 20 | 20 | 20 |
| | Antioxidant | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 |
| | Sulfur | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 |

TABLE 9-continued

| Examples in which a compound represented by the formula (IIId) is used as a Terminal modifier | | | | | | | | | | |
|---|---|---|---|---|---|---|---|---|---|---|
| Evaluation | Mixing and kneading processability index | 109 | 106 | 114 | 104 | 105 | 109 | 104 | 104 | 107 |
| | Low-heat-build-up property index | 135 | 134 | 146 | 143 | 145 | 117 | 133 | 138 | 119 |
| | tan δ peak temperature | −20 | −20 | −20 | −20 | −20 | −20 | −20 | −20 | −20 |
| | Rubber strength index | 108 | 109 | 106 | 105 | 105 | 108 | 105 | 104 | 106 |
| | Abrasion resistance index | 102 | 101 | 99 | 100 | 102 | 101 | 100 | 102 | 98 |
| | Wet-grip performance index | 114 | 113 | 112 | 112 | 115 | 110 | 109 | 110 | 108 |
| | Handling stability | 6.25 | 6.25 | 6.25 | 6.25 | 6.25 | 6.25 | 6 | 6 | 6 |

TABLE 10

Examples in which a compound represented by the formula (IV) is used as a Terminal modifier

| | | Example | | | | | | | | | | |
|---|---|---|---|---|---|---|---|---|---|---|---|---|
| | | 54 | 55 | 56 | 57 | 58 | 59 | 60 | 61 | 62 | 63 | 64 |
| Formulation (parts by mass) | Copolymer (8) | — | — | — | — | — | — | — | 45 | 45 | — | — |
| | Copolymer (12) | — | — | — | — | — | — | — | — | — | — | — |
| | Copolymer (14) | — | — | — | — | — | — | — | — | — | — | — |
| | Copolymer (15) | — | — | — | — | — | — | — | — | — | — | — |
| | Copolymer (19) | — | — | — | — | — | — | — | — | — | — | — |
| | Copolymer (22) | 45 | — | — | — | — | — | — | — | — | 45 | — |
| | Copolymer (23) | — | 45 | — | — | — | — | — | — | — | — | 45 |
| | Copolymer (24) | — | — | 45 | — | — | — | — | — | — | — | — |
| | Copolymer (25) | — | — | — | 45 | — | — | — | — | — | — | — |
| | Copolymer (26) | — | — | — | — | 45 | — | — | — | — | — | — |
| | Copolymer (28) | — | — | — | — | — | 45 | — | — | — | — | — |
| | Copolymer (29) | — | — | — | — | — | — | 45 | — | — | — | — |
| | Copolymer (30) | — | — | — | — | — | — | — | — | — | — | — |
| | Copolymer (31) | — | — | — | — | — | — | — | 30 | — | — | — |
| | Copolymer (32) | — | — | — | — | — | — | — | — | 30 | — | — |
| | Natural rubber | 25 | 25 | 25 | 25 | 25 | 25 | 25 | 25 | 25 | 25 | 25 |
| | Polybutadiene rubber | 30 | 30 | 30 | 30 | 30 | 30 | 30 | — | — | 30 | 30 |
| | Silica 2 ($N_2SA$: 110 $m^2/g$) | 75 | 75 | 75 | 75 | 75 | 75 | 75 | 75 | 75 | 75 | 75 |
| | Silane coupling agent B | 6 | 6 | 6 | 6 | 6 | 6 | 6 | 6 | 6 | — | — |
| | Silane coupling agent C | — | — | — | — | — | — | — | — | — | 3.75 | 3.75 |
| | Carbon black | 5 | 5 | 5 | 5 | 5 | 5 | 5 | 5 | 5 | 5 | 5 |
| | Oil | 20 | 20 | 20 | 20 | 20 | 20 | 20 | 20 | 20 | 20 | 20 |
| | Antioxidant | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 |
| Evaluation | Mixing and kneading processability index | 98 | 99 | 102 | 98 | 104 | 105 | 101 | 100 | 98 | 104 | 105 |
| | Low-heat-build-up property index | 137 | 134 | 135 | 134 | 130 | 131 | 121 | 118 | 113 | 137 | 134 |
| | tan δ peak temperature | −20 | −20 | −20 | −20 | −20 | −20 | −20 | −20 | −20 | −20 | −20 |
| | Rubber strength index | 107 | 106 | 105 | 107 | 108 | 105 | 109 | 105 | 104 | 111 | 110 |
| | Abrasion resistance index | 107 | 104 | 108 | 107 | 105 | 106 | 108 | 106 | 108 | 109 | 106 |
| | Wet-grip performance index | 110 | 109 | 108 | 111 | 112 | 110 | 109 | 110 | 108 | 110 | 109 |
| | Handling stability | 6 | 6 | 6 | 6 | 6 | 6 | 6 | 6 | 6 | 6 | 6 |

| | | Example | | | | | | |
|---|---|---|---|---|---|---|---|---|
| | | 65 | 66 | 67 | 68 | 69 | 70 | 71 |
| Formulation (parts by mass) | Copolymer (8) | — | — | — | — | — | 45 | 45 |
| | Copolymer (12) | — | — | — | — | — | — | — |
| | Copolymer (14) | — | — | — | — | — | — | — |
| | Copolymer (15) | — | — | — | — | — | — | — |
| | Copolymer (19) | — | — | — | — | — | — | — |
| | Copolymer (22) | — | — | — | — | — | — | — |
| | Copolymer (23) | — | — | — | — | — | — | — |
| | Copolymer (24) | 45 | — | — | — | — | — | — |
| | Copolymer (25) | — | 45 | — | — | — | — | — |
| | Copolymer (26) | — | — | 45 | — | — | — | — |
| | Copolymer (28) | — | — | — | 45 | — | — | — |
| | Copolymer (29) | — | — | — | — | 45 | — | — |
| | Copolymer (30) | — | — | — | — | — | — | — |
| | Copolymer (31) | — | — | — | — | — | 30 | — |

TABLE 10-continued

Examples in which a compound represented by the formula (IV) is used as a Terminal modifier

| | | | | | | | | |
|---|---|---|---|---|---|---|---|---|
| | Copolymer (32) | — | — | — | — | — | — | 30 |
| | Natural rubber | 25 | 25 | 25 | 25 | 25 | 25 | 25 |
| | Polybutadiene rubber | 30 | 30 | 30 | 30 | 30 | — | — |
| | Silica 2 ($N_2SA$: 110 $m^2/g$) | 75 | 75 | 75 | 75 | 75 | 75 | 75 |
| | Silane coupling agent B | — | — | — | — | — | — | — |
| | Silane coupling agent C | 3.75 | 3.75 | 3.75 | 3.75 | 3.75 | 3.75 | 3.75 |
| | Carbon black | 5 | 5 | 5 | 5 | 5 | 5 | 5 |
| | Oil | 20 | 20 | 20 | 20 | 20 | 20 | 20 |
| | Antioxidant | 1.5 | 1.5 | 1.5 | 1.5 | 1.5 | 1.5 | 1.5 |
| | Stearic acid | 2 | 2 | 2 | 2 | 2 | 2 | 2 |
| | Zinc oxide | 2.5 | 2.5 | 2.5 | 2.5 | 2.5 | 2.5 | 2.5 |
| | Wax | 1 | 1 | 1 | 1 | 1 | 1 | 1 |
| | Sulfur | 2 | 2 | 2 | 2 | 2 | 2 | 2 |
| | Vulcanization accelerator 1 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 |
| Evaluation | Mixing and kneading processability index | 108 | 104 | 110 | 111 | 107 | 106 | 104 |
| | Low-heat-build-up property index | 135 | 134 | 130 | 131 | 121 | 118 | 113 |
| | tan δ peak temperature | −20 | −20 | −20 | −20 | −20 | −20 | −20 |
| | Rubber strength index | 109 | 111 | 112 | 109 | 113 | 109 | 108 |
| | Abrasion resistance index | 110 | 109 | 107 | 108 | 110 | 108 | 110 |
| | Wet-grip performance index | 108 | 111 | 112 | 110 | 109 | 110 | 108 |
| | Handling stability | 6 | 6 | 6 | 6 | 6 | 6 | 6 |

TABLE 11

Examples in which a compound represented by the formula (IIIb) is used as a Terminal modifier

| | | Ex | | | | | | | | | | | |
|---|---|---|---|---|---|---|---|---|---|---|---|---|---|
| | | 72 | 73 | 74 | 75 | 76 | 77 | 78 | 79 | 80 | 81 | 82 | 83 |
| Formulation (parts by mass) | Copolymer (8) | — | — | — | — | — | — | — | — | — | — | — | — |
| | Copolymer (12) | — | — | — | — | — | — | — | — | — | — | — | — |
| | Copolymer (14) | — | — | — | — | — | — | — | — | — | — | — | — |
| | Copolymer (15) | — | — | — | — | — | — | — | — | — | — | — | — |
| | Copolymer (19) | — | — | — | — | — | — | — | — | — | — | — | — |
| | Copolymer (33) | 45 | — | — | — | — | — | — | — | — | 45 | — | — |
| | Copolymer (34) | — | 45 | — | — | — | — | — | — | — | — | 45 | — |
| | Copolymer (35) | — | — | 45 | — | — | — | — | — | — | — | — | 45 |
| | Copolymer (36) | — | — | — | 45 | — | — | — | — | — | — | — | — |
| | Copolymer (37) | — | — | — | — | 45 | — | — | — | — | — | — | — |
| | Copolymer (38) | — | — | — | — | — | 45 | — | — | — | — | — | — |
| | Copolymer (39) | — | — | — | — | — | — | 45 | — | — | — | — | — |
| | Copolymer (40) | — | — | — | — | — | — | — | 45 | — | — | — | — |
| | Copolymer (41) | — | — | — | — | — | — | — | — | 45 | — | — | — |
| | Copolymer (42) | — | — | — | — | — | — | — | — | — | — | — | — |
| | Natural rubber | 25 | 25 | 25 | 25 | 25 | 25 | 25 | 25 | 25 | 25 | 25 | 25 |
| | Polybutadiene rubber | 30 | 30 | 30 | 30 | 30 | 30 | 30 | 30 | 30 | 30 | 30 | 30 |
| | Silica 2 ($N_2SA$: 110 $m^2/g$) | 75 | 75 | 75 | 75 | 75 | 75 | 75 | 75 | 75 | 75 | 75 | 75 |
| | Silane coupling agent B | 5 | 6 | 6 | 6 | 6 | 6 | 6 | 6 | 6 | — | — | — |
| | Silane coupling agent C | — | — | — | — | — | — | — | — | — | 3.75 | 3.75 | 3.75 |
| | Carbon black | 5 | 5 | 5 | 5 | 5 | 5 | 5 | 5 | 5 | 5 | 5 | 5 |
| | Oil | 20 | 20 | 20 | 20 | 20 | 20 | 20 | 20 | 20 | 20 | 20 | 20 |
| | Antioxidant | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 | 1.2 |
| Evaluation | Mixing and kneading processability index | 102 | 107 | 103 | 102 | 103 | 101 | 107 | 102 | 103 | 108 | 113 | 109 |
| | Low-heat-build-up property index | 119 | 123 | 109 | 107 | 108 | 110 | 109 | 110 | 103 | 119 | 123 | 109 |
| | tan δ peak temperature | −20 | −20 | −20 | −20 | −20 | −20 | −20 | −20 | −20 | −20 | −20 | −20 |
| | Rubber strength index | 102 | 103 | 101 | 101 | 101 | 101 | 101 | 101 | 100 | 106 | 107 | 105 |
| | Abrasion resistance index | 104 | 104 | 103 | 113 | 103 | 102 | 112 | 106 | 109 | 106 | 106 | 105 |
| | Wet-grip performance index | 102 | 103 | 110 | 105 | 107 | 104 | 103 | 105 | 107 | 102 | 103 | 110 |
| | Handling stability | 6 | 6 | 6 | 6 | 6 | 6 | 6 | 6 | 6 | 6 | 6 | 6 |

TABLE 11-continued

Examples in which a compound represented by the formula (IIIb) is used as a Terminal modifier

| | | Ex | | | | | | Com. Ex. | |
|---|---|---|---|---|---|---|---|---|---|
| | | 84 | 85 | 86 | 87 | 88 | 89 | 16 | 17 |
| Formulation (parts by mass) | Copolymer (8) | — | — | — | — | — | — | — | — |
| | Copolymer (12) | — | — | — | — | — | — | — | — |
| | Copolymer (14) | — | — | — | — | — | — | — | — |
| | Copolymer (15) | — | — | — | — | — | — | — | — |
| | Copolymer (19) | — | — | — | — | — | — | — | — |
| | Copolymer (33) | — | — | — | — | — | — | — | — |
| | Copolymer (34) | — | — | — | — | — | — | — | — |
| | Copolymer (35) | — | — | — | — | — | — | — | — |
| | Copolymer (36) | 45 | — | — | — | — | — | — | — |
| | Copolymer (37) | — | 45 | — | — | — | — | — | — |
| | Copolymer (38) | — | — | 45 | — | — | — | — | — |
| | Copolymer (39) | — | — | — | 45 | — | — | — | — |
| | Copolymer (40) | — | — | — | — | 45 | — | — | — |
| | Copolymer (41) | — | — | — | — | — | 45 | — | — |
| | Copolymer (42) | — | — | — | — | — | — | 45 | 45 |
| | Natural rubber | 25 | 25 | 25 | 25 | 25 | 25 | 25 | 25 |
| | Polybutadiene rubber | 30 | 30 | 30 | 30 | 30 | 30 | 30 | 30 |
| | Silica 2 ($N_2SA$: 110 $m^2/g$) | 75 | 75 | 75 | 75 | 75 | 75 | 75 | 75 |
| | Silane coupling agent B | — | — | — | — | — | — | 6 | — |
| | Silane coupling agent C | 3.75 | 3.75 | 3.75 | 3.75 | 3.75 | 3.75 | — | 3.75 |
| | Carbon black | 5 | 5 | 5 | 5 | 5 | 5 | 5 | 5 |
| | Oil | 20 | 20 | 20 | 20 | 20 | 20 | 20 | 20 |
| | Antioxidant | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 |
| | Wax | 1 | 1 | 1 | 1 | 1 | 1 | 1 | 1 |
| | Sulfur | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 |
| Evaluation | Mixing and kneading processability index | 108 | 109 | 107 | 113 | 108 | 109 | 101 | 101 |
| | Low-heat-build-up property index | 107 | 108 | 110 | 109 | 110 | 103 | 104 | 104 |
| | tan δ peak temperature | −20 | −20 | −20 | −20 | −20 | −20 | −20 | −20 |
| | Rubber strength index | 105 | 105 | 105 | 105 | 105 | 104 | 103 | 103 |
| | Abrasion resistance index | 115 | 105 | 104 | 114 | 108 | 111 | 97 | 97 |
| | Wet-grip performance index | 105 | 107 | 104 | 103 | 105 | 107 | 108 | 108 |
| | Handling stability | 6 | 6 | 6 | 6 | 6 | 6 | 6 | 6 |

TABLE 12

Examples in which a compound containing an alkoxysilyl group, a nitrogen atom and a carbonyl group is used as a Terminal modifier

| | | Example | | | | | | | | | |
|---|---|---|---|---|---|---|---|---|---|---|---|
| | | 90 | 91 | 92 | 93 | 94 | 95 | 96 | 97 | 98 | 99 |
| Formulation (parts by mass) | Copolymer (8) | — | — | — | — | — | — | — | — | — | — |
| | Copolymer (12) | — | — | — | — | — | — | — | — | — | — |
| | Copolymer (14) | — | — | — | — | — | — | — | — | — | — |
| | Copolymer (15) | — | — | — | — | — | — | — | — | — | — |
| | Copolymer (19) | — | — | — | — | — | — | — | — | — | — |
| | Copolymer (43) | 45 | — | — | — | — | — | — | 45 | — | — |
| | Copolymer (44) | — | 45 | — | — | — | — | — | — | 45 | — |
| | Copolymer (45) | — | — | 45 | — | — | — | — | — | — | 45 |
| | Copolymer (46) | — | — | — | 45 | — | — | — | — | — | — |
| | Copolymer (47) | — | — | — | — | 45 | — | — | — | — | — |
| | Copolymer (48) | — | — | — | — | — | 45 | — | — | — | — |
| | Copolymer (49) | — | — | — | — | — | — | 45 | — | — | — |
| | Copolymer (50) | — | — | — | — | — | — | — | — | — | — |
| | Natural rubber | 25 | 25 | 25 | 25 | 25 | 25 | 25 | 25 | 25 | 25 |
| | Polybutadiene rubber | 30 | 30 | 30 | 30 | 30 | 30 | 30 | 30 | 30 | 30 |
| | Silica 2 ($N_2SA$: 110 $m^2/g$) | 75 | 75 | 75 | 75 | 75 | 75 | 75 | 75 | 75 | 75 |
| | Silane coupling agent B | 6 | 6 | 6 | 6 | 6 | 6 | 6 | — | — | — |
| | Silane coupling agent C | — | — | — | — | — | — | — | 3.75 | 3.75 | 3.75 |
| | Carbon black | 5 | 5 | 5 | 5 | 5 | 5 | 5 | 5 | 5 | 5 |
| | Oil | 20 | 20 | 20 | 20 | 20 | 20 | 20 | 20 | 20 | 20 |
| | Antioxidant | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |

TABLE 12-continued

Examples in which a compound containing an alkoxysilyl group, a nitrogen atom and a carbonyl group is used as a Terminal modifier

| | | | | | | | | | | | |
|---|---|---|---|---|---|---|---|---|---|---|---|
| | Wax | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 |
| Evaluation | Mixing and kneading processability index | 106 | 105 | 103 | 102 | 100 | 104 | 105 | 112 | 111 | 109 |
| | Low-heat-build-up property index | 105 | 103 | 106 | 106 | 107 | 104 | 104 | 105 | 103 | 106 |
| | tan δ peak temperature | −20 | −20 | −20 | −20 | −20 | −20 | −20 | −20 | −20 | −20 |
| | Rubber strength index | 104 | 103 | 104 | 104 | 105 | 103 | 103 | 108 | 107 | 108 |
| | Abrasion resistance index | 107 | 106 | 102 | 103 | 104 | 102 | 103 | 109 | 108 | 104 |
| | Wet-grip performance index | 103 | 109 | 107 | 110 | 111 | 109 | 111 | 103 | 109 | 107 |
| | Handling stability | 6 | 6 | 6 | 6 | 6 | 6 | 6 | 6 | 6 | 6 |

| | | Example | | | | Comparative Example | |
|---|---|---|---|---|---|---|---|
| | | 100 | 101 | 102 | 103 | 18 | 19 |
| Formulation (parts by mass) | Copolymer (8) | — | — | — | — | — | — |
| | Copolymer (12) | — | — | — | — | — | — |
| | Copolymer (14) | — | — | — | — | — | — |
| | Copolymer (15) | — | — | — | — | — | — |
| | Copolymer (19) | — | — | — | — | — | — |
| | Copolymer (43) | — | — | — | — | — | — |
| | Copolymer (44) | — | — | — | — | — | — |
| | Copolymer (45) | — | — | — | — | — | — |
| | Copolymer (46) | 45 | — | — | — | — | — |
| | Copolymer (47) | — | 45 | — | — | — | — |
| | Copolymer (48) | — | — | 45 | — | — | — |
| | Copolymer (49) | — | — | — | 45 | — | — |
| | Copolymer (50) | — | — | — | — | 45 | 45 |
| | Natural rubber | 25 | 25 | 25 | 25 | 25 | 25 |
| | Polybutadiene rubber | 30 | 30 | 30 | 30 | 30 | 30 |
| | Silica 2 ($N_2SA$: 110 $m^2/g$) | 75 | 75 | 75 | 75 | 75 | 75 |
| | Silane coupling agent B | — | — | — | — | 6 | — |
| | Silane coupling agent C | 3.75 | 3.75 | 3.75 | 3.75 | — | 3.75 |
| | Carbon black | 5 | 5 | 5 | 5 | 5 | 5 |
| | Oil | 20 | 20 | 20 | 20 | 20 | 20 |
| | Antioxidant | 1.5 | 1.5 | 1.5 | 1.5 | 1.5 | 1.5 |
| | Stearic acid | 2 | 2 | 2 | 2 | 2 | 2 |
| | Zinc oxide | 2.5 | 2.5 | 2.5 | 2.5 | 2.5 | 2.5 |
| | Wax | 1 | 1 | 1 | 1 | 1 | 1 |
| | Sulfur | 2 | 2 | 2 | 2 | 2 | 2 |
| | Vulcanization accelerator 1 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 |
| Evaluation | Mixing and kneading processability index | 108 | 106 | 110 | 111 | 95 | 101 |
| | Low-heat-build-up property index | 106 | 107 | 104 | 104 | 105 | 105 |
| | tan δ peak temperature | −20 | −20 | −20 | −20 | −20 | −20 |
| | Rubber strength index | 108 | 109 | 107 | 107 | 100 | 104 |
| | Abrasion resistance index | 105 | 106 | 104 | 105 | 97 | 99 |
| | Wet-grip performance index | 110 | 111 | 109 | 111 | 100 | 100 |
| | Handling stability | 6 | 6 | 6 | 6 | 6 | 6 |

TABLE 13

Examples in which an N,N-dialkyl-substituted carboxylic acid amide dialkyl acetal compound is used as a Terminal modifier

| | | Example | | | | | | | | | |
|---|---|---|---|---|---|---|---|---|---|---|---|
| | | 104 | 105 | 106 | 107 | 108 | 109 | 110 | 111 | 112 | 113 |
| Formulation (parts by mass) | Copolymer (8) | — | — | — | — | — | — | — | — | — | — |
| | Copolymer (12) | — | — | — | — | — | — | — | — | — | — |
| | Copolymer (14) | — | — | — | — | — | — | — | — | — | — |
| | Copolymer (15) | — | — | — | — | — | — | — | — | — | — |
| | Copolymer (19) | — | — | — | — | — | — | — | — | — | — |
| | Copolymer (51) | 45 | — | — | — | — | — | — | 45 | — | — |
| | Copolymer (52) | — | 45 | — | — | — | — | — | — | 45 | — |
| | Copolymer (53) | — | — | 45 | — | — | — | — | — | — | 45 |
| | Copolymer (54) | — | — | — | 45 | — | — | — | — | — | — |

TABLE 13-continued

| Examples in which an N,N-dialkyl-substituted carboxylic acid amide dialkyl acetal compound is used as a Terminal modifier | | | | | | | | | | | |
|---|---|---|---|---|---|---|---|---|---|---|---|
| | Copolymer (55) | — | — | — | — | 45 | — | — | — | — | — |
| | Copolymer (56) | — | — | — | — | — | 45 | — | — | — | — |
| | Copolymer (57) | — | — | — | — | — | — | 45 | — | — | — |
| | Copolymer (58) | — | — | — | — | — | — | — | — | — | — |
| | Natural rubber | 25 | 25 | 25 | 25 | 25 | 25 | 25 | 25 | 25 | 25 |
| | Polybutadiene rubber | 30 | 30 | 30 | 30 | 30 | 30 | 30 | 30 | 30 | 30 |
| | Silica 2 ($N_2SA$: 110 $m^2/g$) | 75 | 75 | 75 | 75 | 75 | 75 | 75 | 75 | 75 | 75 |
| | Silane coupling agent B | 6 | 6 | 6 | 6 | 6 | 6 | 6 | — | — | — |
| | Silane coupling agent C | — | — | — | — | — | — | — | 3.75 | 3.75 | 3.75 |
| | Carbon black | 5 | 5 | 5 | 5 | 5 | 5 | 5 | 5 | 5 | 5 |
| | Oil | 20 | 20 | 20 | 20 | 20 | 20 | 20 | 20 | 20 | 20 |
| | Antioxidant | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 |
| Evaluation | Mixing and kneading processability index | 103 | 105 | 104 | 104 | 100 | 103 | 106 | 109 | 111 | 110 |
| | Low-heat-build-up property index | 105 | 105 | 104 | 105 | 108 | 102 | 103 | 105 | 105 | 104 |
| | | −20 | −20 | −20 | −20 | −20 | −20 | −20 | −20 | −20 | −20 |
| | Rubber strength index | 104 | 104 | 104 | 104 | 105 | 101 | 103 | 108 | 108 | 108 |
| | Abrasion resistance index | 108 | 107 | 103 | 102 | 103 | 102 | 102 | 110 | 109 | 105 |
| | Wet-grip performance index | 102 | 107 | 111 | 108 | 113 | 108 | 110 | 102 | 107 | 111 |
| | Handling stability | 6 | 6 | 6 | 6 | 6 | 6 | 6 | 6 | 6 | 6 |

| | | Example | | | | Comparative Example | |
|---|---|---|---|---|---|---|---|
| | | 114 | 115 | 116 | 117 | 20 | 21 |
| Formulation (parts by mass) | Copolymer (8) | — | — | — | — | — | — |
| | Copolymer (12) | — | — | — | — | — | — |
| | Copolymer (14) | — | — | — | — | — | — |
| | Copolymer (15) | — | — | — | — | — | — |
| | Copolymer (19) | — | — | — | — | — | — |
| | Copolymer (51) | — | — | — | — | — | — |
| | Copolymer (52) | — | — | — | — | — | — |
| | Copolymer (53) | — | — | — | — | — | — |
| | Copolymer (54) | 45 | — | — | — | — | — |
| | Copolymer (55) | — | 45 | — | — | — | — |
| | Copolymer (56) | — | — | 45 | — | — | — |
| | Copolymer (57) | — | — | — | 45 | — | — |
| | Copolymer (58) | — | — | — | — | 45 | 45 |
| | Natural rubber | 25 | 25 | 25 | 25 | 25 | 25 |
| | Polybutadiene rubber | 30 | 30 | 30 | 30 | 30 | 30 |
| | Silica 2 ($N_2SA$: 110 $m^2/g$) | 75 | 75 | 75 | 75 | 75 | 75 |
| | Silane coupling agent B | — | — | — | — | 6 | — |
| | Silane coupling agent C | 3.75 | 3.75 | 3.75 | 3.75 | — | 3.75 |
| | Carbon black | 5 | 5 | 5 | 5 | 5 | 5 |
| | Oil | 20 | 20 | 20 | 20 | 20 | 20 |
| | Antioxidant | 1.5 | 1.5 | 1.5 | 1.5 | 1.5 | 1.5 |
| | Stearic acid | 2 | 2 | 2 | 2 | 2 | 2 |
| | Zinc oxide | 2.5 | 2.5 | 2.5 | 2.5 | 2.5 | 2.5 |
| | Wax | 1 | 1 | 1 | 1 | 1 | 1 |
| | Sulfur | 2 | 2 | 2 | 2 | 2 | 2 |
| | Vulcanization accelerator 1 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 |
| Evaluation | Mixing and kneading processability index | 110 | 106 | 109 | 112 | 94 | 100 |
| | Low-heat-build-up property index | 105 | 108 | 102 | 103 | 104 | 104 |
| | | −20 | −20 | −20 | −20 | −20 | −20 |
| | Rubber strength index | 108 | 109 | 105 | 107 | 100 | 104 |
| | Abrasion resistance index | 104 | 105 | 104 | 104 | 98 | 100 |
| | Wet-grip performance index | 108 | 113 | 108 | 110 | 99 | 99 |
| | Handling stability | 6 | 6 | 6 | 6 | 6 | 6 |

TABLE 14

Examples in which a compound represented by the formula (IIId) is used as a Terminal modifier

| | | Example | | | | | | | | | | Comparative Example | |
|---|---|---|---|---|---|---|---|---|---|---|---|---|---|
| | | 118 | 119 | 120 | 121 | 122 | 123 | 124 | 125 | 126 | 127 | 22 | 23 |
| Formulation (parts by mass) | Copolymer (1) | 45 | — | — | — | — | — | — | — | — | — | — | — |
| | Copolymer (2) | — | 45 | — | — | — | — | — | — | — | — | — | — |
| | Copolymer (3) | — | — | 45 | — | — | — | — | — | — | — | — | — |
| | Copolymer (4) | — | — | — | 45 | — | — | — | — | — | — | — | — |
| | Copolymer (5) | — | — | — | — | 45 | — | — | — | — | — | — | — |
| | Copolymer (6) | — | — | — | — | — | — | — | 30 | — | — | — | — |
| | Copolymer (7) | — | — | — | — | — | 45 | — | — | — | — | — | — |
| | Copolymer (8) | — | — | — | — | — | — | — | 45 | 45 | 45 | 45 | — |
| | Copolymer (9) | — | — | — | — | — | — | — | — | — | — | — | — |
| | Copolymer (10) | — | — | — | — | — | — | — | — | — | — | — | 45 |
| | Copolymer (11) | — | — | — | — | — | — | — | — | — | — | — | — |
| | Copolymer (12) | — | — | — | — | — | — | — | — | — | — | — | — |
| | Copolymer (13) | — | — | — | — | — | — | 45 | — | — | — | — | — |
| | Copolymer (14) | — | — | — | — | — | — | — | — | — | — | — | — |
| | Copolymer (15) | — | — | — | — | — | — | — | — | — | — | — | — |
| | Copolymer (16) | — | — | — | — | — | — | — | — | — | — | — | — |
| | Copolymer (17) | — | — | — | — | — | — | — | — | — | — | — | — |
| | Copolymer (18) | — | — | — | — | — | — | — | — | 30 | — | — | — |
| | Copolymer (19) | — | — | — | — | — | — | — | — | — | — | — | — |
| | Copolymer (20) | — | — | — | — | — | — | — | — | — | — | — | — |
| | Copolymer (21) | — | — | — | — | — | — | — | — | — | 30 | — | — |
| | Natural rubber | 25 | 25 | 25 | 25 | 25 | 25 | 25 | 25 | 25 | 25 | 25 | 25 |
| | Polybutadiene rubber | 30 | 30 | 30 | 30 | 30 | 30 | 30 | — | — | — | 30 | 30 |
| | Carbon black | 5 | 5 | 5 | 5 | 5 | 5 | 5 | 5 | 5 | 5 | 5 | 5 |
| | Oil | 20 | 20 | 20 | 20 | 20 | 20 | 20 | 20 | 20 | 20 | 20 | 20 |
| | Silica 1 ($N_2SA$: 80 $m^2/g$) | — | — | — | — | — | — | — | — | — | — | — | — |
| | Silica 2 ($N_2SA$: 110 $m^2/g$) | 60 | 60 | 60 | 60 | 60 | 60 | 60 | 60 | 60 | 60 | 60 | 60 |
| | Silica 3 ($N_2SA$: 160 $m^2/g$) | 15 | 15 | 15 | 15 | 15 | 15 | 15 | 15 | 15 | 15 | 15 | 15 |
| | Silica 4 ($N_2SA$: 200 $m^2/g$) | — | — | — | — | — | — | — | — | — | — | — | — |
| | Silane coupling agent A | 6 | 6 | 6 | 6 | 6 | 6 | 6 | 6 | 6 | 6 | 6 | 6 |
| | Antioxidant | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 25 | 2.5 | 2.5 | 2.5 | 2.5 |
| | Wax | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 | 1.2 |
| Evaluation | Mixing and kneading processability index | 104 | 105 | 102 | 110 | 100 | 101 | 105 | 100 | 100 | 103 | 100 | 101 |
| | Low-heat-build-up property index | 124 | 125 | 125 | 137 | 134 | 136 | 108 | 124 | 129 | 110 | 100 | 95 |
| | tan δ peak temperature | −20 | −20 | −20 | −20 | −20 | −20 | −19 | −17 | −17 | −17 | −20 | −20 |
| | Rubber strength index | 106 | 107 | 108 | 105 | 104 | 104 | 107 | 104 | 103 | 105 | 100 | 105 |
| | Abrasion resistance index | 102 | 103 | 102 | 100 | 101 | 103 | 102 | 101 | 103 | 100 | 100 | 100 |
| | Wet-grip performance index | 113 | 113 | 112 | 111 | 111 | 114 | 109 | 108 | 109 | 107 | 100 | 102 |
| | Handling stability | 6.25 | 6.25 | 6.25 | 6.25 | 6.25 | 6.25 | 6.25 | 6 | 6 | 6 | 6 | 6 |

| | | Comparative Example | | | | | | | | |
|---|---|---|---|---|---|---|---|---|---|---|
| | | 24 | 25 | 26 | 27 | 28 | 29 | 30 | 31 | 32 |
| Formulation (parts by mass) | Copolymer (1) | — | — | — | — | — | — | — | — | — |
| | Copolymer (2) | — | — | — | — | — | — | — | — | — |
| | Copolymer (3) | — | — | — | — | — | — | — | — | — |
| | Copolymer (4) | — | — | — | — | — | — | — | — | — |
| | Copolymer (5) | — | — | — | — | — | — | — | — | — |
| | Copolymer (6) | — | — | — | — | — | — | — | — | — |
| | Copolymer (7) | — | — | — | — | — | — | — | — | — |
| | Copolymer (8) | — | — | — | — | — | — | 45 | 45 | 45 |
| | Copolymer (9) | — | — | — | — | — | — | 30 | — | — |
| | Copolymer (10) | — | — | — | — | — | — | — | — | — |
| | Copolymer (11) | 45 | — | — | — | — | — | — | — | — |
| | Copolymer (12) | — | 45 | — | — | — | — | — | — | — |
| | Copolymer (13) | — | — | — | — | — | — | — | — | — |
| | Copolymer (14) | — | — | 45 | — | — | — | — | — | — |
| | Copolymer (15) | — | — | — | 45 | — | — | — | — | — |
| | Copolymer (16) | — | — | — | — | 45 | — | — | — | — |
| | Copolymer (17) | — | — | — | — | — | 45 | — | — | — |
| | Copolymer (18) | — | — | — | — | — | — | — | — | — |
| | Copolymer (19) | — | — | — | — | — | — | — | 30 | — |
| | Copolymer (20) | — | — | — | — | — | — | — | — | 30 |
| | Copolymer (21) | — | — | — | — | — | — | — | — | — |
| | Natural rubber | 25 | 25 | 25 | 25 | 25 | 25 | 25 | 25 | 25 |

TABLE 14-continued

Examples in which a compound represented by the formula (IIId) is used as a Terminal modifier

| | | | | | | | | | | |
|---|---|---|---|---|---|---|---|---|---|---|
| | Polybutadiene rubber | 30 | 30 | 30 | 30 | 30 | 30 | — | — | — |
| | Carbon black | 5 | 5 | 5 | 5 | 5 | 5 | 5 | 5 | 5 |
| | Oil | 20 | 20 | 20 | 20 | 20 | 20 | 20 | 20 | 20 |
| | Silica 1 ($N_2SA$: 80 $m^2/g$) | — | — | — | — | — | — | — | — | — |
| | Silica 2 ($N_2SA$: 110 $m^2/g$) | 60 | 60 | 60 | 60 | 60 | 60 | 60 | 60 | 60 |
| | Silica 3 ($N_2SA$: 160 $m^2/g$) | 15 | 15 | 15 | 15 | 15 | 15 | 15 | 15 | 15 |
| | Silica 4 ($N_2SA$: 200 $m^2/g$) | — | — | — | — | — | — | — | — | — |
| | Silane coupling agent A | 6 | 6 | 6 | 6 | 6 | 6 | 6 | 6 | 6 |
| | Antioxidant | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 |
| | Sulfur | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 |
| Evaluation | Mixing and kneading processability index | 97 | 96 | 95 | 93 | 92 | 92 | 96 | 97 | 101 |
| | Low-heat-build-up property index | 98 | 92 | 99 | 98 | 97 | 101 | 104 | 106 | 97 |
| | tan δ peak temperature | −20 | −22 | −20 | −20 | −20 | −20 | −17 | −17 | −17 |
| | Rubber strength index | 103 | 108 | 103 | 102 | 104 | 102 | 99 | 99 | 101 |
| | Abrasion resistance index | 98 | 96 | 92 | 91 | 95 | 87 | 100 | 101 | 94 |
| | Wet-grip performance index | 102 | 97 | 97 | 98 | 97 | 101 | 106 | 105 | 103 |
| | Handling stability | 6 | 6 | 6 | 6 | 6 | 6 | 5.5 | 5.5 | 5.5 |

TABLE 15

Examples in which a compound represented by the formula (IV) is used as a Terminal modifier

| | | Example | | | | | | | Comparative Example | | |
|---|---|---|---|---|---|---|---|---|---|---|---|
| | | 128 | 129 | 130 | 131 | 132 | 133 | 134 | 22 | 25 | 26 |
| Formulation (parts by mass) | Copolymer (8) | — | — | — | — | — | — | — | 45 | — | — |
| | Copolymer (12) | — | — | — | — | — | — | — | — | 45 | — |
| | Copolymer (14) | — | — | — | — | — | — | — | — | — | 45 |
| | Copolymer (15) | — | — | — | — | — | — | — | — | — | — |
| | Copolymer (19) | — | — | — | — | — | — | — | — | — | — |
| | Copolymer (22) | 45 | — | — | — | — | — | — | — | — | — |
| | Copolymer (23) | — | 45 | — | — | — | — | — | — | — | — |
| | Copolymer (24) | — | — | 45 | — | — | — | — | — | — | — |
| | Copolymer (25) | — | — | — | 45 | — | — | — | — | — | — |
| | Copolymer (26) | — | — | — | — | 45 | — | — | — | — | — |
| | Copolymer (27) | — | — | — | — | — | — | — | — | — | — |
| | Copolymer (28) | — | — | — | — | — | 45 | — | — | — | — |
| | Copolymer (29) | — | — | — | — | — | — | 45 | — | — | — |
| | Copolymer (30) | — | — | — | — | — | — | — | — | — | — |
| | Copolymer (31) | — | — | — | — | — | — | — | — | — | — |
| | Copolymer (32) | — | — | — | — | — | — | — | — | — | — |
| | Natural rubber | 25 | 25 | 25 | 25 | 25 | 25 | 25 | 25 | 25 | 25 |
| | Polybutadiene rubber | 30 | 30 | 30 | 30 | 30 | 30 | 30 | 30 | 30 | 30 |
| | Carbon black | 5 | 5 | 5 | 5 | 5 | 5 | 5 | 5 | 5 | 5 |
| | Oil | 20 | 20 | 20 | 20 | 20 | 20 | 20 | 20 | 20 | 20 |
| | Silica 1 ($N_2SA$: 80 $m^2/g$) | — | — | — | — | — | — | — | — | — | — |
| | Silica 2 ($N_2SA$: 110 $m^2/g$) | 60 | 60 | 60 | 60 | 60 | 60 | 60 | 60 | 60 | 60 |
| | Silica 3 ($N_2SA$: 160 $m^2/g$) | 15 | 15 | 15 | 15 | 15 | 15 | 15 | 15 | 15 | 15 |
| | Silica 4 ($N_2SA$: 200 $m^2/g$) | — | — | — | — | — | — | — | — | — | — |
| | Silane coupling agent A | 6 | 6 | 6 | 6 | 6 | 6 | 6 | 6 | 6 | 6 |
| | Antioxidant | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 |
| Evaluation | Mixing and kneading processability index | 100 | 100 | 103 | 100 | 105 | 106 | 102 | 100 | 96 | 95 |
| | Low-heat-build-up property index | 128 | 125 | 126 | 125 | 121 | 122 | 112 | 100 | 92 | 99 |
| | tan δ peak temperature | −20 | −20 | −20 | −20 | −20 | −20 | −20 | −20 | −22 | −20 |
| | Rubber strength index | 110 | 109 | 108 | 110 | 111 | 108 | 112 | 100 | 108 | 103 |
| | Abrasion resistance index | 110 | 107 | 111 | 110 | 108 | 109 | 111 | 100 | 96 | 92 |
| | Wet-grip performance index | 109 | 108 | 107 | 110 | 111 | 109 | 108 | 100 | 97 | 97 |
| | Handling stability | 6 | 6 | 6 | 6 | 6 | 6 | 6 | 6 | 6 | 6 |

TABLE 15-continued

Examples in which a compound represented by the formula (IV) is used as a Terminal modifier

| | | Comparative Example | | | Example | | |
|---|---|---|---|---|---|---|---|
| | | 27 | 31 | 33 | 135 | 136 | 137 |
| Formulation (parts by mass) | Copolymer (8) | — | 45 | — | 45 | 45 | 45 |
| | Copolymer (12) | — | — | — | — | — | — |
| | Copolymer (14) | — | — | — | — | — | — |
| | Copolymer (15) | 45 | — | — | — | — | — |
| | Copolymer (19) | — | 30 | — | — | — | — |
| | Copolymer (22) | — | — | — | — | — | — |
| | Copolymer (23) | — | — | — | — | — | — |
| | Copolymer (24) | — | — | — | — | — | — |
| | Copolymer (25) | — | — | — | — | — | — |
| | Copolymer (26) | — | — | — | — | — | — |
| | Copolymer (27) | — | — | — | 30 | — | — |
| | Copolymer (28) | — | — | — | — | — | — |
| | Copolymer (29) | — | — | — | — | — | — |
| | Copolymer (30) | — | — | 45 | — | — | — |
| | Copolymer (31) | — | — | — | — | 30 | — |
| | Copolymer (32) | — | — | — | — | — | 30 |
| | Natural rubber | 25 | 25 | 25 | 25 | 25 | 25 |
| | Polybutadiene rubber | 30 | — | 30 | — | — | — |
| | Carbon black | 5 | 5 | 5 | 5 | 5 | 5 |
| | Oil | 20 | 20 | 20 | 20 | 20 | 20 |
| | Silica 1 ($N_2SA$: 80 $m^2/g$) | — | — | — | — | — | — |
| | Silica 2 ($N_2SA$: 110 $m^2/g$) | 60 | 60 | 60 | 60 | 60 | 60 |
| | Silica 3 ($N_2SA$: 160 $m^2/g$) | 15 | 15 | 15 | 15 | 15 | 15 |
| | Silica 4 ($N_2SA$: 200 $m^2/g$) | — | — | — | — | — | — |
| | Silane coupling agent A | 6 | 6 | 6 | 6 | 6 | 6 |
| | Antioxidant | 1.5 | 1.5 | 1.5 | 1.5 | 1.5 | 1.5 |
| | Stearic acid | 2 | 2 | 2 | 2 | 2 | 2 |
| | Zinc oxide | 2.5 | 2.5 | 2.5 | 2.5 | 2.5 | 2.5 |
| | Wax | 1 | 1 | 1 | 1 | 1 | 1 |
| | Sulfur | 2 | 2 | 2 | 2 | 2 | 2 |
| | Vulcanization accelerator 1 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 |
| Evaluation | Mixing and kneading processability index | 93 | 97 | 97 | 100 | 101 | 100 |
| | Low-heat-build-up property index | 98 | 106 | 95 | 107 | 109 | 104 |
| | tan δ peak temperature | −20 | −17 | −17 | −17 | −17 | −17 |
| | Rubber strength index | 102 | 99 | 104 | 108 | 108 | 107 |
| | Abrasion resistance index | 91 | 101 | 101 | 107 | 109 | 111 |
| | Wet-grip performance index | 98 | 105 | 103 | 110 | 109 | 107 |
| | Handling stability | 6 | 5.5 | 5.5 | 6 | 6 | 6 |

TABLE 16

Examples in which a compound represented by the formula (IIId) is used as a Terminal modifier

| | | Com. Ex. | | Ex. | Com. Ex. | | Ex. | | | | |
|---|---|---|---|---|---|---|---|---|---|---|---|
| | | 22 | 25 | 123 | 34 | 35 | 138 | 139 | 140 | 141 | 142 |
| Formulation (parts by mass) | Copolymer (7) | — | — | 45 | 45 | 45 | 45 | 45 | 45 | 45 | 45 |
| | Copolymer (8) | 45 | — | — | — | — | — | — | — | — | — |
| | Copolymer (12) | — | 45 | — | — | — | — | — | — | — | — |
| | Natural rubber | 25 | 25 | 25 | 25 | 25 | 25 | 25 | 25 | 25 | 25 |
| | Polybutadiene rubber | 30 | 30 | 30 | 30 | 30 | 30 | 30 | 30 | 30 | 30 |
| | Carbon black | 5 | 5 | 5 | 5 | 5 | 5 | 5 | 5 | 5 | 5 |
| | Oil | 20 | 20 | 20 | 20 | 20 | 20 | 20 | 20 | 20 | 20 |
| | Silica 1 ($N_2SA$: 80 $m^2/g$) | — | — | — | — | — | — | — | 60 | 60 | — |
| | Silica 2 ($N_2SA$: 110 $m^2/g$) | 60 | 60 | 60 | 6 | 120 | 37.5 | 15 | — | — | 60 |
| | Silica 3 ($N_2SA$: 160 $m^2/g$) | 15 | 15 | 15 | 3 | 40 | 37.5 | 60 | 15 | — | — |
| | Silica 4 ($N_2SA$: 200 $m^2/g$) | — | — | — | — | — | — | — | — | 15 | 15 |
| | Silane coupling agent A | 6 | 6 | 6 | 6 | 6 | 6 | 6 | 6 | 6 | 6 |
| | Coumarone indene resin 1 (Tg: 90° C.) | — | — | — | — | — | — | — | — | — | — |
| | Coumarone indene resin 2 (Tg: 10° C.) | — | — | — | — | — | — | — | — | — | — |
| | Coumarone indene resin 3 (Tg: −30° C.) | — | — | — | — | — | — | — | — | — | — |

TABLE 16-continued

Examples in which a compound represented by the formula (IIId) is used as a Terminal modifier

| | | | | | | | | | | | |
|---|---|---|---|---|---|---|---|---|---|---|---|
| | α-Methyl styrene resin (Tg: 95° C.) | — | — | — | — | — | — | — | — | — | — |
| | Antioxidant | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 |
| Evaluation | Mixing and kneading processability index | 100 | 96 | 101 | 120 | 85 | 100 | 100 | 104 | 101 | 100 |
| | Low-heat-build-up property index | 100 | 92 | 136 | 98 | 120 | 132 | 129 | 136 | 136 | 131 |
| | tan δ peak temperature | −20 | −22 | −20 | −20 | −20 | −22 | −20 | −17 | −20 | −21 |
| | Rubber strength index | 100 | 108 | 104 | 90 | 124 | 105 | 110 | 101 | 106 | 109 |
| | Abrasion resistance index | 100 | 96 | 103 | 98 | 84 | 105 | 108 | 101 | 104 | 106 |
| | Wet-grip performance index | 100 | 97 | 114 | 95 | 110 | 114 | 112 | 112 | 115 | 116 |
| | Handling stability | 6 | 6 | 6.25 | 6.25 | 6 | 6.25 | 6.25 | 6 | 6.25 | 6.5 |

| | | Ex. | | | | | Com. Ex. |
|---|---|---|---|---|---|---|---|
| | | 143 | 144 | 145 | 146 | 147 | 36 |
| Formulation (parts by mass) | Copolymer (7) | 40 | 45 | 45 | 45 | 45 | 100 |
| | Copolymer (8) | — | — | — | — | — | — |
| | Copolymer (12) | — | — | — | — | — | — |
| | Natural rubber | 40 | 25 | 25 | 25 | 25 | — |
| | Polybutadiene rubber | 20 | 30 | 30 | 30 | 30 | — |
| | Carbon black | 5 | 5 | 5 | 5 | 5 | 5 |
| | Oil | 20 | 20 | 20 | 20 | 20 | 20 |
| | Silica 1 ($N_2SA$: 80 $m^2/g$) | — | — | — | — | — | — |
| | Silica 2 ($N_2SA$: 110 $m^2/g$) | 60 | 60 | 60 | 60 | 60 | 60 |
| | Silica 3 ($N_2SA$: 160 $m^2/g$) | 15 | 15 | 15 | 15 | 15 | 15 |
| | Silica 4 ($N_2SA$: 200 $m^2/g$) | — | — | — | — | — | — |
| | Silane coupling agent A | 6 | 6 | 6 | 6 | 6 | 6 |
| | Coumarone indene resin 1 (Tg: 90° C.) | — | 5 | — | 5 | 5 | — |
| | Coumarone indene resin 2 (Tg: 10° C.) | — | — | — | 5 | — | — |
| | Coumarone indene resin 3 (Tg: −30° C.) | — | — | — | — | 5 | — |
| | α-Methyl styrene resin (Tg: 95° C.) | — | — | 5 | — | — | — |
| | Antioxidant | 1.5 | 1.5 | 1.5 | 1.5 | 1.5 | 1.5 |
| | Stearic acid | 2 | 2 | 2 | 2 | 2 | 2 |
| | Zinc oxide | 2.5 | 2.5 | 2.5 | 2.5 | 2.5 | 2.5 |
| | Wax | 1 | 1 | 1 | 1 | 1 | 1 |
| | Sulfur | 2 | 2 | 2 | 2 | 2 | 2 |
| | Vulcanization accelerator 1 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 |
| Evaluation | Mixing and kneading processability index | 103 | 101 | 101 | 107 | 109 | 81 |
| | Low-heat-build-up property index | 130 | 136 | 135 | 133 | 136 | 124 |
| | tan δ peak temperature | −18 | −20 | −20 | −20 | −21 | −14 |
| | Rubber strength index | 104 | 106 | 106 | 110 | 111 | 77 |
| | Abrasion resistance index | 104 | 105 | 101 | 103 | 106 | 80 |
| | Wet-grip performance index | 108 | 118 | 120 | 118 | 120 | 123 |
| | Handling stability | 6.25 | 6.25 | 6.25 | 6.25 | 6.5 | 4.5 |

TABLE 17

Examples in which a compound represented by the formula (IIIb) is used as a Terminal modifier

| | | Example | | | | | | | | | Comparative Example | | | | | |
|---|---|---|---|---|---|---|---|---|---|---|---|---|---|---|---|---|
| | | 148 | 149 | 150 | 151 | 152 | 153 | 154 | 155 | 156 | 22 | 25 | 26 | 27 | 31 | 37 |
| Formulation (parts by mass) | Copolymer (8) | — | — | — | — | — | — | — | — | — | 45 | — | — | — | 45 | — |
| | Copolymer (12) | — | — | — | — | — | — | — | — | — | — | 45 | — | — | — | — |
| | Copolymer (14) | — | — | — | — | — | — | — | — | — | — | — | 45 | — | — | — |
| | Copolymer (15) | — | — | — | — | — | — | — | — | — | — | — | — | 45 | — | — |
| | Copolymer (19) | — | — | — | — | — | — | — | — | — | — | — | — | — | 30 | — |
| | Copolymer (33) | 45 | — | — | — | — | — | — | — | — | — | — | — | — | — | — |

TABLE 17-continued

Examples in which a compound represented by the formula (IIIb) is used as a Terminal modifier

| | | Example | | | | | | | | | Comparative Example | | | | | |
|---|---|---|---|---|---|---|---|---|---|---|---|---|---|---|---|---|
| | | 148 | 149 | 150 | 151 | 152 | 153 | 154 | 155 | 156 | 22 | 25 | 26 | 27 | 31 | 37 |
| | Copolymer (34) | — | 45 | — | — | — | — | — | — | — | — | — | — | — | — | — |
| | Copolymer (35) | — | — | 45 | — | — | — | — | — | — | — | — | — | — | — | — |
| | Copolymer (36) | — | — | — | 45 | — | — | — | — | — | — | — | — | — | — | — |
| | Copolymer (37) | — | — | — | — | 45 | — | — | — | — | — | — | — | — | — | — |
| | Copolymer (38) | — | — | — | — | — | 45 | — | — | — | — | — | — | — | — | — |
| | Copolymer (39) | — | — | — | — | — | — | 45 | — | — | — | — | — | — | — | — |
| | Copolymer (40) | — | — | — | — | — | — | — | 45 | — | — | — | — | — | — | — |
| | Copolymer (41) | — | — | — | — | — | — | — | — | 45 | — | — | — | — | — | — |
| | Copolymer (42) | — | — | — | — | — | — | — | — | — | — | — | — | — | — | 45 |
| | Natural rubber | 25 | 25 | 25 | 25 | 25 | 25 | 25 | 25 | 25 | 25 | 25 | 25 | 25 | 25 | 25 |
| | Polybutadiene rubber | 30 | 30 | 30 | 30 | 30 | 30 | 30 | 30 | 30 | 30 | 30 | 30 | 30 | — | 30 |
| | Carbon black | 5 | 5 | 5 | 5 | 5 | 5 | 5 | 5 | 5 | 5 | 5 | 5 | 5 | 5 | 5 |
| | Oil | 20 | 20 | 20 | 20 | 20 | 20 | 20 | 20 | 20 | 20 | 20 | 20 | 20 | 20 | 20 |
| | Silica 1 ($N_2SA$: 80 $m^2/g$) | — | — | — | — | — | — | — | — | — | — | — | — | — | — | — |
| | Silica 2 ($N_2SA$: 110 $m^2/g$) | 60 | 60 | 60 | 60 | 60 | 60 | 60 | 60 | 60 | 60 | 60 | 60 | 60 | 60 | 60 |
| | Silica 3 ($N_2SA$: 160 $m^2/g$) | 15 | 15 | 15 | 15 | 15 | 15 | 15 | 15 | 15 | 15 | 15 | 15 | 15 | 15 | 15 |
| | Silica 4 ($N_2SA$: 200 $m^2/g$) | — | — | — | — | — | — | — | — | — | — | — | — | — | — | — |
| | Silane coupling agent A | 6 | 6 | 6 | 6 | 6 | 6 | 6 | 6 | 6 | 6 | 6 | 6 | 6 | 6 | 6 |
| | Antioxidant | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 12 | 1.2 | 1.2 | 1.2 | 1.2 | 1.2 |
| Evaluation | Mixing and kneading processability index | 102 | 107 | 103 | 102 | 103 | 101 | 107 | 102 | 103 | 100 | 96 | 95 | 93 | 97 | 101 |
| | Low-heat-build-up property index | 119 | 123 | 109 | 107 | 108 | 110 | 109 | 110 | 103 | 100 | 92 | 99 | 98 | 106 | 104 |
| | tan δ peak temperature | −20 | −20 | −20 | −20 | −20 | −20 | −20 | −20 | −20 | −20 | −22 | −20 | −20 | −17 | −20 |
| | Rubber strength index | 102 | 103 | 101 | 101 | 101 | 101 | 101 | 101 | 100 | 100 | 108 | 103 | 102 | 99 | 103 |
| | Abrasion resistance index | 104 | 104 | 103 | 113 | 103 | 102 | 112 | 106 | 109 | 100 | 96 | 92 | 91 | 101 | 97 |
| | Wet-grip performance index | 102 | 103 | 110 | 105 | 107 | 104 | 103 | 105 | 107 | 100 | 97 | 97 | 98 | 105 | 108 |
| | Handling stability | 6 | 6 | 6 | 6 | 6 | 6 | 6 | 6 | 6 | 6 | 6 | 6 | 6 | 5.5 | 6 |

TABLE 18

Examples in which a compound containing an alkoxysilyl group, a nitrogen atom and a carbonyl group is used as a Terminal modifier

| | | Example | | | | | | | Comparative Example | | | | | |
|---|---|---|---|---|---|---|---|---|---|---|---|---|---|---|
| | | 157 | 158 | 159 | 160 | 161 | 162 | 163 | 22 | 25 | 26 | 27 | 31 | 38 |
| Formulation (parts by mass) | Copolymer (8) | — | — | — | — | — | — | — | 45 | — | — | — | 45 | — |
| | Copolymer (12) | — | — | — | — | — | — | — | — | 45 | — | — | — | — |
| | Copolymer (14) | — | — | — | — | — | — | — | — | — | 45 | — | — | — |
| | Copolymer (15) | — | — | — | — | — | — | — | — | — | — | 45 | — | — |
| | Copolymer (19) | — | — | — | — | — | — | — | — | — | — | — | 30 | — |
| | Copolymer (43) | 45 | — | — | — | — | — | — | — | — | — | — | — | — |
| | Copolymer (44) | — | 45 | — | — | — | — | — | — | — | — | — | — | — |
| | Copolymer (45) | — | — | 45 | — | — | — | — | — | — | — | — | — | — |
| | Copolymer (46) | — | — | — | 45 | — | — | — | — | — | — | — | — | — |
| | Copolymer (47) | — | — | — | — | 45 | — | — | — | — | — | — | — | — |
| | Copolymer (48) | — | — | — | — | — | 45 | — | — | — | — | — | — | — |
| | Copolymer (49) | — | — | — | — | — | — | 45 | — | — | — | — | — | — |
| | Copolymer (50) | — | — | — | — | — | — | — | — | — | — | — | — | 45 |
| | Natural rubber | 25 | 25 | 25 | 25 | 25 | 25 | 25 | 25 | 25 | 25 | 25 | 25 | 25 |
| | Polybutadiene rubber | 30 | 30 | 30 | 30 | 30 | 30 | 30 | 30 | 30 | 30 | 30 | — | 30 |
| | Carbon black | 5 | 5 | 5 | 5 | 5 | 5 | 5 | 5 | 5 | 5 | 5 | 5 | 5 |
| | Oil | 20 | 20 | 20 | 20 | 20 | 20 | 20 | 20 | 20 | 20 | 20 | 20 | 20 |
| | Silica 1 ($N_2SA$: 80 $m^2/g$) | — | — | — | — | — | — | — | — | — | — | — | — | — |
| | Silica 2 ($N_2SA$: 110 $m^2/g$) | 60 | 60 | 60 | 60 | 60 | 60 | 60 | 60 | 60 | 60 | 60 | 60 | 60 |
| | Silica 3 ($N_2SA$: 160 $m^2/g$) | 15 | 15 | 15 | 15 | 15 | 15 | 15 | 15 | 15 | 15 | 15 | 15 | 15 |
| | Silica 4 ($N_2SA$: 200 $m^2/g$) | — | — | — | — | — | — | — | — | — | — | — | — | — |
| | Silane coupling agent A | 6 | 6 | 6 | 6 | 6 | 6 | 6 | 6 | 6 | 6 | 6 | 6 | 6 |
| | Antioxidant | 1.5 | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 | 2 |

TABLE 18-continued

Examples in which a compound containing an alkoxysilyl group, a nitrogen atom and a carbonyl group is used as a Terminal modifier

| | | Example | | | | | | | Comparative Example | | | | | |
|---|---|---|---|---|---|---|---|---|---|---|---|---|---|---|
| | | 157 | 158 | 159 | 160 | 161 | 162 | 163 | 22 | 25 | 26 | 27 | 31 | 38 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 | 1.2 | 1.2 |
| Evaluation | Mixing and kneading processability index | 106 | 105 | 103 | 102 | 100 | 104 | 105 | 100 | 96 | 95 | 93 | 97 | 95 |
| | Low-heat-build-up property index | 105 | 103 | 106 | 106 | 107 | 104 | 104 | 100 | 92 | 99 | 98 | 106 | 105 |
| | tan δ peak temperature | −20 | −20 | −20 | −20 | −20 | −20 | −20 | −20 | −22 | −20 | −20 | −17 | −20 |
| | Rubber strength index | 104 | 103 | 104 | 104 | 105 | 103 | 103 | 100 | 108 | 103 | 102 | 99 | 100 |
| | Abrasion resistance index | 107 | 106 | 102 | 103 | 104 | 102 | 103 | 100 | 96 | 92 | 91 | 101 | 97 |
| | Wet-grip performance index | 103 | 109 | 107 | 110 | 111 | 109 | 111 | 100 | 97 | 97 | 98 | 105 | 100 |
| | Handling stability | 6 | 6 | 6 | 6 | 6 | 6 | 6 | 6 | 6 | 6 | 6 | 5.5 | 6 |

TABLE 19

Examples in which an N,N-dialkyl-substituted carboxylic acid amide dialkyl acetal compound is used as a Terminal modifier

| | | Example | | | | | | | Comparative Example | | | | | |
|---|---|---|---|---|---|---|---|---|---|---|---|---|---|---|
| | | 164 | 165 | 166 | 167 | 168 | 169 | 170 | 22 | 25 | 26 | 27 | 31 | 39 |
| Formulation (parts by mass) | Copolymer (8) | — | — | — | — | — | — | — | 45 | — | — | — | 45 | — |
| | Copolymer (12) | — | — | — | — | — | — | — | — | 45 | — | — | — | — |
| | Copolymer (14) | — | — | — | — | — | — | — | — | — | 45 | — | — | — |
| | Copolymer (15) | — | — | — | — | — | — | — | — | — | — | 45 | — | — |
| | Copolymer (19) | — | — | — | — | — | — | — | — | — | — | — | 30 | — |
| | Copolymer (51) | 45 | — | — | — | — | — | — | — | — | — | — | — | — |
| | Copolymer (52) | — | 45 | — | — | — | — | — | — | — | — | — | — | — |
| | Copolymer (53) | — | — | 45 | — | — | — | — | — | — | — | — | — | — |
| | Copolymer (54) | — | — | — | 45 | — | — | — | — | — | — | — | — | — |
| | Copolymer (55) | — | — | — | — | 45 | — | — | — | — | — | — | — | — |
| | Copolymer (56) | — | — | — | — | — | 45 | — | — | — | — | — | — | — |
| | Copolymer (57) | — | — | — | — | — | — | 45 | — | — | — | — | — | — |
| | Copolymer (58) | — | — | — | — | — | — | — | — | — | — | — | — | 45 |
| | Natural rubber | 25 | 25 | 25 | 25 | 25 | 25 | 25 | 25 | 25 | 25 | 25 | 25 | 25 |
| | Polybutadiene rubber | 30 | 30 | 30 | 30 | 30 | 30 | 30 | 30 | 30 | 30 | 30 | — | 30 |
| | Carbon black | 5 | 5 | 5 | 5 | 5 | 5 | 5 | 5 | 5 | 5 | 5 | 5 | 5 |
| | Oil | 20 | 20 | 20 | 20 | 20 | 20 | 20 | 20 | 20 | 20 | 20 | 20 | 20 |
| | Silica 1 ($N_2SA$: 80 $m^2/g$) | — | — | — | — | — | — | — | — | — | — | — | — | — |
| | Silica 2 ($N_2SA$: 110 $m^2/g$) | 60 | 60 | 60 | 60 | 60 | 60 | 60 | 60 | 60 | 60 | 60 | 60 | 60 |
| | Silica 3 ($N_2SA$: 160 $m^2/g$) | 15 | 15 | 15 | 15 | 15 | 15 | 15 | 15 | 15 | 15 | 15 | 15 | 15 |
| | Silica 4 ($N_2SA$: 200 $m^2/g$) | — | — | — | — | — | — | — | — | — | — | — | — | — |
| | Silane coupling agent A | 6 | 6 | 6 | 6 | 6 | 6 | 6 | 6 | 6 | 6 | 6 | 6 | 6 |
| | Antioxidant | 1.5 | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 | 1.2 | 1.2 |
| Evaluation | Mixing and kneading processability index | 103 | 105 | 104 | 104 | 100 | 103 | 106 | 100 | 96 | 95 | 93 | 97 | 94 |
| | Low-heat-build-up property index | 105 | 105 | 104 | 105 | 108 | 102 | 103 | 100 | 92 | 99 | 98 | 106 | 104 |
| | tan δ peak temperature | −20 | −20 | −20 | −20 | −20 | −20 | −20 | −20 | −22 | −20 | −20 | −17 | −20 |
| | Rubber strength index | 104 | 104 | 104 | 104 | 105 | 101 | 103 | 100 | 108 | 103 | 102 | 99 | 100 |
| | Abrasion resistance index | 108 | 107 | 103 | 102 | 103 | 102 | 102 | 100 | 96 | 92 | 91 | 101 | 98 |
| | Wet-grip performance index | 102 | 107 | 111 | 108 | 113 | 108 | 110 | 100 | 97 | 97 | 98 | 105 | 99 |
| | Handling stability | 6 | 6 | 6 | 6 | 6 | 6 | 6 | 6 | 6 | 6 | 6 | 5.5 | 6 |

TABLE 20

Examples in which a compound represented by the formula (IIId) is used as a Terminal modifier

| | | Example | | | | | | | | | | Comparative Example | |
|---|---|---|---|---|---|---|---|---|---|---|---|---|---|
| | | 171 | 172 | 173 | 174 | 175 | 176 | 177 | 178 | 179 | 180 | 40 | 41 |
| Formulation (parts by mass) | Copolymer (1) | 45 | — | — | — | — | — | — | — | — | — | — | — |
| | Copolymer (2) | — | 45 | — | — | — | — | — | — | — | — | — | — |
| | Copolymer (3) | — | — | 45 | — | — | — | — | — | — | — | — | — |
| | Copolymer (4) | — | — | — | 45 | — | — | — | — | — | — | — | — |
| | Copolymer (5) | — | — | — | — | 45 | — | — | — | — | — | — | — |
| | Copolymer (6) | — | — | — | — | — | — | — | 30 | — | — | — | — |
| | Copolymer (7) | — | — | — | — | — | 45 | — | — | — | — | — | — |
| | Copolymer (8) | — | — | — | — | — | — | — | 45 | 45 | 45 | 45 | — |
| | Copolymer (9) | — | — | — | — | — | — | — | — | — | — | — | — |
| | Copolymer (10) | — | — | — | — | — | — | — | — | — | — | — | 45 |
| | Copolymer (11) | — | — | — | — | — | — | — | — | — | — | — | — |
| | Copolymer (12) | — | — | — | — | — | — | — | — | — | — | — | — |
| | Copolymer (13) | — | — | — | — | — | — | 45 | — | — | — | — | — |
| | Copolymer (14) | — | — | — | — | — | — | — | — | — | — | — | — |
| | Copolymer (15) | — | — | — | — | — | — | — | — | — | — | — | — |
| | Copolymer (16) | — | — | — | — | — | — | — | — | — | — | — | — |
| | Copolymer (17) | — | — | — | — | — | — | — | — | — | — | — | — |
| | Copolymer (18) | — | — | — | — | — | — | — | — | 30 | — | — | — |
| | Copolymer (19) | — | — | — | — | — | — | — | — | — | — | — | — |
| | Copolymer (20) | — | — | — | — | — | — | — | — | — | — | — | — |
| | Copolymer (21) | — | — | — | — | — | — | — | — | — | 30 | — | — |
| | Natural rubber | 25 | 25 | 25 | 25 | 25 | 25 | 25 | 25 | 25 | 25 | 25 | 25 |
| | Polybutadiene rubber | 30 | 30 | 30 | 30 | 30 | 30 | 30 | — | — | — | 30 | 30 |
| | Silica 2 ($N_2SA$: 110 $m^2/g$) | 75 | 75 | 75 | 75 | 75 | 75 | 76 | 75 | 75 | 75 | 75 | 75 |
| | Silane coupling agent A | 6 | 6 | 6 | 6 | 6 | 6 | 6 | 6 | 6 | 6 | 6 | 6 |
| | Carbon black | 5 | 5 | 5 | 5 | 5 | 5 | 5 | 5 | 5 | 5 | 5 | 5 |
| | Oil | 20 | 20 | 20 | 20 | 20 | 20 | 20 | 20 | 20 | 20 | 20 | 20 |
| | Coumarone indene resin 1 (Tg: 90° C.) | 5 | 5 | 5 | 5 | 5 | 5 | 5 | 5 | 5 | 5 | 5 | 5 |
| | Coumarone indene resin 2 (Tg: 10° C.) | — | — | — | — | — | — | — | — | — | — | — | — |
| | Coumarone indene resin 3 (Tg: −30° C.) | — | — | — | — | — | — | — | — | — | — | — | — |
| | α-Methyl styrene resin (Tg: 95° C.) | — | — | — | — | — | — | — | — | — | — | — | — |
| | Antioxidant | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 | 1.2 |
| Evaluation | Mixing and kneading processability index | 105 | 106 | 103 | 111 | 101 | 102 | 106 | 101 | 101 | 104 | 100 | 102 |
| | Low-heat-build-up property index | 125 | 127 | 126 | 138 | 135 | 137 | 109 | 125 | 130 | 111 | 100 | 96 |
| | tan δ peak temperature | −20 | −20 | −20 | −20 | −20 | −20 | −19 | −17 | −17 | −17 | −20 | −20 |
| | Rubber strength index | 103 | 104 | 105 | 102 | 101 | 101 | 104 | 101 | 100 | 102 | 100 | 103 |
| | Abrasion resistance index | 103 | 104 | 103 | 101 | 102 | 104 | 103 | 102 | 104 | 100 | 100 | 101 |
| | Wet-grip performance index | 111 | 111 | 110 | 109 | 109 | 112 | 107 | 106 | 107 | 105 | 100 | 101 |
| | Handling stability | 6.25 | 6.25 | 6.25 | 6.25 | 6.25 | 6.25 | 6.25 | 6 | 6 | 6 | 6 | 6 |

| | | Comparative Example | | | | | | | | | |
|---|---|---|---|---|---|---|---|---|---|---|---|
| | | 42 | 43 | 44 | 45 | 46 | 47 | 48 | 49 | 50 | 51 |
| Formulation (parts by mass) | Copolymer (1) | — | — | — | — | — | — | — | — | — | — |
| | Copolymer (2) | — | — | — | — | — | — | — | — | — | — |
| | Copolymer (3) | — | — | — | — | — | — | — | — | — | — |
| | Copolymer (4) | — | — | — | — | — | — | — | — | — | — |
| | Copolymer (5) | — | — | — | — | — | — | — | — | — | — |
| | Copolymer (6) | — | — | — | — | — | — | — | — | — | — |
| | Copolymer (7) | — | — | — | — | — | — | — | — | — | — |
| | Copolymer (8) | — | — | — | — | — | — | 45 | 45 | 45 | 45 |
| | Copolymer (9) | — | — | — | — | — | — | 30 | — | — | — |
| | Copolymer (10) | — | — | — | — | — | — | — | — | — | — |
| | Copolymer (11) | 45 | — | — | — | — | — | — | — | — | — |
| | Copolymer (12) | — | 45 | — | — | — | — | — | — | — | — |
| | Copolymer (13) | — | — | — | — | — | — | — | — | — | — |
| | Copolymer (14) | — | — | 45 | — | — | — | — | — | — | — |
| | Copolymer (15) | — | — | — | 45 | — | — | — | — | — | — |
| | Copolymer (16) | — | — | — | — | 45 | — | — | — | — | — |
| | Copolymer (17) | — | — | — | — | — | 45 | — | — | — | — |

TABLE 20-continued

Examples in which a compound represented by the formula (IIId) is used as a Terminal modifier

| | | | | | | | | | | | |
|---|---|---|---|---|---|---|---|---|---|---|---|
| | Copolymer (18) | — | — | — | — | — | — | — | — | — | — |
| | Copolymer (19) | — | — | — | — | — | — | — | 30 | — | — |
| | Copolymer (20) | — | — | — | — | — | — | — | — | 30 | — |
| | Copolymer (21) | — | — | — | — | — | — | — | — | — | — |
| | Natural rubber | 25 | 25 | 25 | 25 | 25 | 25 | 25 | 25 | 25 | 25 |
| | Polybutadiene rubber | 30 | 30 | 30 | 30 | 30 | 30 | — | — | — | 30 |
| | Silica 2 ($N_2SA$: 110 $m^2/g$) | 75 | 75 | 75 | 75 | 75 | 75 | 75 | 75 | 75 | 75 |
| | Silane coupling agent A | 6 | 6 | 6 | 6 | 6 | 6 | 6 | 6 | 6 | 6 |
| | Carbon black | 5 | 5 | 5 | 5 | 5 | 5 | 5 | 5 | 5 | 5 |
| | Oil | 20 | 20 | 20 | 20 | 20 | 20 | 20 | 20 | 20 | 20 |
| | Coumarone indene resin 1 (Tg: 90° C.) | 5 | 5 | 5 | 5 | 5 | 5 | 5 | 5 | 5 | — |
| | Coumarone indene resin 2 (Tg: 10° C.) | — | — | — | — | — | — | — | — | — | — |
| | Coumarone indene resin 3 (Tg: −30° C.) | — | — | — | — | — | — | — | — | — | — |
| | α-Methyl styrene resin (Tg: 95° C.) | — | — | — | — | — | — | — | — | — | — |
| | Antioxidant | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 |
| Evaluation | Mixing and kneading processability index | 98 | 97 | 96 | 94 | 93 | 93 | 97 | 98 | 102 | 96 |
| | Low-heat-build-up property index | 99 | 93 | 100 | 99 | 98 | 102 | 105 | 107 | 98 | 104 |
| | tan δ peak temperature | −20 | −22 | −20 | −20 | −20 | −20 | −17 | −17 | −17 | −22 |
| | Rubber strength index | 101 | 106 | 101 | 100 | 102 | 100 | 97 | 97 | 99 | 93 |
| | Abrasion resistance index | 99 | 97 | 93 | 92 | 96 | 88 | 101 | 102 | 95 | 98 |
| | Wet-grip performance index | 101 | 96 | 96 | 97 | 96 | 100 | 105 | 104 | 102 | 97 |
| | Handling stability | 6 | 6 | 6 | 6 | 6 | 6 | 5.5 | 5.5 | 5.5 | 6.25 |

TABLE 21

Examples in which a compound represented by the formula (IV) is used as a Terminal modifier

| | | Example | | | | | | | Comparative Example | | |
|---|---|---|---|---|---|---|---|---|---|---|---|
| | | 181 | 182 | 183 | 184 | 185 | 186 | 187 | 40 | 43 | 44 |
| Formulation (parts by mass) | Copolymer (8) | — | — | — | — | — | — | — | 45 | — | — |
| | Copolymer (12) | — | — | — | — | — | — | — | — | 45 | — |
| | Copolymer (14) | — | — | — | — | — | — | — | — | — | 45 |
| | Copolymer (15) | — | — | — | — | — | — | — | — | — | — |
| | Copolymer (19) | — | — | — | — | — | — | — | — | — | — |
| | Copolymer (22) | 45 | — | — | — | — | — | — | — | — | — |
| | Copolymer (23) | — | 45 | — | — | — | — | — | — | — | — |
| | Copolymer (24) | — | — | 45 | — | — | — | — | — | — | — |
| | Copolymer (25) | — | — | — | 45 | — | — | — | — | — | — |
| | Copolymer (26) | — | — | — | — | 45 | — | — | — | — | — |
| | Copolymer (27) | — | — | — | — | — | — | — | — | — | — |
| | Copolymer (28) | — | — | — | — | — | 45 | — | — | — | — |
| | Copolymer (29) | — | — | — | — | — | — | 45 | — | — | — |
| | Copolymer (30) | — | — | — | — | — | — | — | — | — | — |
| | Copolymer (31) | — | — | — | — | — | — | — | — | — | — |
| | Copolymer (32) | — | — | — | — | — | — | — | — | — | — |
| | Natural rubber | 25 | 25 | 25 | 25 | 25 | 25 | 25 | 25 | 25 | 25 |
| | Polybutadiene rubber | 30 | 30 | 30 | 30 | 30 | 30 | 30 | 30 | 30 | 30 |
| | Silica 2 ($N_2SA$: 110 $m^2/g$) | 75 | 75 | 75 | 75 | 75 | 75 | 75 | 75 | 75 | 75 |
| | Silane coupling agent A | 6 | 6 | 6 | 6 | 6 | 6 | 6 | 6 | 6 | 6 |
| | Carbon black | 5 | 5 | 5 | 5 | 5 | 5 | 5 | 5 | 5 | 5 |
| | Oil | 20 | 20 | 20 | 20 | 20 | 20 | 20 | 20 | 20 | 20 |
| | Coumarone indene resin 1 (Tg: 90° C.) | 5 | 5 | 5 | 5 | 5 | 5 | 5 | 5 | 5 | 5 |
| | Coumarone indene resin 2 (Tg: 10° C.) | — | — | — | — | — | — | — | — | — | — |
| | Coumarone indene resin 3 (Tg: −30° C.) | — | — | — | — | — | — | — | — | — | — |

TABLE 21-continued

| Examples in which a compound represented by the formula (IV) is used as a Terminal modifier | | | | | | | | | | | |
|---|---|---|---|---|---|---|---|---|---|---|---|
| | α-Methyl styrene resin (Tg: 95° C.) | — | — | — | — | — | — | — | — | — | — |
| | Antioxidant | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 |
| | Sulfur | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 |
| Evaluation | Mixing and kneading processability index | 100 | 101 | 104 | 100 | 106 | 107 | 103 | 100 | 97 | 96 |
| | Low-heat-build-up property index | 129 | 126 | 127 | 126 | 122 | 123 | 113 | 100 | 93 | 100 |
| | tan δ peak temperature | −20 | −20 | −20 | −20 | −20 | −20 | −20 | −20 | −22 | −20 |
| | Rubber strength index | 107 | 106 | 105 | 107 | 108 | 105 | 109 | 100 | 106 | 101 |
| | Abrasion resistance index | 111 | 108 | 112 | 111 | 109 | 110 | 112 | 100 | 97 | 93 |
| | Wet-grip performance index | 107 | 106 | 105 | 108 | 109 | 107 | 106 | 100 | 96 | 96 |
| | Handling stability | 6 | 6 | 6 | 6 | 6 | 6 | 6 | 6 | 6 | 6 |

| | | Comparative Example | | | Example | | |
|---|---|---|---|---|---|---|---|
| | | 45 | 49 | 52 | 188 | 189 | 190 |
| Formulation (parts by mass) | Copolymer (8) | — | 45 | — | 45 | 45 | 45 |
| | Copolymer (12) | — | — | — | — | — | — |
| | Copolymer (14) | — | — | — | — | — | — |
| | Copolymer (15) | 45 | — | — | — | — | — |
| | Copolymer (19) | — | 30 | — | — | — | — |
| | Copolymer (22) | — | — | — | — | — | — |
| | Copolymer (23) | — | — | — | — | — | — |
| | Copolymer (24) | — | — | — | — | — | — |
| | Copolymer (25) | — | — | — | — | — | — |
| | Copolymer (26) | — | — | — | — | — | — |
| | Copolymer (27) | — | — | — | 30 | — | — |
| | Copolymer (28) | — | — | — | — | — | — |
| | Copolymer (29) | — | — | — | — | — | — |
| | Copolymer (30) | — | — | 45 | — | — | — |
| | Copolymer (31) | — | — | — | — | 30 | — |
| | Copolymer (32) | — | — | — | — | — | 30 |
| | Natural rubber | 25 | 25 | 25 | 25 | 25 | 25 |
| | Polybutadiene rubber | 30 | — | 30 | — | — | — |
| | Silica 2 ($N_2SA$: 110 $m^2/g$) | 75 | 75 | 75 | 75 | 75 | 75 |
| | Silane coupling agent A | 6 | 6 | 6 | 6 | 6 | 6 |
| | Carbon black | 5 | 5 | 5 | 5 | 5 | 5 |
| | Oil | 20 | 20 | 20 | 20 | 20 | 20 |
| | Coumarone indene resin 1 (Tg: 90° C.) | 5 | 5 | 5 | 5 | 5 | 5 |
| | Coumarone indene resin 2 (Tg: 10° C.) | — | — | — | — | — | — |
| | Coumarone indene resin 3 (Tg: −30° C.) | — | — | — | — | — | — |
| | α-Methyl styrene resin (Tg: 95° C.) | — | — | — | — | — | — |
| | Antioxidant | 1.5 | 1.5 | 1.5 | 1.5 | 1.5 | 1.5 |
| | Stearic acid | 2 | 2 | 2 | 2 | 2 | 2 |
| | Zinc oxide | 2.5 | 2.5 | 2.5 | 2.5 | 2.5 | 2.5 |
| | Wax | 1 | 1 | 1 | 1 | 1 | 1 |
| | Sulfur | 2 | 2 | 2 | 2 | 2 | 2 |
| | Vulcanization accelerator 1 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 |
| Evaluation | Mixing and kneading processability index | 94 | 98 | 98 | 101 | 102 | 100 |
| | Low-heat-build-up property index | 99 | 107 | 97 | 108 | 110 | 105 |
| | tan δ peak temperature | −20 | −17 | −17 | −17 | −17 | −17 |
| | Rubber strength index | 100 | 97 | 102 | 105 | 105 | 104 |
| | Abrasion resistance index | 92 | 102 | 102 | 108 | 110 | 112 |
| | Wet-grip performance index | 97 | 104 | 103 | 108 | 107 | 105 |
| | Handling stability | 6 | 5.5 | 5.5 | 6 | 6 | 6 |

TABLE 22

Examples in which a compound represented by the formula (IIId) is used as a Terminal modifier

| | | Comparative Example | | Example | | | | | | Comparative Example |
|---|---|---|---|---|---|---|---|---|---|---|
| | | 40 | 43 | 176 | 188 | 189 | 190 | 191 | 192 | 53 |
| Formulation (parts by mass) | Copolymer (7) | — | — | 45 | 45 | 45 | 45 | 45 | 40 | 100 |
| | Copolymer (8) | 45 | — | — | — | — | — | — | — | — |
| | Copolymer (12) | — | 45 | — | — | — | — | — | — | — |
| | Natural rubber | 25 | 25 | 25 | 25 | 25 | 25 | 25 | 40 | — |
| | Polybutadiene rubber | 30 | 30 | 30 | 30 | 30 | 30 | 30 | 20 | — |
| | Silica 2 ($N_2SA$: 110 $m^2/g$) | 75 | 75 | 75 | 75 | 75 | 75 | 75 | 75 | 75 |
| | Silane coupling agent A | 6 | 6 | 6 | 6 | 6 | 6 | 6 | 6 | 6 |
| | Carbon black | 5 | 5 | 5 | 5 | 5 | 5 | 5 | 5 | 5 |
| | Oil | 20 | 20 | 20 | 20 | 20 | 20 | 20 | 20 | 20 |
| | Coumarone indene resin 1 (Tg: 90° C.) | 5 | 5 | 5 | — | 15 | 5 | 5 | 5 | 5 |
| | Coumarone indene resin 2 (Tg: 10° C.) | — | — | — | — | — | 5 | — | — | — |
| | Coumarone indene resin 3 (Tg: −30° C.) | — | — | — | — | — | — | 5 | — | — |
| | α-Methyl styrene resin (Tg: 95° C.) | — | — | — | 5 | — | — | — | — | — |
| | Antioxidant | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 |
| | Sulfur | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 |
| Evaluation | Mixing and kneading processability index | 100 | 97 | 102 | 102 | 114 | 108 | 110 | 106 | 82 |
| | Low-heat-build-up property index | 100 | 93 | 137 | 136 | 132 | 134 | 137 | 132 | 125 |
| | tan δ peak temperature | −20 | −22 | −20 | −20 | −17 | −20 | −21 | −18 | −14 |
| | Rubber strength index | 100 | 106 | 101 | 101 | 107 | 105 | 106 | 115 | 75 |
| | Abrasion resistance index | 100 | 97 | 104 | 100 | 102 | 102 | 105 | 106 | 70 |
| | Wet-grip performance index | 100 | 96 | 112 | 114 | 121 | 112 | 114 | 102 | 121 |
| | Handling stability | 6 | 6 | 6.25 | 6.25 | 6 | 6.25 | 6.5 | 6.25 | 4.5 |

TABLE 23

Examples in which a compound represented by the formula (IIIb) is used as a Terminal modifier

| | | Example | | | | | | | | | Comparative Example | | | | | |
|---|---|---|---|---|---|---|---|---|---|---|---|---|---|---|---|---|
| | | 193 | 194 | 195 | 196 | 197 | 198 | 199 | 200 | 201 | 40 | 43 | 44 | 45 | 49 | 54 |
| Formulation (parts by mass) | Copolymer (8) | — | — | — | — | — | — | — | — | — | 45 | — | — | — | 45 | — |
| | Copolymer (12) | — | — | — | — | — | — | — | — | — | — | 45 | — | — | — | — |
| | Copolymer (14) | — | — | — | — | — | — | — | — | — | — | — | 45 | — | — | — |
| | Copolymer (15) | — | — | — | — | — | — | — | — | — | — | — | — | 45 | — | — |
| | Copolymer (19) | — | — | — | — | — | — | — | — | — | — | — | — | — | 30 | — |
| | Copolymer (33) | 45 | — | — | — | — | — | — | — | — | — | — | — | — | — | — |
| | Copolymer (34) | — | 45 | — | — | — | — | — | — | — | — | — | — | — | — | — |
| | Copolymer (35) | — | — | 45 | — | — | — | — | — | — | — | — | — | — | — | — |
| | Copolymer (36) | — | — | — | 45 | — | — | — | — | — | — | — | — | — | — | — |
| | Copolymer (37) | — | — | — | — | 45 | — | — | — | — | — | — | — | — | — | — |
| | Oopolymer (38) | — | — | — | — | — | 45 | — | — | — | — | — | — | — | — | — |
| | Copolymer (39) | — | — | — | — | — | — | 45 | — | — | — | — | — | — | — | — |
| | Copolymer (40) | — | — | — | — | — | — | — | 45 | — | — | — | — | — | — | — |
| | Copolymer (41) | — | — | — | — | — | — | — | — | 45 | — | — | — | — | — | — |
| | Copolymer (42) | — | — | — | — | — | — | — | — | — | — | — | — | — | — | 45 |
| | Natural rubber | 25 | 25 | 25 | 25 | 25 | 25 | 25 | 25 | 25 | 25 | 25 | 25 | 25 | 25 | 25 |
| | Polybutadiene rubber | 30 | 30 | 30 | 30 | 30 | 30 | 30 | 30 | 30 | 30 | 30 | 30 | 30 | — | 30 |
| | Silica 2 ($N_2SA$: 110 $m^2/g$) | 75 | 75 | 75 | 75 | 75 | 75 | 75 | 75 | 75 | 75 | 75 | 75 | 75 | 75 | 75 |
| | Silane coupling agent A | 6 | 6 | 6 | 6 | 6 | 6 | 6 | 6 | 6 | 6 | 6 | 6 | 6 | 6 | 6 |
| | Carbon black | 5 | 5 | 5 | 5 | 5 | 5 | 5 | 5 | 5 | 5 | 5 | 5 | 5 | 5 | 5 |
| | Oil | 20 | 20 | 20 | 20 | 20 | 20 | 20 | 20 | 20 | 20 | 20 | 20 | 20 | 20 | 20 |
| | Coumarone indene resin 1 (Tg: 90° C.) | 5 | 5 | 5 | 5 | 5 | 5 | 5 | 5 | 5 | 5 | 5 | 5 | 5 | 5 | 5 |
| | Coumarone indene resin 2 (Tg: 10° C.) | — | — | — | — | — | — | — | — | — | — | — | — | — | — | — |

TABLE 23-continued

Examples in which a compound represented by the formula (IIIb) is used as a Terminal modifier

| | | Example | | | | | | | | | Comparative Example | | | | | |
|---|---|---|---|---|---|---|---|---|---|---|---|---|---|---|---|---|
| | | 193 | 194 | 195 | 196 | 197 | 198 | 199 | 200 | 201 | 40 | 43 | 44 | 45 | 49 | 54 |
| | Coumarone indene resin 3 (Tg: −30° C.) | — | — | — | — | — | — | — | — | — | — | — | — | — | — | — |
| | α-Methyl styrene resin (Tg: 95° C.) | — | — | — | — | — | — | — | — | — | — | — | — | — | — | — |
| | Antioxidant | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| Evaluation | Mixing and kneading processability index | 102 | 107 | 103 | 102 | 103 | 101 | 107 | 102 | 103 | 100 | 97 | 96 | 94 | 98 | 101 |
| | Low-heat-build-up property index | 119 | 123 | 109 | 107 | 108 | 110 | 109 | 110 | 103 | 100 | 93 | 100 | 99 | 107 | 104 |
| | tan δ peak temperature | −20 | −20 | −20 | −20 | −20 | −20 | −20 | −20 | −20 | −20 | −22 | −20 | −20 | −17 | −20 |
| | Rubber strength index | 102 | 103 | 101 | 101 | 101 | 101 | 101 | 101 | 100 | 100 | 106 | 101 | 100 | 97 | 103 |
| | Abrasion resistance index | 104 | 104 | 103 | 113 | 103 | 102 | 112 | 106 | 109 | 100 | 97 | 93 | 92 | 102 | 97 |
| | Wet-grip performance index | 102 | 103 | 110 | 105 | 107 | 104 | 103 | 105 | 107 | 100 | 96 | 96 | 97 | 104 | 108 |
| | Handling stability | 6 | 6 | 6 | 6 | 6 | 6 | 6 | 6 | 6 | 6 | 6 | 6 | 6 | 5.5 | 6 |

TABLE 24

Examples in which a compound containing an alkoxysilyl group, a nitrogen atom and a carbonyl group is used as a Terminal modifier

| | | Example | | | | | | | Comparative Example | | | | | |
|---|---|---|---|---|---|---|---|---|---|---|---|---|---|---|
| | | 202 | 203 | 204 | 205 | 206 | 207 | 208 | 40 | 43 | 44 | 45 | 49 | 55 |
| Formulation (parts by mass) | Copolymer (8) | — | — | — | — | — | — | — | 45 | — | — | — | 45 | — |
| | Copolymer (12) | — | — | — | — | — | — | — | — | 45 | — | — | — | — |
| | Copolymer (14) | — | — | — | — | — | — | — | — | — | 45 | — | — | — |
| | Copolymer (15) | — | — | — | — | — | — | — | — | — | — | 45 | — | — |
| | Copolymer (19) | — | — | — | — | — | — | — | — | — | — | — | 30 | — |
| | Copolymer (43) | 45 | — | — | — | — | — | — | — | — | — | — | — | — |
| | Copolymer (44) | — | 45 | — | — | — | — | — | — | — | — | — | — | — |
| | Copolymer (45) | — | — | 45 | — | — | — | — | — | — | — | — | — | — |
| | Copolymer (46) | — | — | — | 45 | — | — | — | — | — | — | — | — | — |
| | Copolymer (47) | — | — | — | — | 45 | — | — | — | — | — | — | — | — |
| | Copolymer (48) | — | — | — | — | — | 45 | — | — | — | — | — | — | — |
| | Copolymer (49) | — | — | — | — | — | — | 45 | — | — | — | — | — | — |
| | Copolymer (50) | — | — | — | — | — | — | — | — | — | — | — | — | 45 |
| | Natural rubber | 25 | 25 | 25 | 25 | 25 | 25 | 25 | 25 | 25 | 25 | 25 | 25 | 25 |
| | Polybutadiene rubber | 30 | 30 | 30 | 30 | 30 | 30 | 30 | 30 | 30 | 30 | 30 | — | 30 |
| | Silica 2 ($N_2SA$: 110 $m^2/g$) | 75 | 75 | 75 | 75 | 75 | 75 | 75 | 75 | 75 | 75 | 75 | 75 | 75 |
| | Silane coupling agent A | 6 | 6 | 6 | 6 | 6 | 6 | 6 | 6 | 6 | 6 | 6 | 6 | 6 |
| | Carbon black | 5 | 5 | 5 | 5 | 5 | 5 | 5 | 5 | 5 | 5 | 5 | 5 | 5 |
| | Oil | 20 | 20 | 20 | 20 | 20 | 20 | 20 | 20 | 20 | 20 | 20 | 20 | 20 |
| | Coumarone indene resin 1 (Tg 90° C.) | 5 | 5 | 5 | 5 | 5 | 5 | 5 | 5 | 5 | 5 | 5 | 5 | 5 |
| | Coumarone indene resin 2 (Tg: 10° C.) | — | — | — | — | — | — | — | — | — | — | — | — | — |
| | Coumarone indene resin 3 (Tg: −30° C.) | — | — | — | — | — | — | — | — | — | — | — | — | — |
| | α-Methyl styrene resin (Tg: 95° C.) | — | — | — | — | — | — | — | — | — | — | — | — | — |
| | Antioxidant | 1.5 | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 | 1.2 | 1.2 |
| Evaluation | Mixing and kneading processability index | 106 | 105 | 103 | 102 | 100 | 104 | 105 | 100 | 97 | 96 | 94 | 98 | 95 |
| | Low-heat-build-up property index | 105 | 103 | 105 | 106 | 107 | 104 | 104 | 100 | 93 | 100 | 99 | 107 | 105 |
| | tan δ peak temperature | −20 | −20 | −20 | −20 | −20 | −20 | −20 | −20 | −22 | −20 | −20 | −17 | −20 |
| | Rubber strength index | 104 | 103 | 104 | 104 | 105 | 103 | 103 | 100 | 106 | 101 | 100 | 97 | 100 |
| | Abrasion resistance index | 107 | 106 | 102 | 103 | 104 | 102 | 103 | 100 | 97 | 93 | 92 | 102 | 97 |

TABLE 24-continued

| Examples in which a compound containing an alkoxysilyl group, a nitrogen atom and a carbonyl group is used as a Terminal modifier | Example | | | | | | | Comparative Example | | | | | |
|---|---|---|---|---|---|---|---|---|---|---|---|---|---|
| | 202 | 203 | 204 | 205 | 206 | 207 | 208 | 40 | 43 | 44 | 45 | 49 | 55 |
| Wet-grip performance index | 103 | 109 | 107 | 110 | 111 | 109 | 111 | 100 | 96 | 96 | 97 | 104 | 100 |
| Handling stability | 6 | 6 | 6 | 6 | 6 | 6 | 6 | 6 | 6 | 6 | 6 | 5.5 | 6 |

TABLE 25

Examples in which an N,N-dialkyl-substituted carboxylic acid amide dialkyl acetal compound is used as a Terminal modifier

| | | Example | | | | | | | Comparative Example | | | | | |
|---|---|---|---|---|---|---|---|---|---|---|---|---|---|---|
| | | 209 | 210 | 211 | 212 | 213 | 214 | 215 | 40 | 43 | 44 | 45 | 49 | 56 |
| Formulation (parts by mass) | Copolymer (8) | — | — | — | — | — | — | — | 45 | — | — | — | 45 | — |
| | Copolymer (12) | — | — | — | — | — | — | — | — | 45 | — | — | — | — |
| | Copolymer (14) | — | — | — | — | — | — | — | — | — | 45 | — | — | — |
| | Copolymer (15) | — | — | — | — | — | — | — | — | — | — | 45 | — | — |
| | Copolymer (19) | — | — | — | — | — | — | — | — | — | — | — | 30 | — |
| | Copolymer (51) | 45 | — | — | — | — | — | — | — | — | — | — | — | — |
| | Copolymer (52) | — | 45 | — | — | — | — | — | — | — | — | — | — | — |
| | Copolymer (53) | — | — | 45 | — | — | — | — | — | — | — | — | — | — |
| | Copolymer (54) | — | — | — | 45 | — | — | — | — | — | — | — | — | — |
| | Copolymer (55) | — | — | — | — | 45 | — | — | — | — | — | — | — | — |
| | Copolymer (56) | — | — | — | — | — | 45 | — | — | — | — | — | — | — |
| | Copolymer (57) | — | — | — | — | — | — | 45 | — | — | — | — | — | — |
| | Copolymer (58) | — | — | — | — | — | — | — | — | — | — | — | — | 45 |
| | Natural rubber | 25 | 25 | 25 | 25 | 25 | 25 | 25 | 25 | 25 | 25 | 25 | 25 | 25 |
| | Polybutadiene rubber | 30 | 30 | 30 | 30 | 30 | 30 | 30 | 30 | 30 | 30 | 30 | — | 30 |
| | Silica 2 ($N_2SA$: 110 $m^2/g$) | 75 | 75 | 75 | 75 | 75 | 75 | 75 | 75 | 75 | 75 | 75 | 75 | 75 |
| | Silane coupling agent A | 6 | 6 | 6 | 6 | 6 | 6 | 6 | 6 | 6 | 6 | 6 | 6 | 6 |
| | Carbon black | 5 | 5 | 5 | 5 | 5 | 5 | 5 | 5 | 5 | 5 | 5 | 5 | 5 |
| | Oil | 20 | 20 | 20 | 20 | 20 | 20 | 20 | 20 | 20 | 20 | 20 | 20 | 20 |
| | Coumarone indene resin 1 (Tg: 90° C.) | 5 | 5 | 5 | 5 | 5 | 5 | 5 | 5 | 5 | 5 | 5 | 5 | 5 |
| | Coumarone indene resin 2 (Tg: 10° C.) | — | — | — | — | — | — | — | — | — | — | — | — | — |
| | Coumarone indene resin 3 (Tg: −30° C.) | — | — | — | — | — | — | — | — | — | — | — | — | — |
| | α-Methyl styrene resin (Tg: 95° C.) | — | — | — | — | — | — | — | — | — | — | — | — | — |
| | Antioxidant | 1.5 | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 | 1.2 | 1.2 |
| Evaluation | Mixing and kneading processability index | 103 | 105 | 104 | 104 | 100 | 103 | 106 | 100 | 97 | 96 | 94 | 98 | 94 |
| | Low-heat-build-up property index | 105 | 105 | 104 | 105 | 108 | 102 | 103 | 100 | 93 | 100 | 99 | 107 | 104 |
| | tan δ peak temperature | −20 | −20 | −20 | −20 | −20 | −20 | −20 | −20 | −22 | −20 | −20 | −17 | −20 |
| | Rubber strength index | 104 | 104 | 104 | 104 | 105 | 101 | 103 | 100 | 106 | 101 | 100 | 97 | 100 |
| | Abrasion resistance index | 108 | 107 | 103 | 102 | 103 | 102 | 102 | 100 | 97 | 93 | 92 | 102 | 98 |
| | Wet-grip performance index | 102 | 107 | 111 | 108 | 113 | 108 | 110 | 100 | 96 | 96 | 97 | 104 | 99 |
| | Handling stability | 6 | 6 | 6 | 6 | 6 | 6 | 6 | 6 | 6 | 6 | 6 | 5.5 | 6 |

As shown in Tables 6 to 25, since each of the rubber compositions of the examples contains a specific amount of a silica, and a specific amount of a conjugated diene copolymer having a specific amine structure at an initiation terminal, a structural unit derived from a silicon-containing compound at a main chain, and a structural unit derived from a compound containing a nitrogen atom and/or a silicon atom at a termination terminal, these rubber compositions exhibited a balanced improvement in processability, fuel economy, rubber strength, abrasion resistance, wet-grip performance, and handling stability as compared to the rubber compositions of the comparative examples. Moreover, comparison between the conjugated diene polymer in which the three sites (the initiation terminal, main chain, and termination terminal) are modified by specific compounds, and a copolymer in which only one of the initiation terminal, main chain, and termination terminal is modified shows that modification of the three sites (the initiation terminal, main chain, and termination terminal) synergistically increases the effects of improving those properties.

The rubber compositions of Examples 20 to 34 and 36 to 215, each containing the conjugated diene polymer together with at least one of a mercapto group-containing silane coupling agent, a combination of two kinds of silica having specific nitrogen adsorption specific surface areas, and a solid resin having a specific glass transition temperature, exhibited greatly improved properties. Among these rubber compositions, the rubber composition of Example 34 combining all the above ingredients exhibited particularly good properties.

Each of the rubber compositions of Comparative Example 8, 29, and 47 contains, instead of the conjugated diene polymer, the copolymer (17) which has a structural unit derived from a silicon-containing compound at a main chain and a structural unit derived from a compound containing a nitrogen atom and/or a silicon atom at a termination terminal but does not have a specific amine structure at an initiation terminal. The rubber compositions of Comparative Examples 8, 29, and 47 have inferior properties to those in the examples, and furthermore, have poor abrasion resistance, processability, and rubber strength as compared to those of the standard comparative examples.

Each of the rubber compositions of Comparative Examples 15, 36, and 53 contains too large an amount of the conjugated diene polymer. Thus, the abrasion resistance and other properties were very poor.

The invention claimed is:

1. A rubber composition, comprising (A) a conjugated diene polymer, the conjugated diene polymer being obtained by polymerizing, in the presence of a polymerization initiator represented by the following formula (I):

(I)

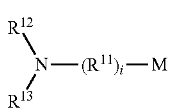

wherein i represents 0 or 1; $R^{11}$ represents a $C_{7-80}$ hydrocarbylene group; $R^{12}$ and $R^{13}$ each are a hydrocarbyl group, or $R^{12}$ and $R^{13}$ are bonded to each other to form a hydrocarbylene group; and M represents an alkali metal atom, a monomer component including a conjugated diene compound and a silicon-containing vinyl compound represented by the formula

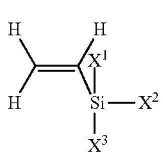

wherein $X^1$, $X^2$, and $X^3$ each represents a hydrocarbyl group or a group of the formula —$NR^{22}R^{23}$ wherein $R^{22}$ and $R^{23}$ are each an alkyl group, provided that at least one of $X^1$, $X^2$, and $X^3$ is a group of the formula —$NR^{22}R^{23}$, to produce a copolymer, and then reacting a compound containing at least one of a nitrogen atom and a silicon atom with an active terminal of the copolymer, wherein the compound containing at least one of a nitrogen atom and a silicon atom is at least one compound selected from the group consisting of (i) a compound of formula (IIIb):

(IIIb)

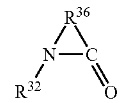

wherein $R^{32}$ represents a hydrocarbyl group and $R^{36}$ represents a hydrocarbylene group or a group in which a hydrocarbylene group and a group represented by —$NR^{35}$— are bonded, where $R^{35}$ represents a hydrocarbyl group or a hydrogen atom, (ii) a compound of formula (IIId):

(IIId)

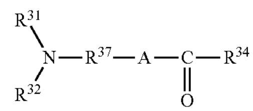

wherein $R^{31}$ and $R^{32}$ each represents a hydrocarbyl group, $R^{37}$ represents a hydrocarbylene group, A represents an oxygen atom or —$NR^{35}$— wherein $R^{35}$ represents a hydrocarbyl group or a hydrogen atom, and $R^{34}$ represents a hydrocarbyl group or a hydrogen atom, (iii) a compound of formula (IV):

(IV)

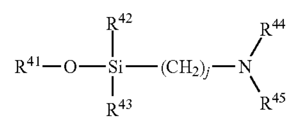

wherein $R^{41}$ represents a hydrocarbyl group, $R^{42}$ and $R^{43}$ each represents a hydrocarbyl group or a hydrocarbyloxy group, $R^{44}$ and $R^{45}$ each represents a hydrocarbyl group, and j represents an integer of 1 to 5, (iv) a tris[(alkoxysilyl)alkyl]isocyanurate compound, and (v) an N,N-dialkyl-substituted carboxylic acid amide dialkyl acetal compound, and (B) a silica having a nitrogen adsorption specific surface area of 40 to 400 $m^2/g$, wherein an amount of the conjugated diene polymer is 25 to 75% by mass and an amount of a polyisoprene-based rubber is 10 to 70% by mass, each based on 100% by mass of a rubber component of the rubber composition, and an amount of the silica is 10 to 150 parts by mass for each 100 parts by mass of the rubber component.

2. The rubber composition according to claim 1, wherein $R^{11}$ in the formula (I) is a group represented by the following formula (Ia):

(Ia)

$$-(CH_2)_n-R^{14}-$$

wherein $R^{14}$ represents a hydrocarbylene group comprising at least one of a structural unit derived from a conjugated diene compound and a structural unit derived from an aromatic vinyl compound; and n represents an integer of 1 to 10.

3. The rubber composition according to claim 2, wherein $R^{14}$ in the formula (Ia) is a hydrocarbylene group comprising from one to ten isoprene-derived structural unit(s).

4. The rubber composition according to claim 1, wherein the conjugated diene polymer contains a structural unit derived from an aromatic vinyl compound.

5. The rubber composition according to claim 1, wherein the silica includes silica (1) having a nitrogen adsorption specific surface area of at least 50 $m^2$/g but less than 120 $m^2$/g, and silica (2) having a nitrogen adsorption specific surface area of not less than 120 $m^2$/g.

6. The rubber composition according to claim 1, comprising a solid resin having a glass transition temperature of 60 to 120° C. in an amount of 1 to 30 parts by mass for each 100 parts by mass of the rubber component.

7. The rubber composition according to claim 1, wherein
 the silica includes silica (1) having a nitrogen adsorption specific surface area of at least 50 $m^2$/g but less than 120 $m^2$/g, and silica (2) having a nitrogen adsorption specific surface area of not less than 120 $m^2$/g, and
 the rubber composition comprises a solid resin having a glass transition temperature of 60 to 120° C. in an amount of 1 to 30 parts by mass for each 100 parts by mass of the rubber component.

8. The rubber composition according to claim 1, comprising a mercapto group-containing silane coupling agent in an amount of 0.5 to 20 parts by mass for each 100 parts by mass of the silica.

9. The rubber composition according to claim 1, wherein
 the rubber composition comprises a mercapto group-containing silane coupling agent in an amount of 0.5 to 20 parts by mass for each 100 parts by mass of the silica, and
 the silica includes silica (1) having a nitrogen adsorption specific surface area of at least 50 $m^2$/g but less than 120 $m^2$/g, and silica (2) having a nitrogen adsorption specific surface area of not less than 120 $m^2$/g.

10. The rubber composition according to claim 1, wherein the rubber composition comprises
 a mercapto group-containing silane coupling agent in an amount of 0.5 to 20 parts by mass for each 100 parts by mass of the silica, and
 a solid resin having a glass transition temperature of 60 to 120° C. in an amount of 1 to 30 parts by mass for each 100 parts by mass of the rubber component.

11. The rubber composition according to claim 1, wherein
 the rubber composition comprises a mercapto group-containing silane coupling agent in an amount of 0.5 to 20 parts by mass for each 100 parts by mass of the silica,
 the silica includes silica (1) having a nitrogen adsorption specific surface area of at least 50 $m^2$/g but less than 120 $m^2$/g, and silica (2) having a nitrogen adsorption specific surface area of not less than 120 $m^2$/g, and
 the rubber composition comprises a solid resin having a glass transition temperature of 60 to 120° C. in an amount of 1 to 30 parts by mass for each 100 parts by mass of the rubber component.

12. The rubber composition according to claim 1, wherein
 the rubber composition comprises a mercapto group-containing silane coupling agent in an amount of 0.5 to 20 parts by mass for each 100 parts by mass of the silica, and
 the silane coupling agent is at least one of a compound represented by the formula (1) below, and a compound containing a linking unit A represented by the formula (2) below and a linking unit B represented by the formula (3) below, (1)

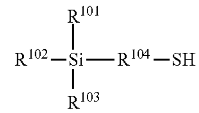

wherein $R^{101}$ to $R^{103}$ each represent a branched or unbranched $C_{1-12}$ alkyl group, a branched or unbranched $C_{1-12}$ alkoxy group, or a group represented by —O—($R^{111}$—O)$_Z$—$R^{112}$ where z $R^{111}$s each represent a branched or unbranched $C_{1-30}$ divalent hydrocarbon group, and z $R^{111}$s may be the same as or different from one another; $R^{112}$ represents a branched or unbranched $C_{1-30}$ alkyl group, a branched or unbranched $C_{2-30}$ alkenyl group, a $C_{6-30}$ aryl group, or a $C_{7-30}$ aralkyl group; and z represents an integer of 1 to 30, and $R^{101}$to $R^{103}$ may be the same as or different from one another; and $R^{104}$ represents a branched or unbranched $C_{1-6}$ alkylene group;

(2)

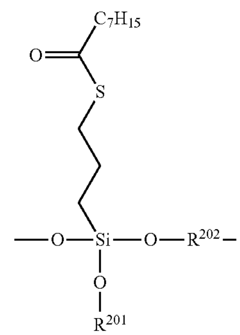

and (3)

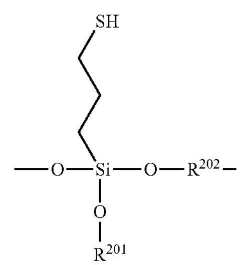

wherein $R^{201}$ represents a hydrogen atom, a halogen atom, a branched or unbranched $C_{1-30}$ alkyl group, a branched or unbranched $C_{2-30}$ alkenyl group, a branched or unbranched $C_{2-30}$ alkynyl group, or the alkyl group in which a terminal hydrogen atom is replaced with a hydroxyl group or a carboxyl group; $R^{202}$ represents a branched or unbranched $C_{1-30}$ alkylene group, a branched or unbranched $C_{2-30}$ alkenylene group, or a branched or unbranched $C_{2-30}$ alkynylene group; and $R_{201}$ and $R^{202}$ may be joined together to form a cyclic structure.

13. The rubber composition according to claim 1, wherein
 the silica includes silica (1) having a nitrogen adsorption specific surface area of at least 50 $m^2$/g but less than 120 $m^2$/g, and silica (2) having a nitrogen adsorption specific surface area of not less than 120 $m^2$/g, and
 the nitrogen adsorption specific surface areas and amounts of the silica (1) and the silica (2) satisfy the following inequalities:
 (Nitrogen adsorption specific surface area of silica (2))/(Nitrogen adsorption specific surface area of silica (1))≥1.4, and $$(\text{Amount of silica }(1))\times 0.06\leq(\text{Amount of silica }(2))\leq(\text{Amount of silica }(1))\times 15.$$

14. The rubber composition according to claim 1, comprising at least one of at least one liquid resin having a glass transition temperature of −40 to 20° C. selected from the group consisting of aromatic petroleum resins, terpene resins, and rosin resins, and a plasticizer having a glass transition temperature of −40 to 20° C., wherein a combined amount of the liquid resin and the plasticizer is 1 to 30 parts by mass for each 100 parts by mass of the rubber component.

15. The rubber composition according to claim 1, wherein the rubber composition has a tan δ peak temperature of lower than −16° C.

16. The rubber composition according to claim 1, which is for use in a tread.

17. A pneumatic tire, formed from the rubber composition according to claim 1.

* * * * *